United States Patent [19]

Hatakenaka

[11] Patent Number: 5,459,419
[45] Date of Patent: Oct. 17, 1995

[54] SYNCHRONIZING PULSE GENERATING CIRCUIT

[75] Inventor: Makoto Hatakenaka, Itami, Japan

[73] Assignee: Mitsubishi Denki Kabushiki Kaisha, Tokyo, Japan

[21] Appl. No.: 186,453

[22] Filed: Jan. 25, 1994

[30] Foreign Application Priority Data

Feb. 3, 1993 [JP] Japan ............................. 5-016086

[51] Int. Cl.⁶ ..................................................... H03K 5/13
[52] U.S. Cl. ............................ 327/141; 327/144; 327/18
[58] Field of Search .................................... 327/18, 23–25, 327/141, 144, 146, 151, 154, 155, 160, 290, 292, 293

[56] References Cited

U.S. PATENT DOCUMENTS

| | | | |
|---|---|---|---|
| 4,361,895 | 11/1982 | Khoudari | 375/87 |
| 4,385,396 | 5/1983 | Norton | 375/110 |
| 4,484,296 | 11/1984 | Treise et al. | 364/607 |
| 4,691,327 | 9/1987 | Wenger | 375/4 |
| 4,729,024 | 3/1988 | Kawai et al. | 328/63 |
| 5,012,198 | 4/1991 | Okada et al. | 328/155 |
| 5,173,665 | 12/1992 | Norimatsu | 307/511 |

FOREIGN PATENT DOCUMENTS

| | | |
|---|---|---|
| 3832330 | 3/1990 | Germany . |
| 61-11018 | 4/1986 | Japan . |
| 61-28188 | 6/1986 | Japan . |
| 63-41466 | 8/1988 | Japan . |
| 4-363914 | 12/1992 | Japan . |
| 5-29891 | 2/1993 | Japan . |
| 5-110388 | 4/1993 | Japan . |
| 2086177 | 5/1982 | United Kingdom . |

*Primary Examiner*—Timothy P. Callahan
*Assistant Examiner*—T. Lam
*Attorney, Agent, or Firm*—Oblon, Spivak, McClelland, Maier & Neustadt

[57] ABSTRACT

There is disclosed a synchronizing pulse generating circuit wherein a synchronization lack correcting portion (600) processes a synchronizing signal (S601) to provide a corrected synchronizing signal (S600), and a synchronizing clock generating portion (700) generates a synchronizing clock (S700) accurately synchronized with the corrected synchronizing signal (S600), and then a synchronizing pulse generating portion (800) counts the synchronizing clock (S700) to provide a synchronizing signal (S800) accurately synchronized with the synchronizing signal S601, whereby the synchronizing pulse generating circuit generates high-accuracy synchronizing pulses without exteriorly attached parts and is adapted for generation of HD pulses for use in a deflecting system of a multi-synchronization type display monitor.

16 Claims, 40 Drawing Sheets

F I G. 13
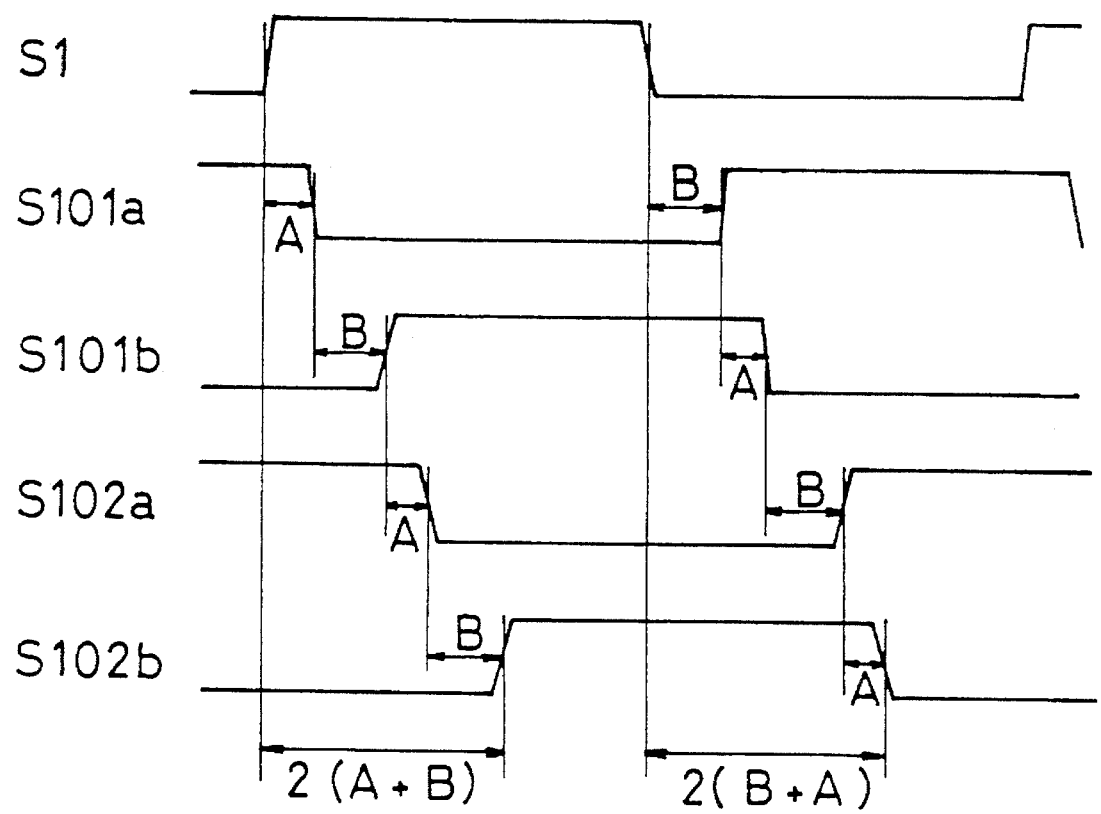

so as to ensure phase lock at the rising of the synchronizing input 501 and at the rising of the PLL output 503. The frequency range of the phase lock of the PLL circuit 502 is determined by exteriorly attached resistor R and capacitor C. The saw-tooth wave generating circuit 504 outputs the saw-tooth wave 505 in synchronism with the PLL output 503. The voltage comparator 506 makes the voltage comparison between the saw-tooth wave 505 and the reference voltage V1 to output the voltage comparison output 507. Pulses delayed by the amount t1 from the synchronizing input 501 arc provided in the form of the voltage comparison output 507. The delay amount t1 may readily be varied by changing the reference voltage V1.

SYNCHRONIZING PULSE GENERATING CIRCUIT

BACKGROUND OF THE INVENTION

1. Field of the Invention

The present invention relates to a synchronizing pulse generating circuit adapted for generation of synchronizing pulses (HD pulses) for use in a deflecting system of a display monitor, especially a multi-synchronization type display monitor.

2. Description of the Background Art

It is well known that a deflecting system of a multi-synchronization type display monitor requires so-called HD pulses having a width of about half of one horizontal cycle in synchronism with a horizontal synchronizing signal and having about one horizontal cycle delay from the horizontal synchronizing signal. Various restrictions are placed on the HD pulses, which will be described below.

First, the pulse width and delay amount of the HD pulses must be variable since they are to be optimum in accordance with the cycle of the horizontal synchronizing signal.

Secondly, the HD pulses require an extremely high accuracy of synchronization with the horizontal synchronizing signal. Low synchronization accuracy results in undesired, degraded picture quality.

Further, disturbances of the horizontal synchronizing signal (noises or lack of the synchronizing signal) inevitably occur on the multi-synchronization type display monitor. In such a case, the HD pulses must not be disturbed. Disturbances of the HD pulses sometimes result in breakdown of a drive transistor of the display monitor, which will be described below.

FIG. 38 is a circuit diagram of a horizontal drive circuit for the multi-synchronization type display monitor. HD pulses are applied to the base of a drive transistor. As the frequency $f_H$ of the HD pulses lowers abruptly at time t1 as shown in FIG. 39, the collector voltage $V_C$ of the drive transistor rises abruptly from $V_{C1}$ and then falls to $V_{C2}$, while a power supply voltage $V_D$ falls from $V_{D1}$ to $V_{D2}$ gently. Thus, immediately after the time t1, the drive transistor is overloaded and, in some cases, broken down.

The HD pulses arc not allowed to change suddenly upon the sudden change of the horizontal synchronizing signal input. In particular, it is significant to prevent the HD pulses from lacking when the horizontal synchronizing signal is lacking.

FIG. 40 is a circuit diagram of a conventional synchronizing pulse generating circuit used for generation of the HD pulses. Referring to FIG. 40, a synchronizing signal such as a horizontal synchronizing signal is inputted to the synchronizing pulse generating circuit at a synchronizing input terminal 501 and is then applied to a first input of a PLL circuit 502. An output 503 from the PLL circuit 502 is fed back to its second input and is also applied to a saw-tooth wave generating circuit 504. An output 505 from the saw-tooth wave generating circuit 504 is inputted to a positive input of a voltage comparator 506. The voltage comparator 506 receives a reference voltage V1 at its negative input and makes a voltage comparison between the saw-tooth wave output 505 and the reference voltage V1. An output 507 from the voltage comparator 506 is inputted to another saw-tooth wave generating circuit 508. An output 509 from the saw-tooth wave generating circuit 509 is applied to a positive input of a voltage comparator 510. The voltage comparator 510 receives a reference voltage V2 at its negative input and makes a voltage comparison between the saw-tooth wave output 509 and the reference voltage V2. An output from the voltage comparator 510 is applied to a synchronizing pulse output terminal 511 in the form of synchronizing pulses (HD pulses).

FIG. 41 is a timing chart showing the operation of the synchronizing pulse generating circuit of FIG. 40. Description will now be given on the operation of the circuit of FIG. 40 with reference to FIG. 41.

The PLL circuit 502 oscillates at about 50% duty cycle

The voltage comparison output 507 is applied to the saw-tooth wave generating circuit 508 which in turn outputs the saw-tooth wave 509 synchronized with the voltage comparison output 507. The voltage comparator 510 compares the saw-tooth wave output 509 with the reference voltage V2 to output the synchronizing pulses 511. The synchronizing pulses 511 have the delay t1 from the synchronizing input 501 and a pulse width t2. The delay amount t1 may be varied by changing the reference voltage V1 as above described, and the pulse width t2 may be varied by changing the reference voltage V2.

It is assumed that a pulse lack occurs in the synchronizing input 501 at time t3 or that noises are generated in the synchronizing input 501 at time 14. The oscillating frequency of the PLL circuit 502 gradually changes to a free-running frequency determined by the exteriorly attached resistor R and capacitor C. Thus, the PLL output 503 does not undergo a sudden change, attaining the stable synchronizing pulse output 511 regardless of the pulse lack or noises in the synchronizing input 501.

The conventional synchronizing pulse generating circuit as above constructed is characterized in that the synchronizing pulse output has the variable pulse width and delay amount and is stable if the synchronizing input is disturbed.

However, it is necessary for the conventional synchronizing pulse generating circuit to have the PLL circuit 502, two saw-tooth wave generating circuits 504, 508, two voltage comparators 506, 510 as well as the resistor R and capacitor C attached to the exterior of the PLL circuit 502, resulting in the provision of a large number of parts.

Further, the voltage comparison of the saw-tooth wave creates the problem that the accuracy is liable to deteriorate. Voltage changes in the saw-tooth waves 505, 509 and reference voltages V1, V2 varies the delay amount t1 and pulse width t2 of the synchronizing pulse output 511. This means increase in jitter components of the synchronizing pulse output 511, which is undesirable particularly when used as the HD pulses.

SUMMARY OF THE INVENTION

According to the present invention, a synchronizing pulse generating circuit comprises: a synchronizing signal input terminal receiving a synchronizing signal; synchronization lack correcting means receiving the synchronizing signal from the synchronizing signal input terminal for correcting the synchronizing signal for partial lack to generate a corrected synchronizing signal; synchronizing clock generating means receiving the corrected synchronizing signal from the synchronization lack correcting means for generating a synchronizing clock synchronized with the corrected synchronizing signal; and synchronizing pulse generating means receiving the synchronizing clock from the synchronizing clock generating means for counting the synchronizing clock to generate synchronizing pulses synchronized with the synchronizing signal.

According to the synchronizing pulse generating circuit of the present invention, the synchronizing pulses are generated by counting the synchronizing clock synchronized with the corrected synchronizing signal. This is effective in providing high-accuracy synchronizing pulses adapted when used as HD pulses by simple arrangement without particular, exteriorly attached parts.

Preferably, the synchronizing pulse generating means counts the synchronizing clock on the basis of a set value, and the synchronizing pulse generating circuit further comprises set value changing means receiving the synchronizing signal from the synchronizing signal input terminal for detecting the cycle of the synchronizing signal to change the set value in accordance with the cycle.

The set value in the synchronizing pulse generating means is changed in accordance with the cycle change of the synchronizing signal. The cycle of the synchronizing pulses can change in such a manner as to automatically follow the cycle change of the synchronizing signal.

Preferably, the synchronization lack correcting means corrects the synchronizing signal for the partial lack on the basis of a second set value, and the set value changing means changes the second set value in accordance with the detected cycle.

The set value in the synchronization lack correcting means is changed in accordance with the cycle change of the synchronizing signal. This is effective in correctly making the synchronization lack correction if the cycle of the synchronizing signal changes.

Preferably, the set value changing means outputs a cycle detection signal each time the set value changing means detects a cycle change of the synchronizing signal, and the synchronizing pulse generating circuit further comprises synchronizing pulse interrupting means receiving the cycle detection signal from the set value changing means and the synchronizing pulses from the synchronizing pulse generating means for interrupting a predetermined number of the synchronizing pulses in response to the cycle detection signal.

The predetermined number of synchronizing pulses are interrupted when the cycle of the synchronizing signal changes, preventing damages to a circuit using the synchronizing pulses due to abrupt change of the cycle of the synchronizing pulses.

According to another aspect of the present invention, the synchronizing pulse generating circuit comprises: a synchronizing signal input terminal receiving a synchronizing signal; synchronization lack correcting means receiving the synchronizing signal from the synchronizing signa input terminal for correcting the synchronizing signal for partial lack to generate a corrected synchronizing signal; separating means receiving the corrected synchronizing signal from the synchronization lack correcting means for sorting the corrected synchronizing signal into first to n-th sorted corrected synchronizing signals (n is an integer greater than one) in entry order; first to n-th synchronizing clock generating means receiving the first to n-th sorted corrected synchronizing signals from the separating means for generating first to n-th synchronizing clocks synchronized with the sorted corrected synchronizing signals, respectively; first to n-th synchronizing pulse generating means receiving the first to n-th synchronizing clocks from the first to n-th synchronizing clock generating means for counting the synchronizing clocks to generate first to n-th synchronizing pulses synchronized with the first to n-th sorted corrected synchronizing signals, respectively; and synthesizing means receiving the first to n-th synchronizing pulses from the first to n-th synchronizing pulse generating means for synthesizing the first to n-th synchronizing pulses to generate a single train of synchronizing pulses.

The first to n-th synchronizing pulses are generated by counting the first to n-th synchronizing clocks synchronized with the first to n-th sorted corrected synchronizing signals, and the single train of synchronizing pulses are generated by synthesizing the first to n-th synchronizing pulses. This is effective in providing high-accuracy synchronizing pulses adapted when used as HD pulses by simple arrangement without particular, exteriorly attached parts, as well as a large amount of delay of the synchronizing pulses from the synchronizing signal.

Preferably, the first to n-th synchronizing pulse generating means count the synchronizing clocks on the basis of respective set values, and the synchronizing pulse generating circuit further comprises set value changing means receiving the synchronizing signal from the synchronizing signal input terminal for detecting the cycle of the synchronizing signal to change the respective set values in accordance with the cycle.

The set values in the first to n-th synchronizing pulse generating means are changed in accordance with the cycle change of the synchronizing signal. The cycle of the synchronizing pulses can change in such a manner as to automatically follow the cycle change of the synchronizing signal.

Preferably, the synchronization lack correcting means corrects the synchronizing signal for the partial lack on the basis of a second set value, and the set value changing means changes the second set value in accordance with the detected cycle.

The set values in the synchronization lack correcting means are changed in accordance with the cycle change of the synchronizing signal. This is effective in correctly making the synchronization lack correction if the cycle of the synchronizing signal changes.

Preferably, the set value changing means outputs a cycle detection signal each time the set value changing means detects a cycle change of the synchronizing signal, and the synchronizing pulse generating circuit further comprises synchronizing pulse interrupting means receiving the cycle detection signal from the set value changing means and the single train of synchronizing pulses from the synthesizing means for interrupting a predetermined number of the synchronizing pulses of the single train.

The predetermined number of synchronizing pulses are interrupted when the cycle of the synchronizing signal changes, preventing damages to a circuit using the synchronizing pulses due to abrupt change of the cycle of the synchronizing pulses.

A primary object of the present invention is to provide a synchronizing pulse generating circuit which includes a small number of components without an exteriorly attached component and which is capable of generating high-accuracy synchronizing pulses with fewer jitter components.

Another object of the invention is to provide a synchronizing pulse generating circuit adapted particularly for generation of HD pulses.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 13 and 14 are timing charts showing the operation of the circuit of FIG. 12;

DESCRIPTION OF THE PREFERRED EMBODIMENTS

<<First Preferred Embodiment>>

(General Construction)

Figure 1:
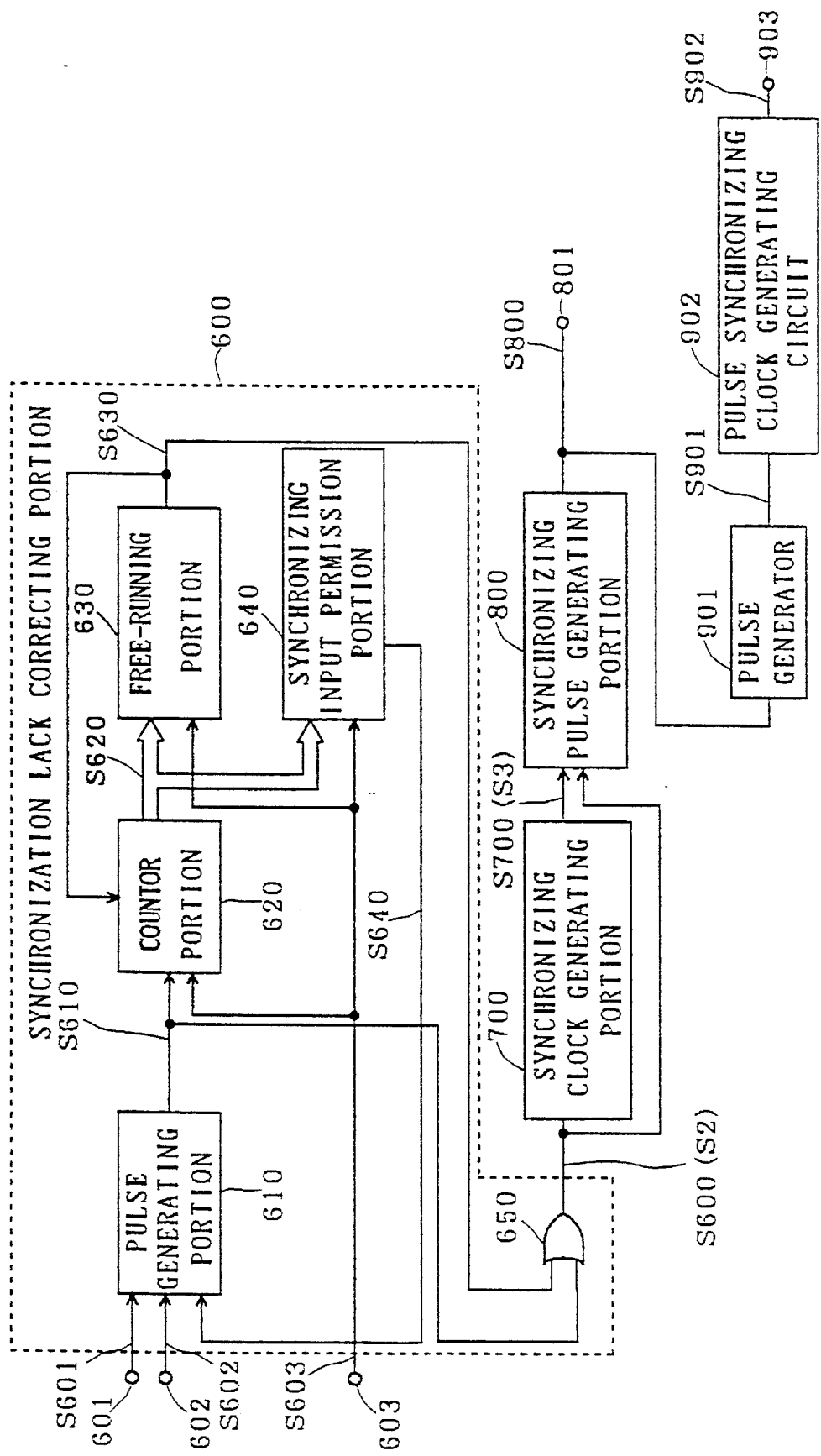
FIG. 1 is a block diagram showing the general construction of a synchronizing pulse generating circuit according to a first preferred embodiment of the present invention.

FIG. 1 is a block diagram showing the general construction of a synchronizing pulse generating circuit according to a first preferred embodiment of the present invention. The synchronizing pulse generating circuit comprises a synchronization lack correcting portion 600, a synchronizing clock generating portion 700, and a synchronizing pulse generating portion 800, as shown in FIG. 1. The synchronizing pulse generating circuit may be additionally provided with a pulse generator 901 and a pulse synchronizing clock generating circuit 902.

The synchronization lack correcting portion 600 receives a synchronizing signal S601 such as a horizontal synchronizing signal, a forcible reset signal S602, and an external clock S603 through a synchronizing input terminal 603, a reset input terminal 602, and a clock input terminal 603, respectively. The synchronization lack correcting portion 600 operates in response to the synchronizing signal S601, the forcible reset signal S602, and the external clock S603 for correcting the synchronizing signal S601 for disturbances (noises or lack of the synchronizing signal) to output a corrected synchronizing signal S600.

The synchronizing clock generating portion 700 is triggered by the corrected synchronizing signal S600 for generating a synchronizing clock S700 in high-accuracy synchronism with the corrected synchronizing signal S600.

The synchronizing pulse generating portion 800 receives the synchronizing clock S700 at its count input while receiving the corrected synchronizing signal S600 at its reset input. The synchronizing pulse generating portion 800 counts the synchronizing clock S700 to generate synchronizing pulses S800 such as HD pulses of high synchronization accuracy having variable pulse width and delay amount, which are outputted to a synchronizing pulse output terminal 801.

The pulse generator 801 detects edges of the synchronizing pulses S800 to generate edge detection pulses S901. The pulse synchronizing clock generating circuit 802 generates a clock synchronized with the edge detection pulses S901 to output the clock in the form of a pulse synchronism clock S902 to a clock output terminal 903.

A synchronizing signal reproducing device disclosed in Japanese Patent Publication No. 61-28188 may be employed as the synchronization lack correcting portion 600. The synchronizing signal reproducing device, however, has drawbacks to be described below. The first drawback is a mode which causes malfunctions. The second drawback is the need for a PLL circuit as a clock oscillator circuit. The third drawback is that the device is not permitted to provide a reproduced signal which is one or more cycle delayed from the synchronizing signal. For this reason, it is desirable to use the synchronization lack correcting portion 600 constructed as shown in FIG. 1.

Circuits disclosed in Japanese Patent Publications No. 63-41466 and No. 61-11018 may be employed as the synchronizing clock generating portion 700. These background art circuits find considerable application in an optical scanning printing system. In the application, it is sufficient that, if the cycle of the synchronizing signal is disturbed, the circuits operate with the cycle disturbed. These applications of the background art are not intended for connection with such a circuit as the synchronization lack correcting portion 600 for correcting the synchronizing signal for disturbances. The present invention is directed to the achievement of the synchronizing pulse generating circuit well adapted for generation of HD pulses (synchronizing pulses) for use in a deflecting system of a multi-synchronization type display monitor by the combination of the synchronization lack correcting portion 600 and synchronizing clock generating portion 700 as well as the synchronizing pulse generating portion 800. Preferably, the synchronizing clock generating portion 700 to be described later in detail is used in the present invention.

(Synchronization Lack Correcting Portion 60)

The synchronization lack correcting portion 600 shown in FIG. 1 includes a pulse generating portion 610, a counter portion 620, a free-running portion 630, a synchronizing input permission portion 640, and an OR gate 650.

The pulse generating portion 610 is placed into a pulse generable state by a synchronizing input permission signal S640 from the synchronizing input permission portion 640 and generates pulses S610 in response to the synchronizing signal S601 from the synchronizing input terminal 601. The pulse generating portion 610 is reset in response to the forcible reset signal S602 from the reset input terminal 602.

The counter portion 620 receives the pulses S610 from the pulse generating portion 610 in the form of a reset signal and counts the external clock S603 from the clock input terminal 603. Load pulses S630 from the free-running portion 630 are applied to the counter portion 620 in the form of a loading instruction. The counter portion 620 acts as a counter with load to output a count signal S62.

The free-running portion 630 is synchronized with the external clock S603 from the clock input terminal 603 for detecting whether or not the count signal S620 from the counter portion 620 reaches a predetermined value. When it reaches the predetermined value, the free-running portion 630 outputs the load pulses S630.

The synchronizing input permission portion 640 is synchronized with the external clock S603 from the clock input terminal 603 for detecting whether or not the count signal S620 from the counter portion 620 falls within a range between predetermined first and second values which are not more than the predetermined value. When it docs, the synchronizing input permission portion 640 outputs the synchronizing input permission signal S640.

The OR gate 650 is a two-input OR gate receiving the pulses S610 from the pulse generating portion 610 and the load pulses S630 from the free-running portion 630. The output signal from the OR gate 650 is outputted in the form of the output signal from the synchronization lack correcting portion 600 or the corrected synchronizing signal S600.

Figure 2:
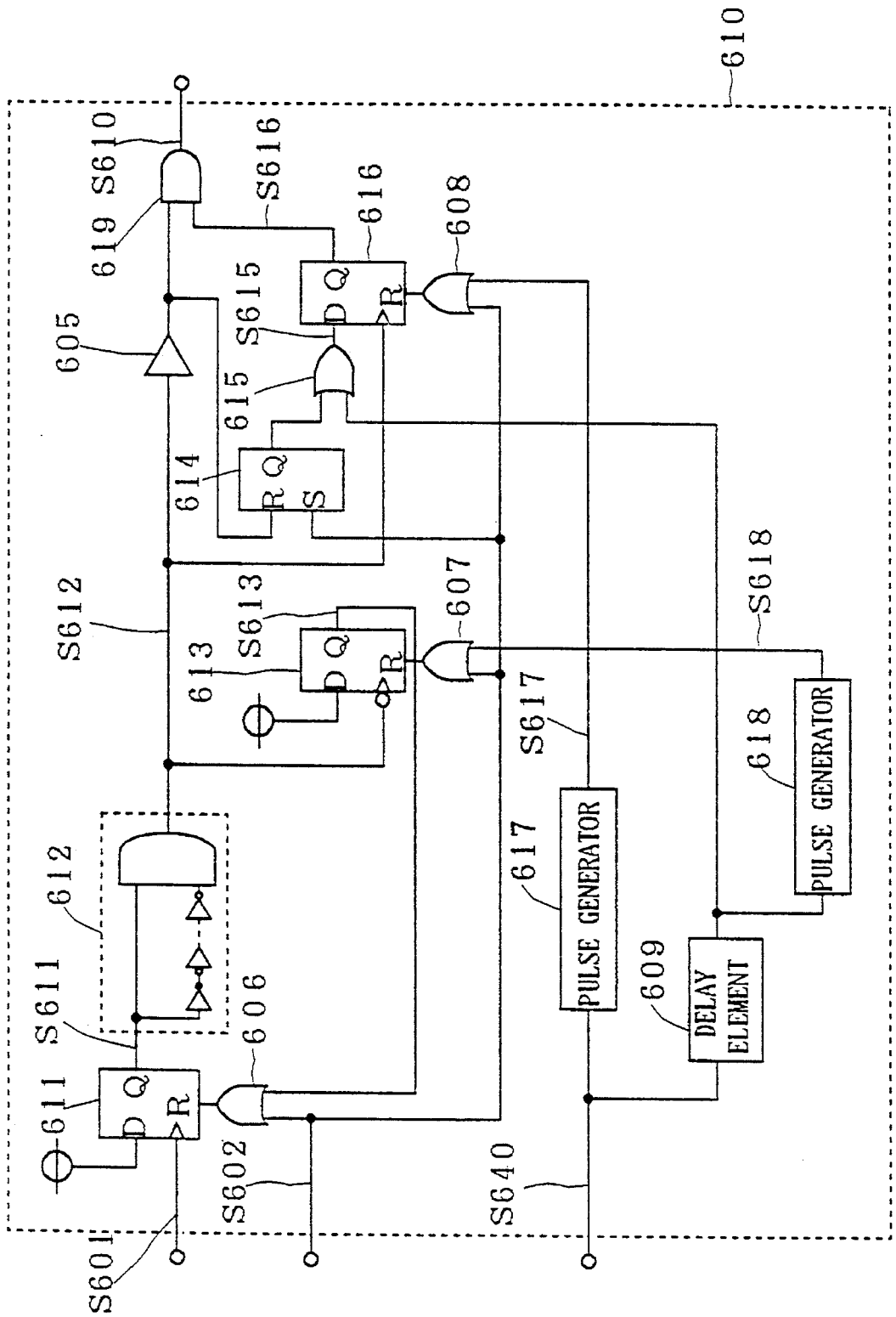
FIG. 2 is a block diagram of an exemplary arrangement of a pulse generating portion.

FIG. 2 is a block diagram showing an exemplary arrangement of the pulse generating portion 610. The synchronizing signal S601 is applied to a positive-edge trigger D flip-flop 611 with reset in the form of a trigger signal. The data input terminal D of the D flip-flop 611 is fixed to "H", and the reset input terminal R thereof receives the output signal from an OR gate 606. The OR gate 606 is a two-input OR gate receiving the forcible reset signal S602 and an output signal S613 from a D flip-flop 613. An output signal S611 from the data output terminal Q of the D flip-flop 611 is applied to a pulse generator 612. The pulse generator 612 generates pulses of a predetermined width in synchronism with the rising of the signal S611.

The synchronizing input permission signal S640 is directly applied to a pulse generator 617 and is also applied to a pulse generator 618 through a delay element 609. The pulse generators 617, 618 are similar in construction to the pulse generator 612. The pulse element 612 generates pulses of a predetermined width in synchronism with the rising of the signal S611.

The synchronizing input permission signal S640 is applied directly to a pulse generator 617 and is also applied to a pulse generator 618 through a delay element 609. The pulse generators 617, 618 are similar in construction to the pulse generator 612. The pulse generator 617 generates pulses of a predetermined width in synchronism with the rising of the synchronizing input permission signal S640. The pulse generator 618 generates pulses of a predetermined width in synchronism with the rising of the synchronizing input permission signal S640 delayed by the delay element 609.

The negative-edge trigger D flip-flop 613 with reset receives an output signal S612 from the pulse generator 612 in the form of a trigger signal. The data input terminal of the D flip-flop 613 is fixed to "H", and the reset input terminal R thereof receives the output signal from an OR gate 607. The OR gate 607 is a two-input OR gate receiving the forcible reset signal S602 and an output signal S618 from the pulse generator 618. The output signal S613 is outputted from the data output terminal Q of the D flip-flop 613.

An RS flip-flop 614 has a reset input R receiving a signal provided by adding delay to the output signal S612 of the pulse generator 612 by a delay element 605, and a set input S receiving the forcible reset signal S602. An output signal from the output terminal Q of the RS flip-flop 614 is applied to a first input of a two-input OR gate 615. The synchronizing input permission signal S640 delayed by the delay element 609 is applied to a second input of the two-input OR gate 615. An output signal S615 from the OR gate 615 is applied to the data input terminal D of a positive-edge trigger D flip-flop 616 with reset. The D flip-flop 616 has a trigger input terminal receiving the output signal S612 from the pulse generator 612, and a reset input terminal R receiving the output signal from an OR gate 608. The OR gate 608 is a two-input OR gate receiving the forcible reset signal S602 and an output signal S617 from the pulse generator 617. An output signal S616 is outputted from the data output terminal Q of the D flip-flop 616.

An AND gate 619 is a two-input AND gate receiving a signal provided by adding delay to the output signal of the pulse generator 612 by the delay element 605 and the output signal S616 from the D flip-flop 616. An output signal from the AND gate 619 is outputted in the form of the output pulses S610 from the pulse generating portion 610.

Figure 3:
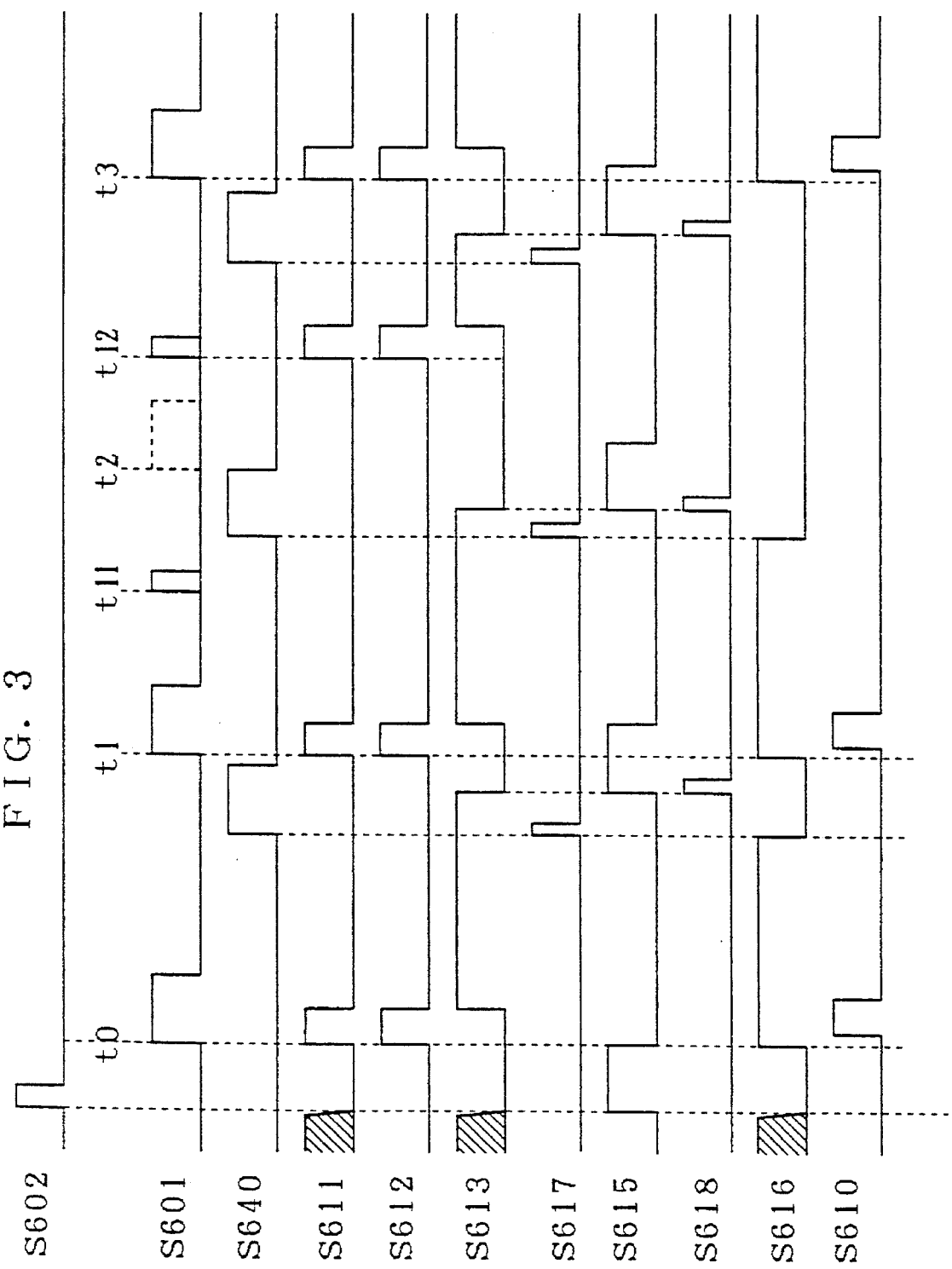
FIG. 3 is a timing chart showing the operation of the pulse generating portion.

FIG. 3 is a timing chart showing the operation of the pulse generating portion 610 of FIG. 2. In FIG. 3, shaded portions indicate an indefinite state. The forcible reset signal S602 is applied as required at the initialization of pulse generation, for example, immediately after the power is applied or when the cycle of the synchronizing signal to be inputted is changed. The synchronizing signal S601 may be a horizontal synchronizing signal to be applied to the multi-synchronization type display monitor. In such a case, the synchronizing signal S601 is inputted normally in a constant cycle, but the constant periodicity is disturbed in a vertical synchronization period and in changing the cycle of the horizontal synchronizing signal, resulting in lack of synchronization or noises.

The synchronizing input permission signal S640 is generated by the synchronizing input permission portion 640, which is described later in detail. In the time period of generation of the synchronizing input permission signal S640, the signal S615 is designed to rise within the time interval between one pulse input of the synchronizing signal S610 and the next expected pulse input thereof, and to fall after the latter input. The signal S615 acts as an acceptance signal for the signal S612 generated in synchronism with the synchronizing signal S601.

After the input of the forcible reset signal S602, the acceptance of the first pulse of the synchronizing signal S601 is executed by the RS flip-flop 614 functioning to raise the signal S615. At initialization, the forcible reset signal S602 resets the D flip-flops 611, 613, 616 and sets the RS flip-flop 614. Thus, the output pulses S610 are generated, with the input of the synchronizing input permission signal S640 being at least in corresponding relation to the synchronizing signal S601 at time t0.

The synchronizing signal S601 at time t1 changes the output signal S611 of the D flip-flop 611 from "L" to "H". In response to the change, the pulse generator 612 generates the pulse S612. The output signal S613 of the D flip-flop 613 changes from "L" to "H" in response to the falling of the pulse S612, whereby the D flip-flop 611 is reset. The output signal S613 from the D flip-flop 613 holds "H" until the output pulse S618 of the pulse generator 618 produced based on the synchronizing input permission signal S640 is given. The D flip-flop 611 maintains the reset state during "H" period of the output signal S613. Thus, the D flip-flop 611 can ignore noises of the synchronizing signal S601 (generated at time t11) which occur before the output pulse S618 of the pulse generator 618 is generated.

The output pulse S612 of the pulse generator 612 is applied to the trigger input terminal of the D flip-flop 616 during the "H" period of the signal S615 at the data input terminal D of the D flip-flop 616. In response to the application, the output signal S616 of the D flip-flop 616 changes from "L" to "H". Then the AND gate 619 enters a through state, and the signal provided by adding the predetermined time delay to the pulses S612 by the delay element 605 is outputted from the AND gate 619 in the form of the output pulse S610. The output pulse S610 is synchronized with the synchronizing signal S601 generated at time t1, ignoring the noise generated at time t11.

If lack (synchronization lack) of the synchronizing signal S601 occurs at time t2, the output signal S611 of the D flip-flop 611 and the output pulses S612 of the pulse element 612 hold "L". The output pulses S610 accordingly maintains "L". It will be appreciated that the output pulse S610 is also lacking when the synchronization lack occurs.

It is assumed that a noise is inputted at time t12 immediately after the synchronization lack. The signals S611, S612, S613 change in the same manner as those do when the normal synchronization signal is inputted at time t1. However, since the synchronizing input permission signal S640 is not "H", the signal S615 given to the data input terminal D of the D flip-flop 616 is not "H", and the output signal S616 of the D flip-flop 616 holds "L". Then the AND gate 619 is still off, and the pulses S612 are not propagated in the form of the output pulses S610. The noise immediately after the synchronization lack is ignored.

As the normal synchronizing signal S601 is inputted at time t3 after the synchronization lack, all of the signals change in the same manner as those do when the synchronizing signal is inputted at time t1. This enables the output pulses S610 to be outputted in synchronism with the synchronizing signal S601 generated at time t3.

It will be appreciated that the output pulses S610 are provided only when the synchronizing signal S601 is inputted which is generated during a predetermined time period determined based on the synchronizing input permission signal S640 (during the time the synchronizing signal is expected to be inputted).

The delay element 609 is provided for timing the reset input R and data input D of the D flip-flop 616. The delay amount of the delay element 609 is previously established such that the signal S615 applied to the data input D changed from "L" to "H" after the pulses S617 applied to the reset input R have completely changed from "L" to "H" and then to "L".

Figure 4:
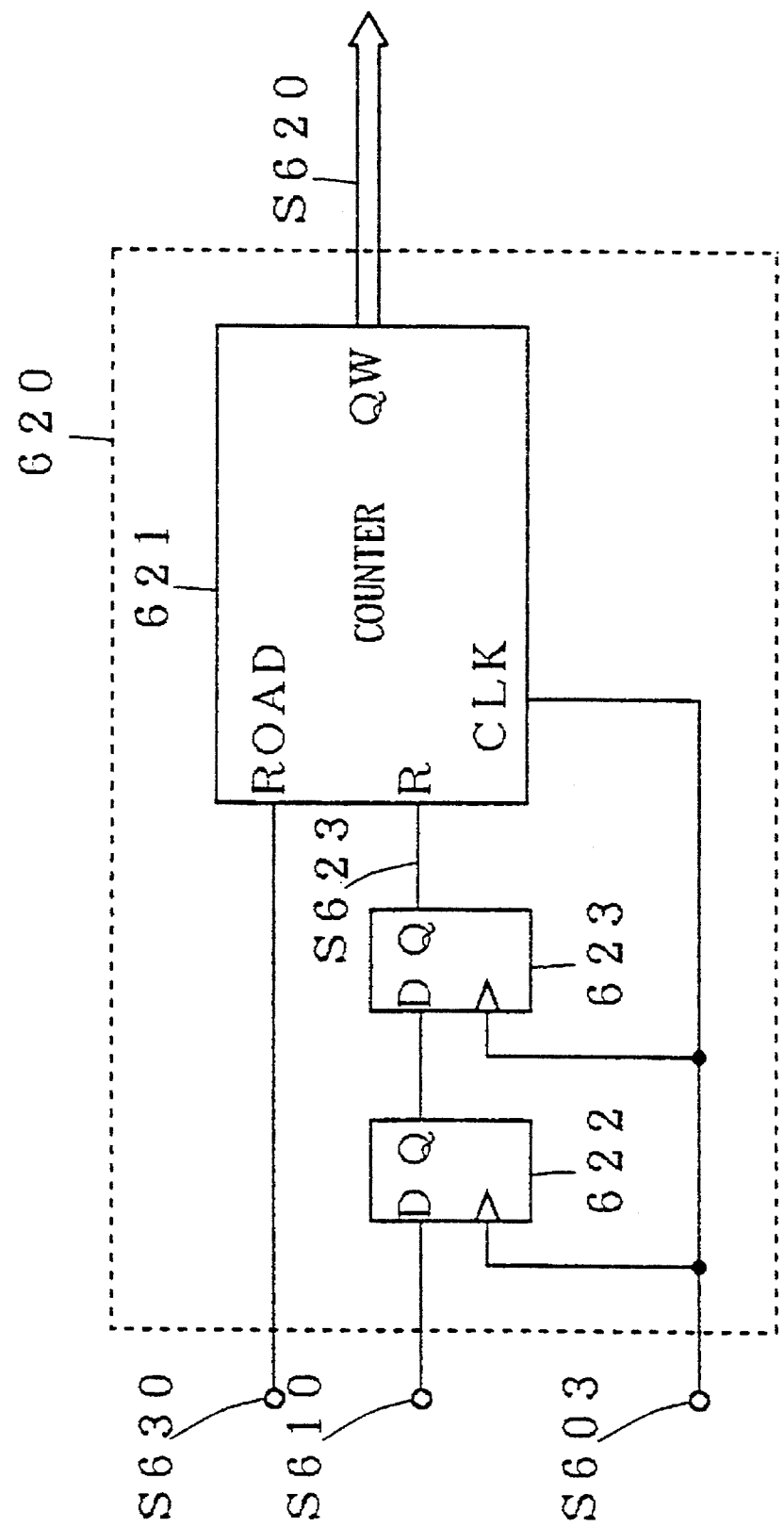
FIG. 4 is a block diagram of an exemplary arrangement of a counter portion.

FIG. 4 is a block diagram showing an exemplary arrangement of the counter portion 620 of FIG. 1. The counter portion 620 includes a counter 621 with load, and positive-edge trigger D flip-flops 622, 623. The output pulses S610 from the pulse generating portion 610 are applied to the data input terminal D of the D flip-flop 622. An output signal from the data output terminal Q of the D flip-flop 622 is applied to the data input terminal D of the D flip-flop 623. An output signal S623 from the data output terminal Q of the D flip-flop 623 is applied to the reset input terminal R of the counter 621. The D flip-flops 692 623 and the counter 621 receive the external clock S603 in the form of a trigger or timing signal. The load pulses S630 from the free-running portion 630 are applied to the load input terminal ROAD of the counter 621. The count signal S620 is outputted from the count output terminal QW of the counter 621.

In operation, the counter 621 sequentially counts up in response to the external clock S603. The output pulses S610 from the pulse generator 610 are completely synchronized with the external clock S603 by the two D flip-flops 622, 623, and are in turn applied to the reset input terminal R of the counter 621 in the form of the reset signal S623, thereby to rest the counter 621. The D flip-flops 622 623 function to prevent the unstable operation of the counter 621 due to signal timing shifts. On receipt of the load pulses S630, the counter 621 is loaded with a predetermined value. The count in the foregoing operation is outputted in the form of the count signal S620.

Figure 5:
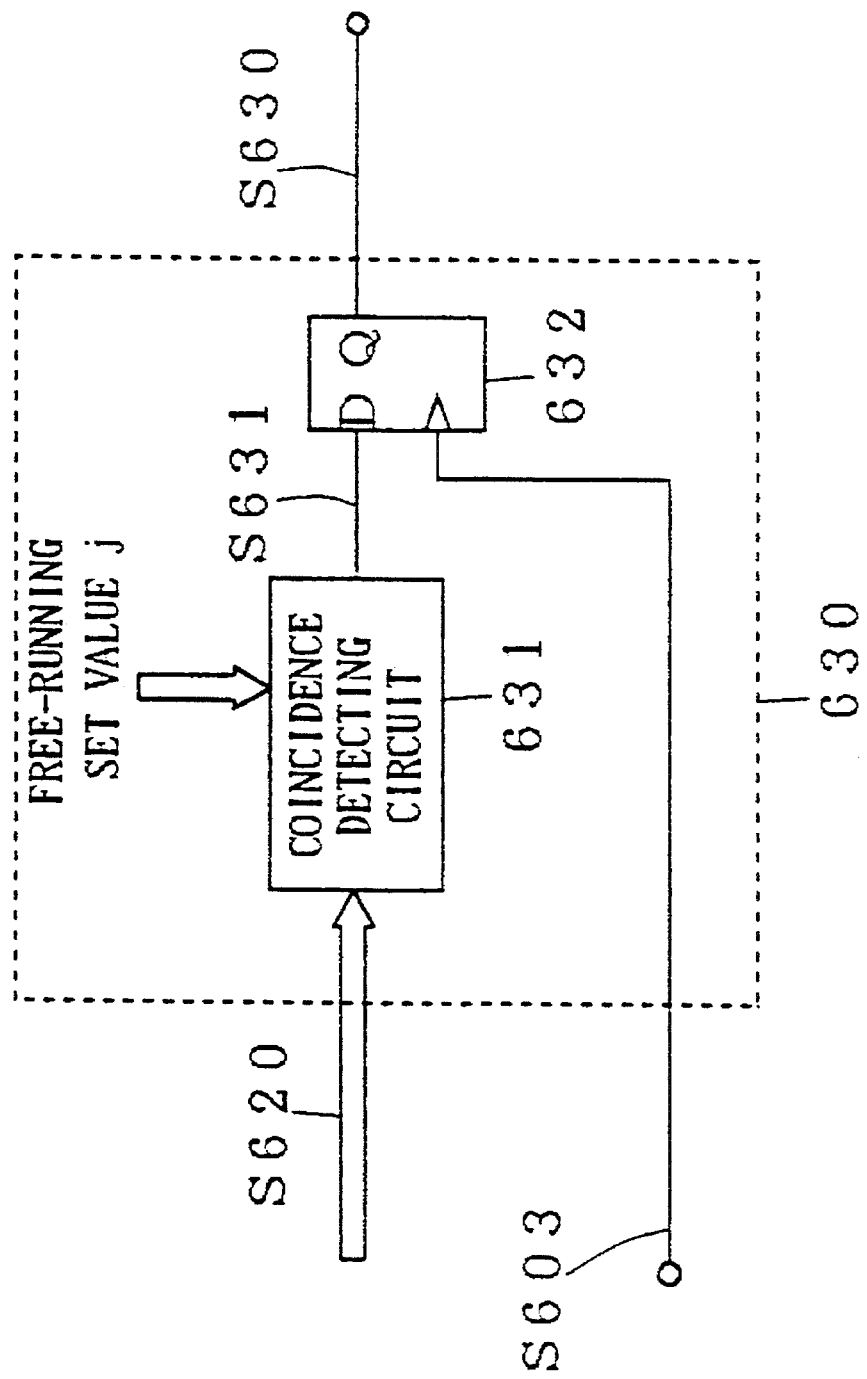
FIG. 5 is a block diagram of an exemplary arrangement of a free-running portion.

FIG. 5 is a block diagram showing an exemplary arrangement of the free-running portion 630 of FIG. 1. The free-running portion 630 includes a coincidence detecting circuit 631 and a positive-edge trigger D flip-flop 632. The count signal S620 from the counter portion 620 is applied to the coincidence detecting circuit 631. A pre-set free-running set value j is also applied to the coincidence detecting circuit 631. The coincidence detecting circuit 631 compares the count signal S620 with the free-running set value j to output an "H" coincidence detection signal S631 when both of them coincide. The coincide detection signal S631 is applied to the data input terminal D of the D flip-flop 632. The external clock S603 is applied to the trigger input of the D flip-flop 632. The D flip-flop 632 synchronizes the coincidence detection signal S631 with the external clock S603 and outputs it at its data output terminal Q in the form of the load pulses S630.

As above described, the counter portion 620 of FIG. 1 starts counting from the predetermined load value in response to the load pulses S630. Upon normal input of the synchronizing signal S601, the counter portion 620 is reset by the output pulses S610 from the pulse generating portion 610 before response to the load pulses S630. In the case of lack (synchronization lack) of the synchronizing signal S601, the counter portion 620 is loaded with the predetermined load value by the load pulses S630 in anticipation of being unreset. The free-running set value j should be established such that the cycle produced by the load pulses S630 is approximately equal to the expected cycle of the synchronizing signal S601 when no reset input is applied to the counter portion 620 in a loop circuit including the counter portion 620 and the free-running portion 630.

Figure 6:
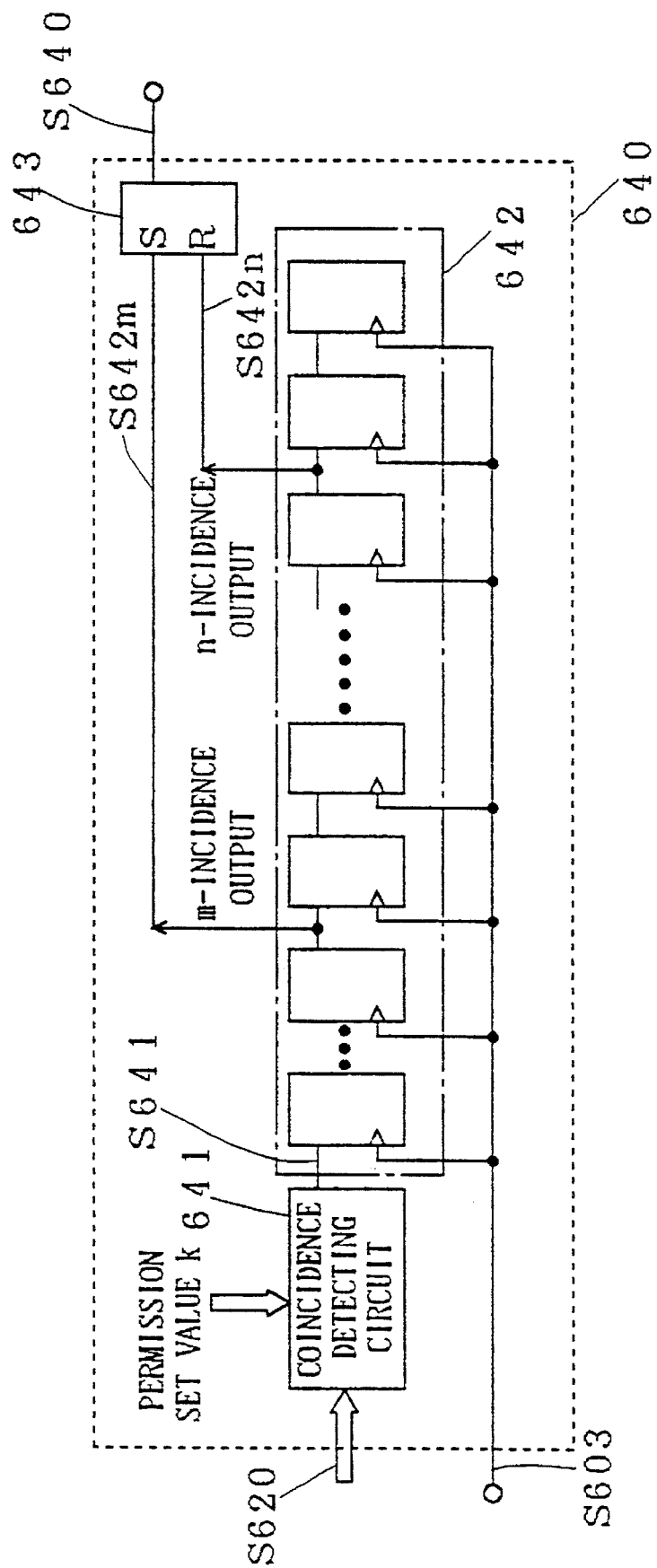
FIG. 6 is a block diagram of an exemplary arrangement of a synchronizing input permission portion.

FIG. 6 is a block diagram showing an exemplary arrangement of the synchronizing input permission portion 640 of FIG. 1. The synchronizing input permission portion 640 includes a coincidence detecting circuit 641, a shift register 642, and an RS flip-flop 643. The count signal S620 from the counter portion 620 is applied to the coincidence detecting circuit 641. A pre-set permission set value k is also applied to the coincidence detecting circuit 641. The coincidence detecting circuit 641 compares the count signal S620 with the permission set value k to output an "H" coincidence detection signal S641 when both of them coincide. The coincidence detection signal S641 is applied to the data input terminal of the shift register 642.

The shift register 642 includes a multiplicity of connected data latches triggered by the external clock S603 into operation. The shift register 642 sequentially shifts the coincidence detection signal S641 from a data latch to the next data latch in synchronism with the external clock S603. The shift register 642 has respective tap output signals including an m-coincidence output signal S642m and an n-coincidence output signal S642n corresponding to the counts m and n of the count signal S620, the m-coincidence output signal S642m and n-coincidence output signal S642n being applied to the set input terminal S and reset input terminal R of the RS flip-flop 643, respectively. The counter 642, if an up-counter, satisfies the relation k<m<n.

The RS flip-flop 643 is set by the m-coincidence output signal S642m and is reset by the n-coincidence output signal S642n. Then the synchronizing input permission signal S640 is derived from the output terminal of the RS flip-flop 643. In the first preferred embodiment of the present invention, the synchronizing input permission signal S640 is the pulses which go high for m-incidence and return low for n-incidence. The synchronizing input permission signal S640 is impressed upon the pulse generating portion 610, as above described.

Figure 7:
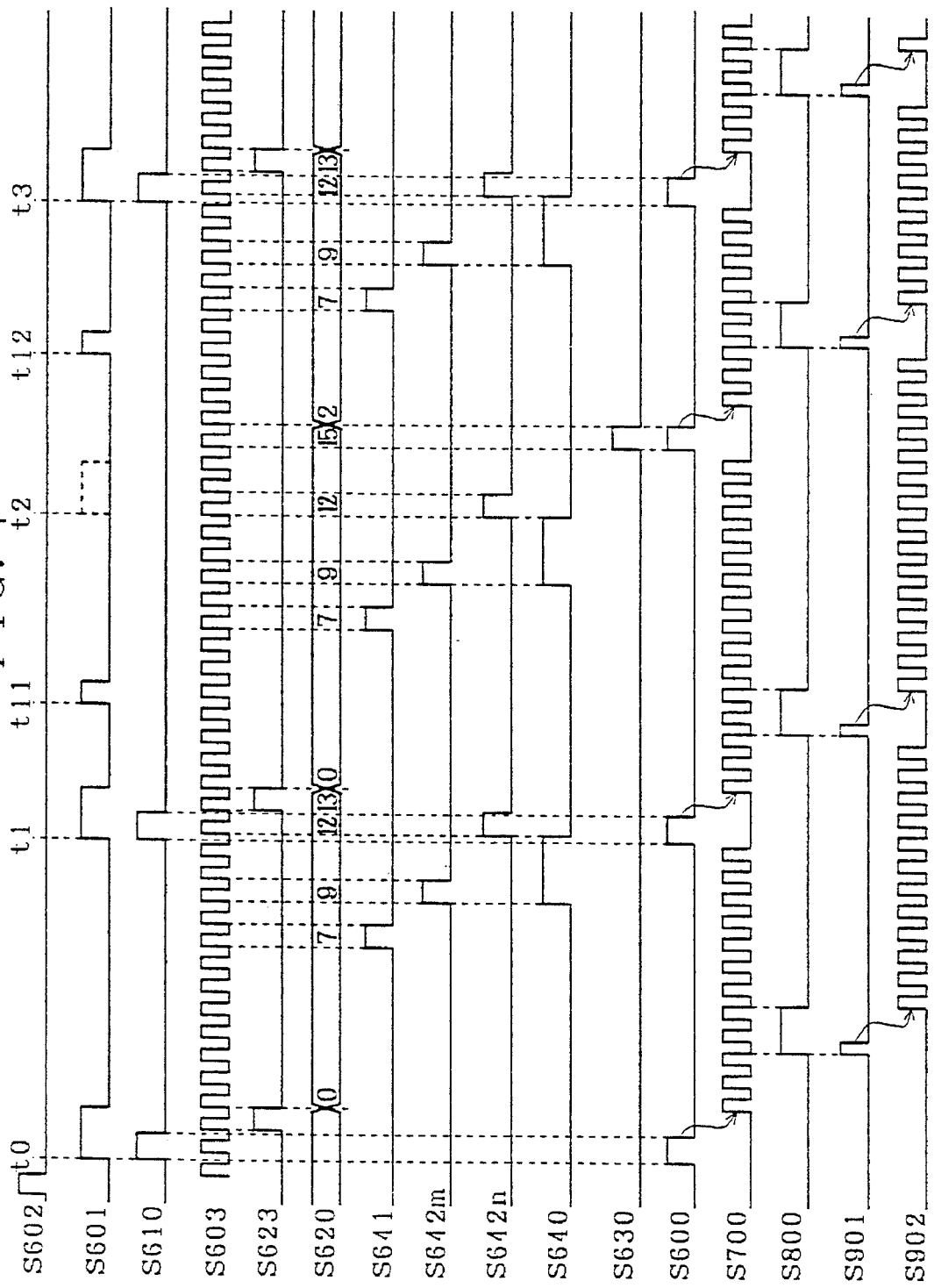
FIG. 7 is a timing chart showing the general operation of the synchronizing pulse generating circuit.

FIG. 7 is a timing chart showing the general operation of the synchronizing pulse generating circuit of FIG. 1. The general operation of the above-mentioned synchronization lack correcting portion 600 in the synchronizing pulse generating circuit of FIG. 1 will be described hereinafter with reference to FIG. 7. The operation of the other portions will be discussed subsequently.

For purposes of simplification, the counter portion 620 is an up-counter, and the number of external clocks S603 in one cycle of the synchronizing signal S601 is 14. Further, the free-running set value j (FIG. 5) for the free-running portion 630 is 14, the load value for the counter portion 620 is 2, and the respective set values k, m, n (FIG. 6) for the synchronizing input permission portion 640 are 7, 9, 12, respectively.

In response to the input of the synchronizing signal S601 at time t0 immediately after the forcible reset signal S602, the output pulse S610 is derived from the pulse generating portion 610, as above described. The pulse S610 is outputted from the synchronization lack correcting portion 600 through the OR gate 650 in the form of the corrected synchronizing signal S600.

The pulse S610 is synchronized with the external clock S603 by the D flip-flops 622, 623 in the counter portion 620 and is then applied to the counter 621 in the form of the reset signal S623. The counter 621 is reset to zero and counts up sequentially in synchronism with the external clock S603. The count content is outputted from the counter portion 620 in the form of the count signal S620.

In the synchronizing input permission portion 640, the coincidence detecting circuit 641 outputs the coincidence detection signal S641 when the count signal S620 coincides with "7". The coincidence detection signal S641 is propagated sequentially within the shift register 642 which in turn outputs the m-coincidence output signal S642m and n-coincidence output signal S642n in response to the count signal S620 of "9" and "12", respectively. The RS flip-flop 643 outputs the synchronizing input permission signal S640 in response to the signals S642m and S642n. The synchronizing input permission signal S640 rises to "H" when the count signal S620 is "9", and falls to "L" when the count signal S620 is "12".

The synchronizing input permission signal S640 functions to introduce the synchronizing signal S601 at time t1 into the pulse generating portion 610. The synchronizing signal S601 at time t1 is valid since the synchronizing input permission signal S640 is "H" and, consequently, the pulse generating portion 610 generates the pulse S610 as above described. The pulse S61 is outputted through the OR gate 650 in the form of the corrected synchronizing signal S600. In response to the pulse S610, the reset signal S623 is generated in the counter portion 620, the counter 621 being reset to count up from zero.

As described with reference to FIG. 3, no output pulses S610 of the pulse generating portion 610 are generated in response to the noises at times t11 and t12. Thus the operation of the synchronization lack correcting portion 600 is unchanged as shown in FIG. 7.

As described with reference to FIG. 3, no output pulses S610 of the pulse generating portion 610 are generated in response to the lack (synchronization lack) of the synchronizing signal S601 at time t2. The counter 621 of the counter portion 620 is not reset because of the absence of the pulses S610 but continues counting up. The coincidence detecting circuit 631 in the free-running portion 630 outputs the "H" coincidence detection signal S631 upon the count signal S620 of "14". As a result, the D flip-flop 632 outputs the load pulse S630 in synchronism with the next external clock S603 while the count signal S620 is "15".

The load pulse S630 is derived from the synchronization lack correcting portion 600 through the OR gate 650 in the form of the corrected synchronizing signal S600. The synchronization lack at time t2 is corrected in this manner. The load pulse S630 is also applied to the load input terminal ROAD of the counter 621 in the counter portion 620, and the counter 621 is loaded with a predetermined value "2" in response to the load pulse S630. The counter 621 counts up sequentially from 2 after the release of the load pulse S630. The same operation is performed in response to the normal input of the synchronizing signal S601 at time t3.

As above discussed, when the synchronizing signal S601 is entered in the normal cycle, the output pulses S610 of the pulse generating portion 610 generated in response to the synchronizing signal S601 are outputted in the form of the corrected synchronizing signal S600. The synchronizing input permission signal S640 holding "L" prevents the acceptance of noises generated between the inputs of the normal synchronizing signal S601. For the lack of the synchronizing signal S601, the load pulses S630 generated in the free-running portion 630 are outputted in the form of the corrected synchronizing signal S600. The corrected synchronizing signal S600 is thus provided in which the synchronizing signal S601 is corrected for the disturbances (noises or lack of the synchronizing signal), if produced.

The corrected synchronizing signal S600 corresponding to the normal synchronizing signal S601 is outputted when the count signal S620 is about "12", whereas the corrected synchronizing signal S600 corresponding to the synchronization lack is outputted when the count signal S620 is "15". The corrected synchronizing signal S600 after the synchronization lack has some delay from the normal cycle. The variation rate of cycle can be minimized if the cycle of the synchronizing signal S601 is sufficiently longer than the cycle of the external clock S603.

(Synchronizing Clock Generating Portion 700)

Figure 8:
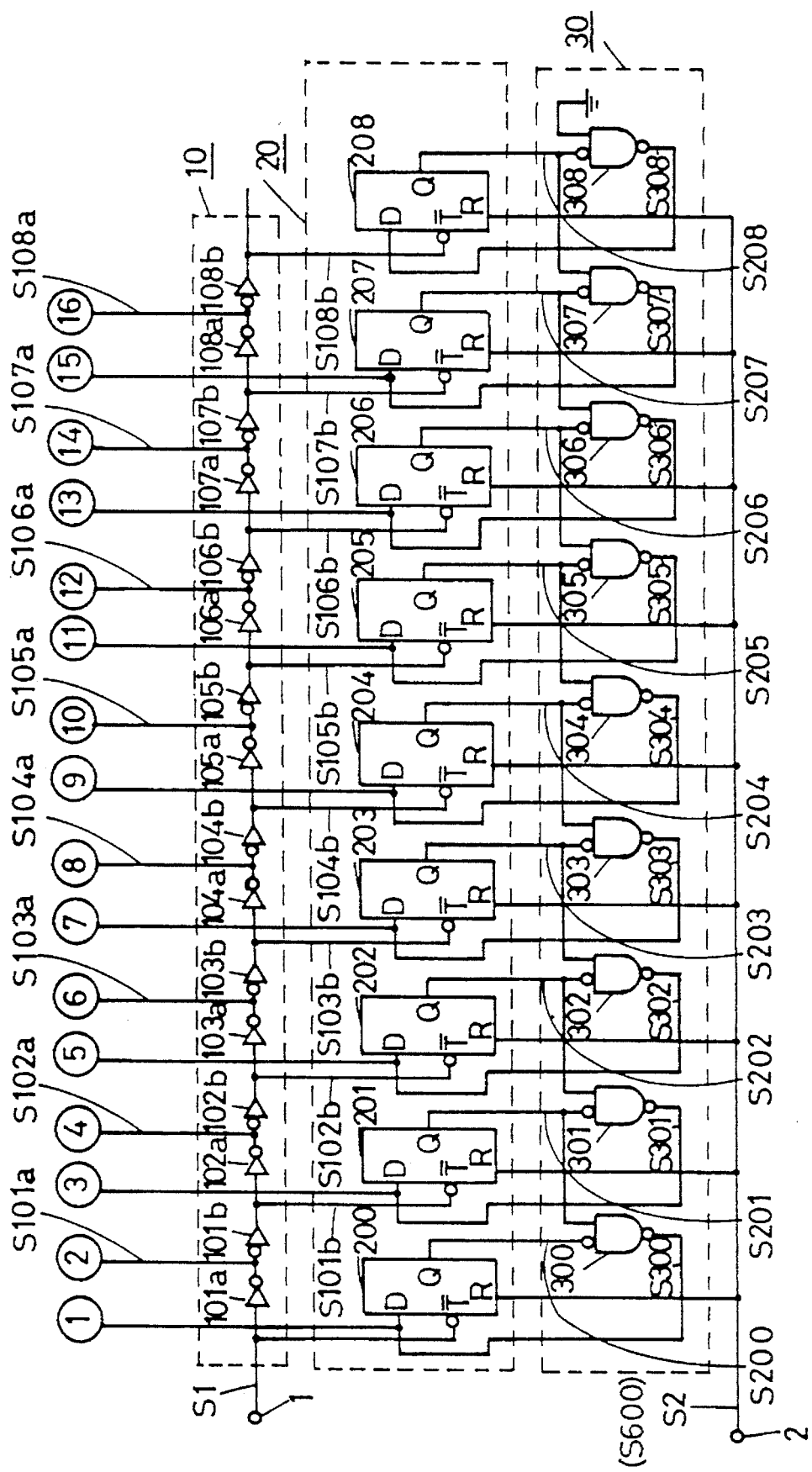
FIGS. 8 and 9 are circuit diagrams of a synchronizing clock generating portion of the first preferred embodiment.
Figure 9:
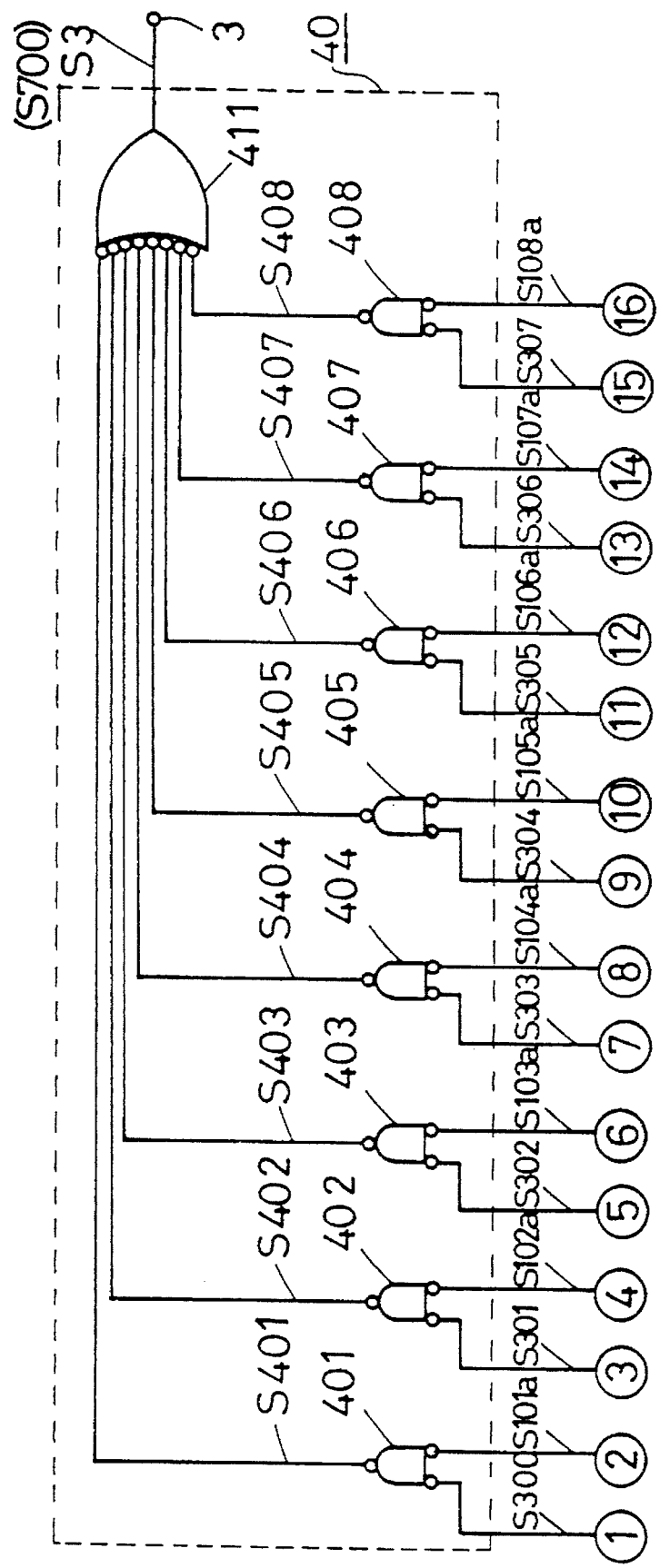

FIGS. 8 and 9 are circuit diagrams showing a first arrangement of the synchronizing clock generating portion 700 of FIG. 1. As shown in FIGS. 8 and 9, a reference clock input terminal 1 is connected sequentially to inverting delay elements 101a to 108a in a delay clock generating circuit 10 in such a manner that the reference clock input terminal 1 is connected to the input terminal of the inverting delay element 101a and the output terminal of the inverting delay element 101a is connected to the input terminal of the inverting delay element 101b.

The reference clock input terminal 1 and the output terminals of the inverting delay elements 101b to 108b are connected respectively to the negative logic timing signal input terminals $\overline{T}$ of D flip-flops 200 to 208 in a memory circuit 20.

The output terminals Q of the D flip-flops 200 to 208 are connected respectively to the negative logic input terminals of NAND circuits 300 to 308 in a phase detecting circuit 30, and the output terminals Q of the D flip-flops 201 to 208 are connected respectively to the positive logic input terminals of the NAND circuits 300 to 307 in the phase detecting circuit 30. The positive logic input terminal of the NAND circuit 308 is grounded.

The negative logic output terminals of the NAND circuits 300 to 308 are connected respectively to the data input terminals D of the D flip-flops 200 to 208, and the output terminals of the NAND circuits 300 to 307 are connected respectively to first negative logic input terminals of OR circuits 401 to 408 in a clock selecting circuit 40. (An AND circuit having inputs and outputs all of which are of negative logic is equivalent to an OR circuit according to the De Morgan theorem.)

Second negative logic input terminals of the OR circuits 401 to 408 are connected respectively to the output terminals of the inverting delay elements 101a to 108a in the delay clock generating circuit 10, and the negative logic output terminals of the OR circuits 401 to 408 are connected to the input terminal of an eight-input NAND circuit 411. (An OR circuit having inputs all of which are of negative logic is equivalent to an NAND circuit according to the De Morgan theorem.) The output terminal of the NAND circuit 411 is connected to a synchronizing clock output terminal 3.

An asynchronous signal input terminal 2 is connected to the reset input terminals R of the D flip-flops 200 to 208 in the memory circuit 20. The corrected synchronizing signal S600 from the synchronization lack correcting portion 600 of FIG. 1 is applied to the asynchronous signal input terminal 2 in the form of an asynchronous input signal S2. The term "asynchronous" means that the corrected synchronizing signal S600 is inputted asynchronously independently of a reference clock S1 applied to the reference cock input terminal 1.

Figure 10:
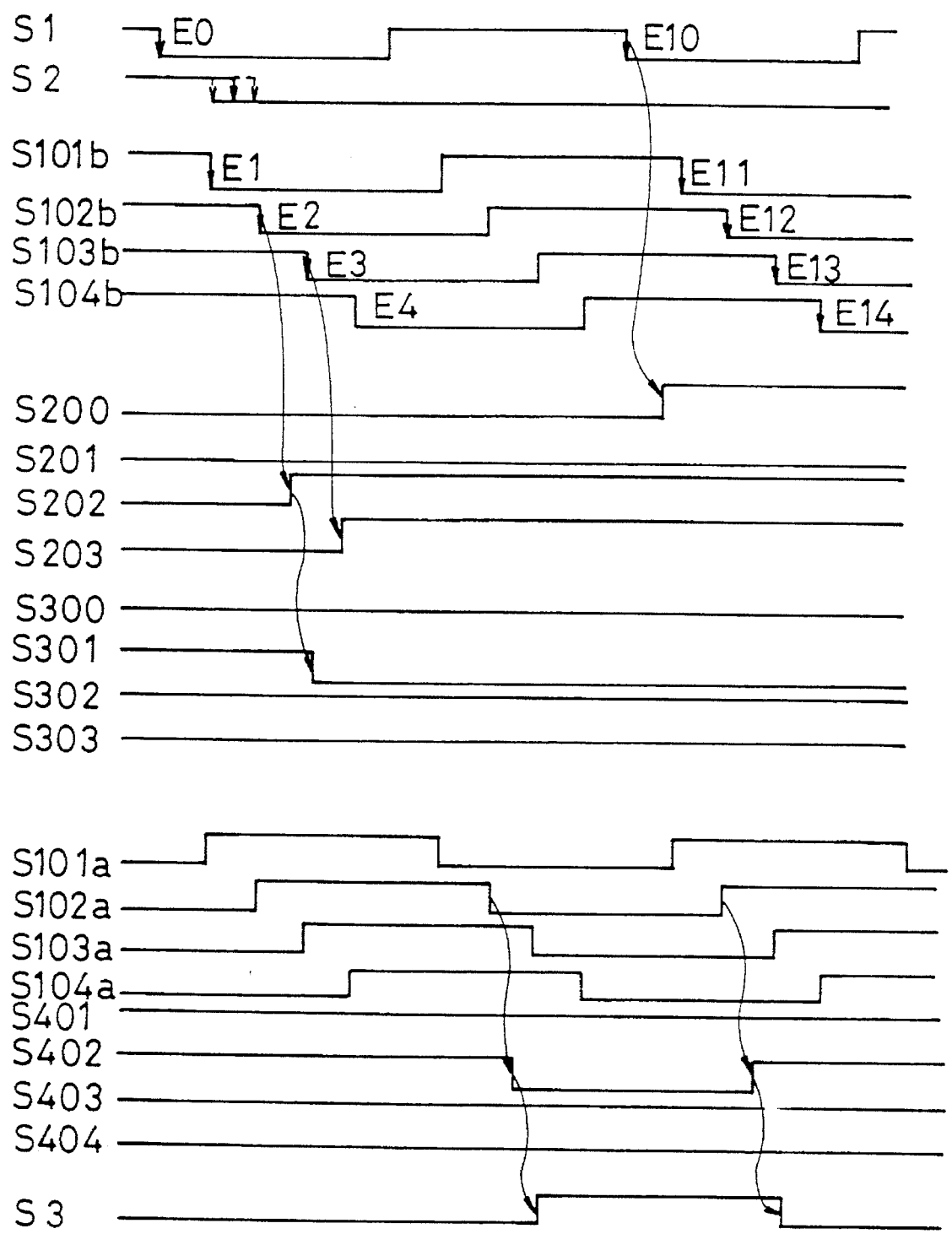
FIG. 10 is a timing chart showing the operation of the synchronizing clock generating portion.

Operation will be discussed below. FIG. 10 is a timing chart showing the operation of the circuit of FIGS. 8 and 9. Omitted from the timing chart of FIG. 10 are signals S105a to S108b outputted from the inverting delay elements 105a to 108b in the delay clock generating circuit 10, signals S204 to S208 outputted from the respective output terminals Q of the D flip-flops 204 to 208 in the memory circuit 20, signals S304 to S308 outputted from the NAND circuits 304 to 308 in the phase detecting circuit 30, and signals S405 to S408 outputted from the OR circuits 405 to 408 in the clock selecting circuit 40.

The reference clock S1 as shown is inputted from the reference clock input terminal 1 and is then inverted and delayed sequentially by the inverting delay element 101a to 108b. The inverting delay elements 101a to 108a output inverted delay clocks S101a to S108a, and the inverting delay elements 101b to 108b output non-inverted delay clocks S101b to S108b, respectively.

During the "H" period of the asynchronous input signal S2 inputted from the asynchronous signal input terminal 2, the D flip-flops 200 to 208 are in the reset state and signals S200 to S208 outputted from their output terminals Q are "L".

The signals applied to the negative logic input terminals and positive logic input terminals of the NAND circuits 3 to 308 are both "L". The NAND circuits 300 to 308 at their output terminals output "H" signals S300 to S308, which are applied to the data input terminals D of the D flip-flops 200 to 208, respectively.

Assuming that the asynchronous input signal S2 from the asynchronous signal input terminal 2 falls from "H" to "L" at a time shown in FIG. 10, the reset signal input terminals R of the D flip-flops 200 to 208 in the memory circuit 20 go low, and the reset is released.

The D flip-flops 200 to 208 output at their output terminals Q the signals S300 to S308 given from the NAND circuits 300 to 308 to their data input terminals D at the fallings of the reference clock S1 and non-inverted delay clocks S101b to S108b given from the reference dock input terminal 1 and inverting delay element 101b to 108b to their negative logic timing signal input terminals T̄, respectively.

At the times of occurrence of falling edges E0 and E1 of the reference clock S1 and non-inverting delay clock S101b, the asynchronous input signal S2 is still "H". The D flip-flops 200 and 201 are accordingly in the reset state. The signals S200 and S201 outputted from the output terminals Q of the D flip-flops 200 and 201 are "L".

At the times of occurrence of falling edges E2 to E4 of the non-inverted delay clocks S102 to S104, the asynchronous input signal S2 is "L". The signals S202 to S204 outputted from the output terminals Q of the D flip-flops 202 to 204 are at the same level "H" as the output signals S302 to S304 of the NAND circuits 302 to 304.

The output levels of the NAND circuits 300 to 303 in the phase detecting circuit 30 are as follows: only the NAND circuit 301 which receives "L" at its negative logic input terminal and receives "H" at its positive logic input terminal outputs the signal S301 of "L", and the output signals S300, S302, S303 of the NAND circuits 300, 302, 303 remain high.

Since the output signals S300 to S303 of the NAND circuits 300 to 303 are applied to the first input terminals of the OR circuits 401 to 404 in the clock selecting circuit 40, the output signals S401, S403, S404 of the OR circuits 401, 403, 404 are "H", and the output signal of the OR circuit 402 is the output signal S102a of the inverting delay element 102a in the delay clock generating circuit 10 which is applied to the second input terminal of the OR circuit 402.

Thus the NAND circuit 411 outputs the inverted signal of the inverted delay clock S102a outputted from the inverting delay element 102a, and the inverted signal is applied to the synchronizing clock output terminal 3 in the form of a synchronizing clock S3.

At the times of occurrence of falling edges E10 to E14 of the reference clock S1 and non-inverted delay clocks S101b to S104b, the signals S200 to S203 outputted from the output terminals Q of the D flip-flops 200 to 203 are at the same levels as the output signals S300 to S303 of the NAND circuits 300 to 303, respectively, because the reset of the D flip-flops 200 to 203 has already been released.

The levels of the signals S200 to S203 are "H", "L", "H", "H", respectively. Among the NAND circuits 300 to 303 in the phase detecting circuit 30, only the output signal S301 of the NAND circuit 301 holds "L", the output signals S300, S302, S303 of the NAND circuits 300, 302, 303 being "H" in the same manner as the foregoing description. The output of the NAND circuit 411 in the clock selecting circuit 40 applies the inverted signal of the inverted delay clock S102a outputted from the inverting delay element 102a continuously to the synchronizing clock output terminal 3 in the form of the synchronizing clock S3. The synchronizing clock S3 corresponds to the synchronizing clock S700 of FIG. 1.

In the above-mentioned construction, if the fall time of the asynchronous input signal S2 varies in the range indicated by the broken lines of FIG. 10, the levels of the output signals S200 to S208 of the D flip-flops 200 to 208 are not changed, the synchronizing clock S3 being outputted at the same time as that described above.

The synchronization accuracy is thus equal to the phase difference between the delay clocks applied to adjacent D flip-flops and, accordingly, is approximately equal to the delay value for two inverting delay elements.

The inverting delay elements formed by semiconductor logic devices provide a delay value of not more than 1 ns for two inverting delay elements, accomplishing the synchronizing clock generating portion 700 of high synchronization accuracy without high-frequency clocks.

Figure 11:
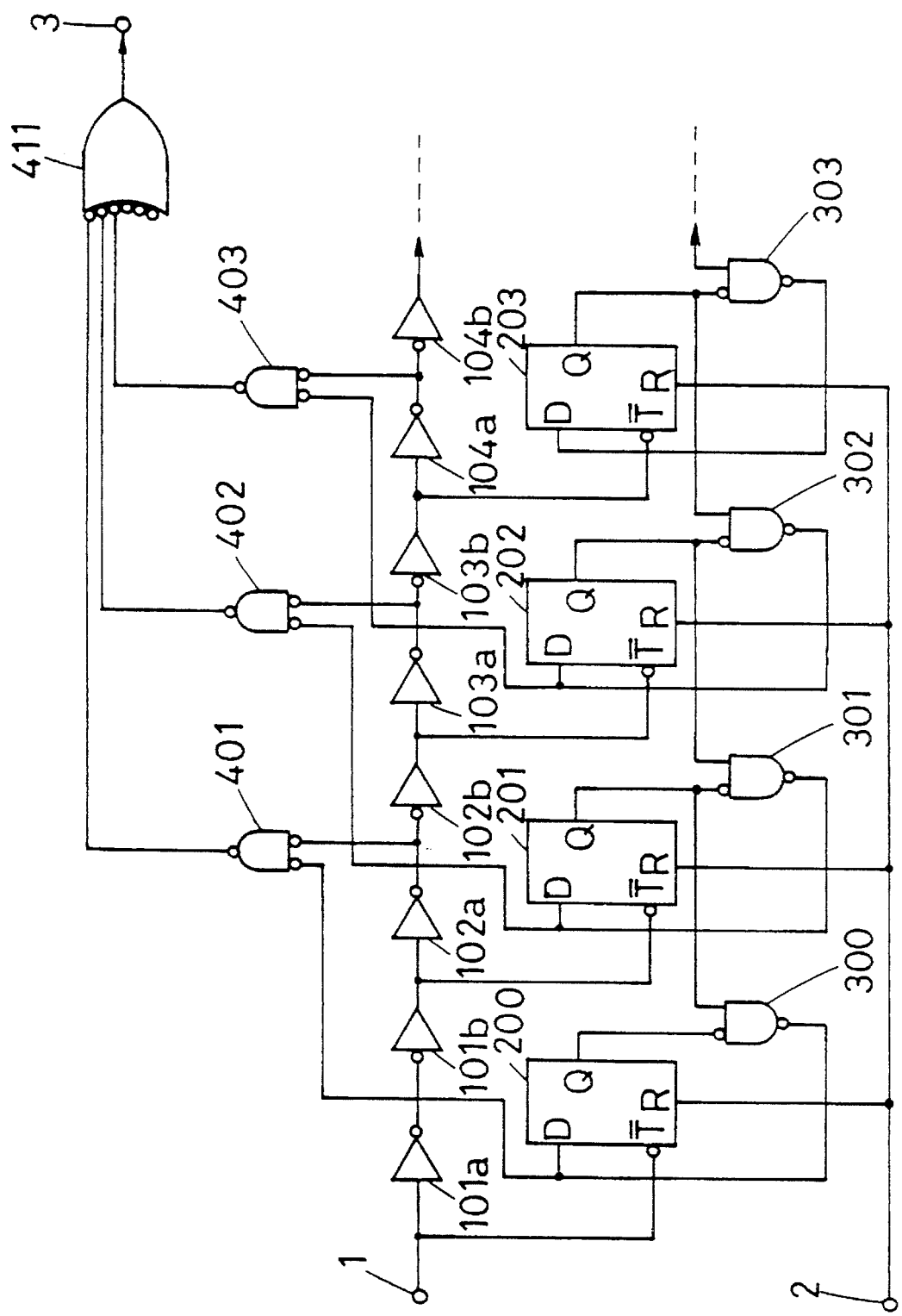
FIG. 11 is a circuit diagram of a variation of the synchronizing clock generating portion.

In the present invention, the output terminals of the NAND circuits 300 to 307 in the phase detecting circuit 30 are connected respectively to the first terminals of the OR circuits 401 to 408 in the clock selecting circuit 40, to select one of the inverted delay clocks S101a to S108a which is time-closest to the falling trigger of the asynchronous input signals S2 to output the selected one in the form of the synchronizing dock S3, the inverted delay docks S101a to S108a being outputted from the inverting delay elements 101a to 108a connected to the second terminals of the OR circuits 401 to 408, respectively. However, connection may be changed between the output terminals of the NAND circuits 300 to 307 in the phase detecting circuit 30 and the first terminals of the OR circuits 401 to 408 in the clock selecting circuit 40, as shown in FIG. 11, to select an inverted delay clock at a desired time which is different from the clock time-closest to the falling trigger of the asynchronous input signal S2.

Description will now be given on a preferred embodiment in which the output load capacities of the inverting delay elements 101a to 108b are set to a constant value.

Figure 12:
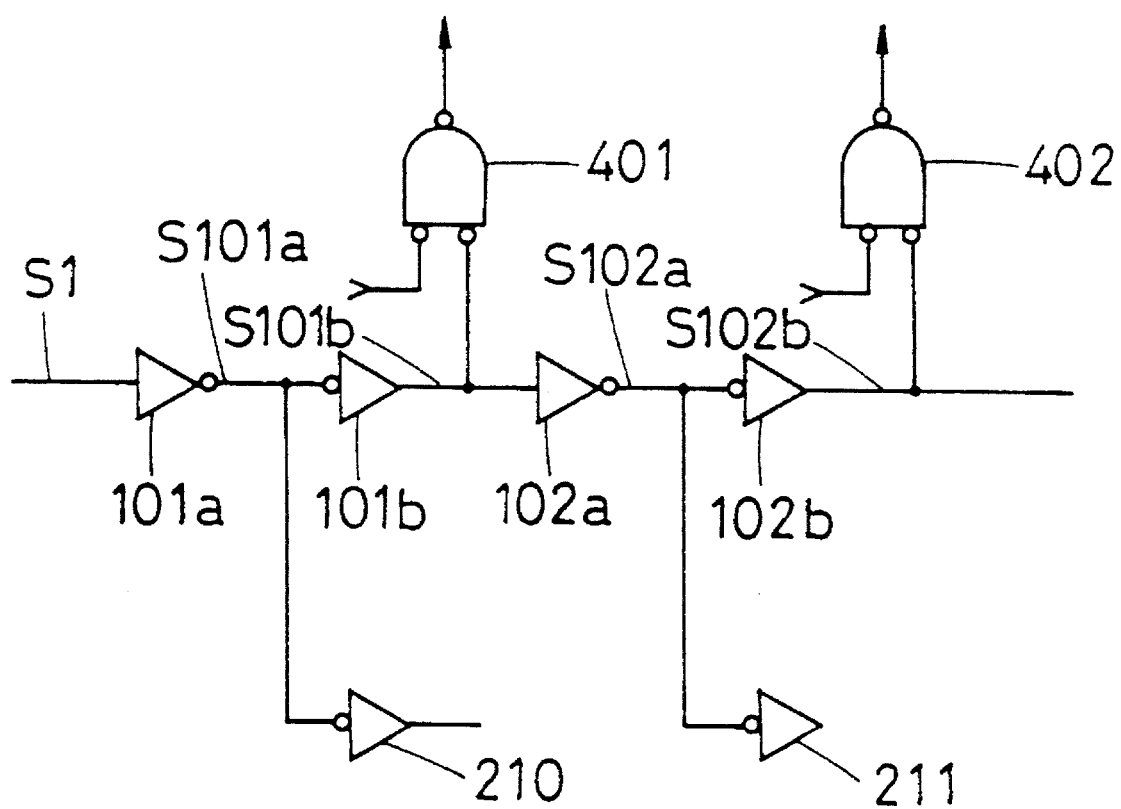
FIG. 12 is a circuit diagram excerpted from the circuits of FIGS. 8 and 9.

FIG. 12 selectively illustrates the reference clock input terminal 1, the inverting delay elements 101a to 102b included in the delay clock generating circuit 10, the OR circuits 401, 402 included in the clock selecting circuit 40, and the inverters 210, 211 connected to the timing signal input terminals T̄ of the D flip-flops 200, 201 included in the memory circuit 20 of FIGS. 8 and 9. For setting the output load capacities of the inverting delay elements 101a to 102b to a constant or approximate value, the size of first transistors (not shown) connected to the input terminals of the OR circuits 401, 402 included in the clock selecting circuit 40 should be the same as or approximate to the first transistor size of first inverters 210, 211 connected to the timing signal input terminals T̄ of the D flip-flops 201, 202 included in the memory circuit 20. Further, lines connected to the respective output terminals of the inverting delay elements 101a to 102b should be of the same or approximate size. Thus the inverting delay elements 101a to 102b having the same or approximate output load capacity have the same or approximate delay value.

FIG. 13 is a timing chart showing the operation of the circuit of FIG. 12 in such a case. The inverting delay elements 101a to 102b sequentially add delay to the reference clock S1 from the reference clock input terminal 1 as shown to generate the inverted delay clocks S101a, S101b and non-inverted delay clocks S101b, S102b.

It takes a time A for the inverted delay clocks S101a, S102a and non-inverted delay clocks S101b, S102b to fall from "H" to "L", and it takes a time B for them to rise from "L" to "H". The non-inverting delay clock S102b has 2(A+B) rise time delay and 2(B+A) fall time delay from the reference clock S1.

The rise time delay and fall time delay of the non-inverted delay clock S102b from the reference clock S1 are equal, providing a delay clock such as the non-inverted delay clock S102b which has the same duty cycle as the reference clock S1.

Figure 14:
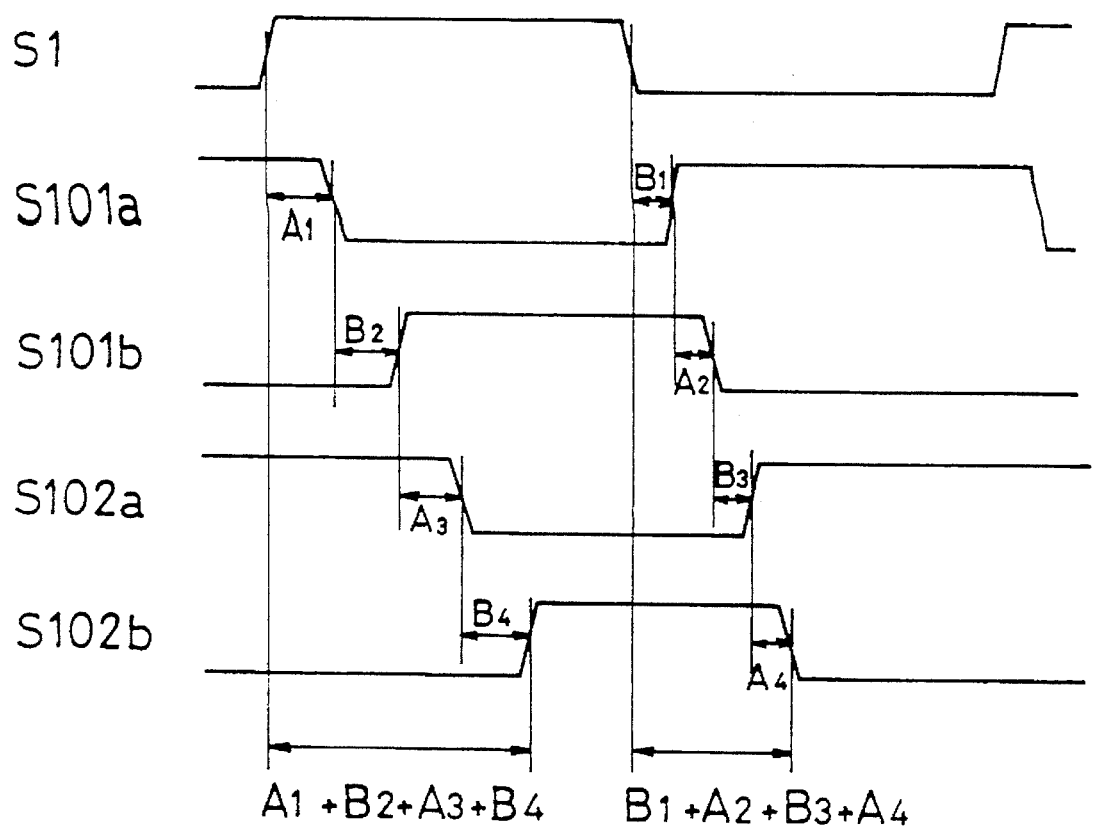

The inverting delay elements 101a to 102b have different delay values if they have different output load capacities. FIG. 14 is a timing chart showing the operation of the circuit of FIG. 12 in such a case. The inverting delay elements 101a to 102b sequentially add delay to the reference clock S1 from the reference clock input terminal 1 as shown to generate the inverted delay clocks S101a, S101b and non-inverted delay clocks S101b, S102b.

It takes times $A_1$ and $A_3$ for the inverted delay clocks S101a and S102a to fall from "H" to "L", and it takes times $B_1$ and $B_3$ for them to rise from "L" to "H", respectively. It takes times $B_2$ and $B_4$ for the non-inverted delay clocks S101b and S102b to rise from "L" to "H", and it takes times $A_2$ and $A_4$ for them to fall from "H" to "L", respectively. The non-inverted delay clock S102b has $(A_1+B_2+A_3+B_4)$ rise time delay and $(B_1+A_2+B_3+A_4)$ fall time delay from the reference clock S1.

The rise delay value of the non-inverted delay clock S102b from the reference clock S1 is different from the fall delay value thereof, providing a delay clock such as the non-inverting delay clock S102b which is different in duty cycle from the reference clock S1.

As above described, setting the output load capacities of the inverting delay elements 101a to 102b to the constant or approximate value provides for the production of the delay clock having a duty cycle same as or approximate to that of the reference clock S1, thereby improving the synchronization accuracy.

In the first preferred embodiment, the non-inverted delay clocks outputted from the inverting delay elements 101b to 108b are applied to the negative logic timing signal input terminals T of the D flip-flops 200 to 208 to select the inverted delay clocks outputted from the inverting delay elements 101a to 108a. Conversely, the inverted delay clocks outputted from the inverting delay elements 101a to 108a may be applied to the negative logic timing signal input terminals T of the D flip-flops 200 to 208 to select the non-inverted delay clocks outputted from the inverting delay elements 101b to 108b.

Figure 15:
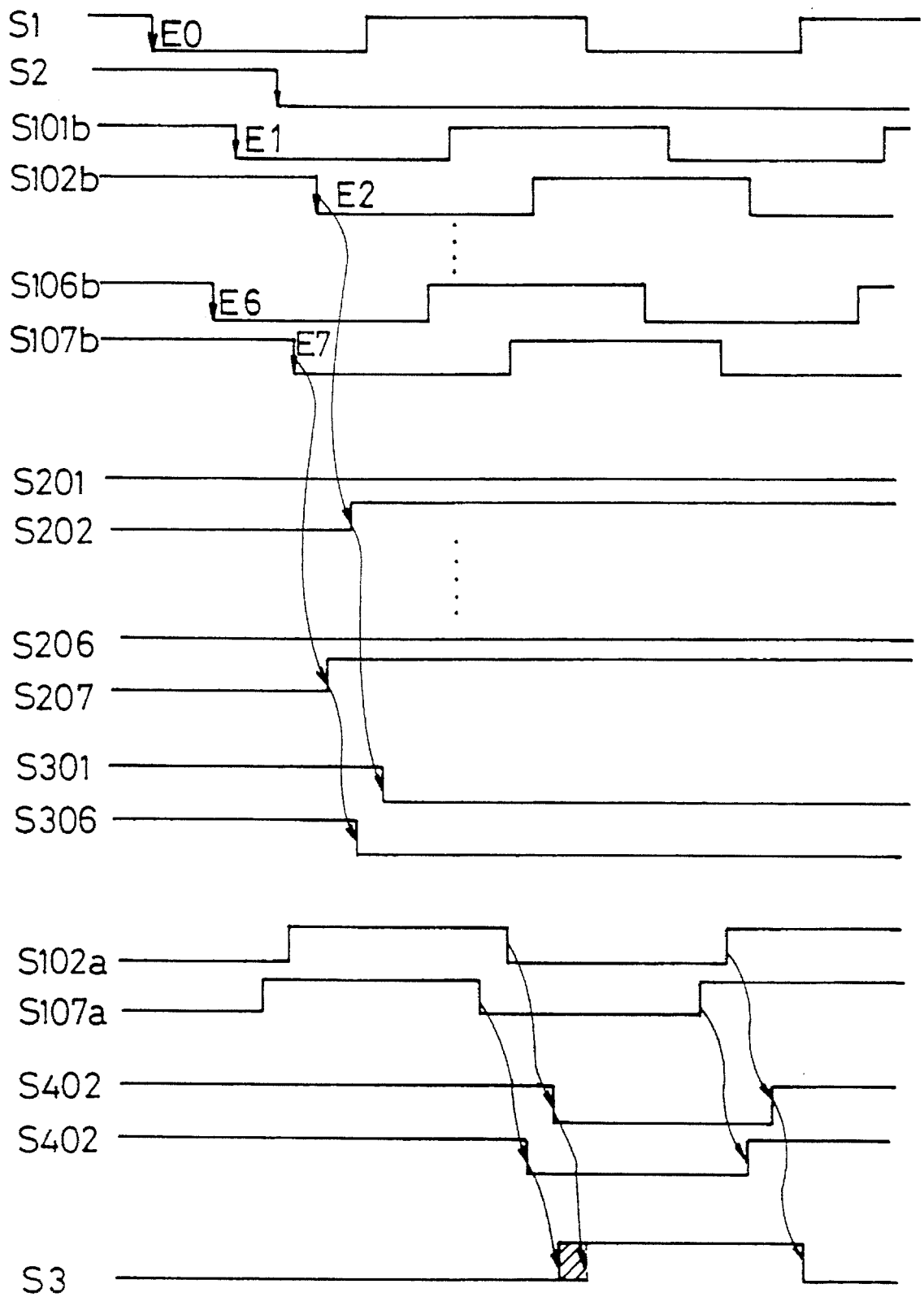
FIG. 15 is a timing chart showing the operation of the circuits of FIGS. 8 and 9 under some conditions.

The circuit of FIGS. 8 and 9 has some disadvantages which will be described below. FIG. 15 is a timing chart showing the operation of the circuit of FIGS. 8 and 9 where the reference clock S1 has a shorter cycle or where each of the inverting delay elements 101a to 108b has a longer delay time. Omitted from the timing chart of FIG. 15 are the signals S103b to S105b, S108b, S101a, S103a to S106a, S108a outputted respectively from the inverting delay elements 103b to 105b, 108b, 101a, 103a to 106a, 108a in the delay clock generating circuit 10, the signals S203 to S205, S208 outputted from the respective output terminals Q of the D flip-flops 203 to 205, 208 in the memory circuit 20, the signals S300, S302 to S305, S307, S308 outputted respectively from the NAND circuits 300, 302 to 305, 307, 308 in the phase detecting circuit 30, and the signals S401, S403 to S406, S408 outputted respectively from the OR circuits 401, 403 to 406, 408 in the clock selecting circuit 40.

In such a case, some of the non-inverted delay clocks S102b to S108b are generally in phase. For example, this is the case for the non-inverted delay clocks S101b and S106b and the non-inverted delay clocks S102b and S107b as shown in the timing chart of FIG. 15.

In this state, if the level of the asynchronous input signal S2 from the asynchronous signal input terminal 2 falls from "H" to "L" at the time shown in FIG. 15, the output signals S200, S201, S206 of the D flip-flops 200, 201, 206 are "L" since the falling edges E0, E1, E6 of the reference clock S1 and non-inverted delay clocks S101b, S106b occur before the falling of the asynchronous input signal S2. The output signals S202, S207 of the D flip-flops 202, 207 are "H" since the falling edges E2, E7 of the non-inverted delay clocks S102b, S107b occur after the falling of the asynchronous input signal S2. Thus the output signals S301, S306 of the NAND circuits 301, 306 in the phase detecting circuit 30 are "L", and the OR circuits 402, 407 in the clock selecting circuit 40 output the inverted delay clocks S102a, S107a, respectively. The synchronizing clock S3 outputted from the synchronizing clock output terminal 3 through the NAND circuit 411 is a signal which is "H" when either or both of the inverted delay clocks S102a and S107a are "L" and which is "L" when both of them are "H".

The "H" time length of the synchronizing clock S3 within one cycle is longer than that of the reference clock S1 by the amount of the shaded portion of FIG. 15 and the "L" time length thereof is shorter than that of the reference clock S1 by the same amount. The duty cycle of the synchronizing clock S3 is different from that of the reference clock S1.

Figure 16:
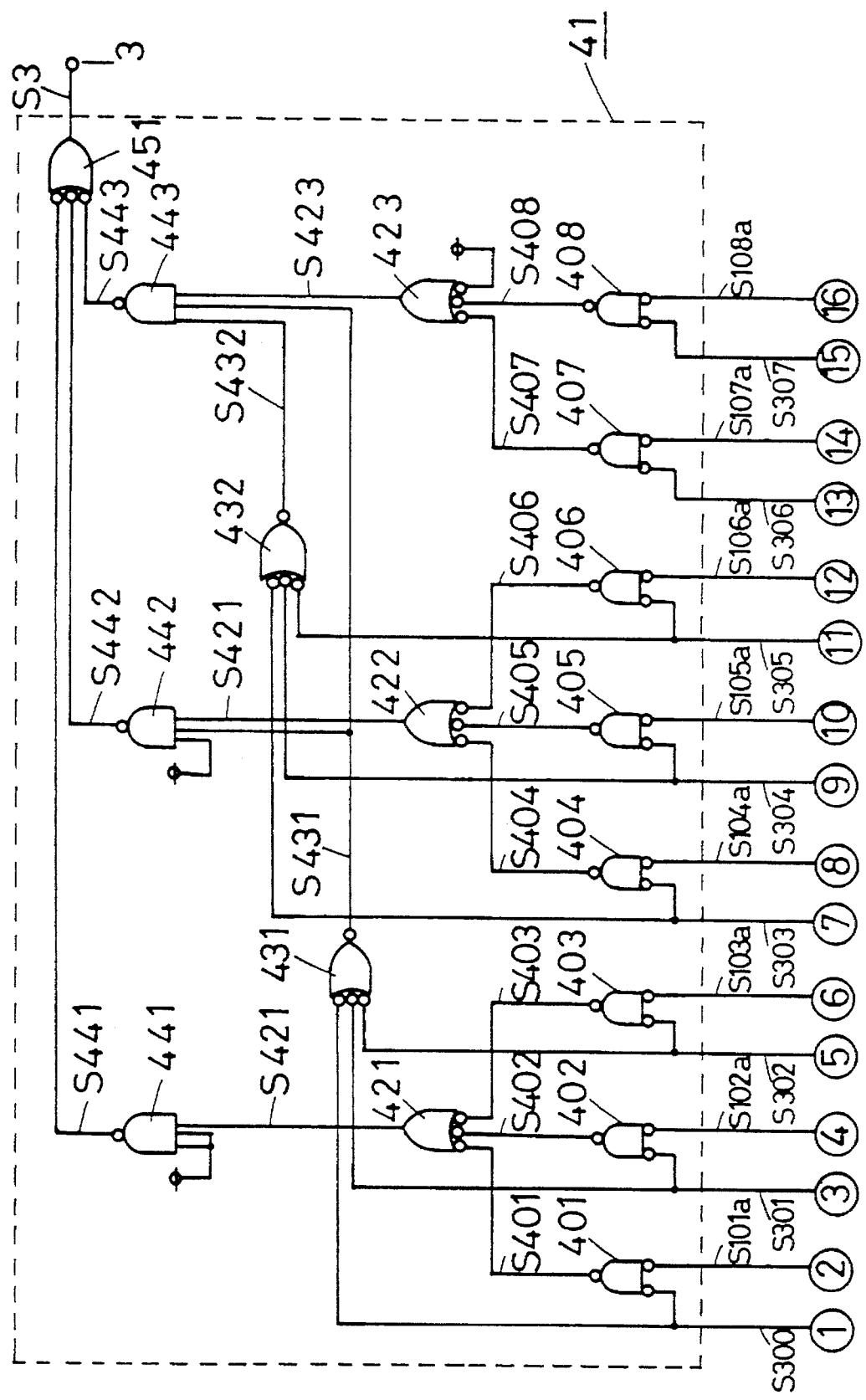
FIG. 16 is a circuit diagram of a second arrangement of the synchronizing clock generating portion.

FIG. 16 is a circuit diagram showing a second arrangement of the synchronizing clock generating portion 700 of FIG. 1. The synchronizing clock generating portion 700 of FIG. 16 is adapted such that, in the clock selecting circuit 40 of FIG. 9, at least two of the OR circuits 401 to 408 output an inverted delay clock and the (multi-output) NAND circuit 411 does not output the synchronizing clock S3 which is different in duty cycle from the reference clock S1. The delay clock generating circuit 10, the memory circuit 20, and the phase detecting circuit 30 of the second arrangement are similar in construction to those of FIG. 8, and the description thereof will be omitted herein.

The output terminals of the NAND circuits 300 to 307 in the phase detecting circuit 30 of FIG. 8 are connected to the first input terminals of the OR circuits 401 to 408 in the clock selecting circuit 41 of FIG. 16. The second input terminals of the OR circuits 401 to 408 are connected to the output terminals of the inverting delay elements 101a to 108a in the delay clock generating circuit 10 of FIG. 8. The output terminals of OR circuits 401 to 403 are connected to the input terminals of a three-input NAND circuit 421, and the output terminals of OR circuits 404 to 406 are connected to the input terminals of a three-input NAND circuit 422, the output terminals of the OR circuits 407, 408 being connected to input terminals of a three-input NAND circuit 423. A third input terminal of the three-input NAND circuit 423 is connected to a power supply terminal. A two-input NAND circuit is not substituted for the three-input NAND circuit 423 so that the time interval intervals are uniform between the selection of one of the inverted delay clocks S101a to S108a and the output thereof from the synchronizing clock output terminal 3.

The output terminals of the three-input NAND circuits 421 to 423 are connected to first input terminals of three-input NAND circuits 441 to 443, respectively. The outputs of the three-input NAND circuits 441 to 443 are connected to the input terminals of a three-input NAND circuit 451. The output terminal of the three-input NAND circuit 451 is connected to the synchronizing clock output terminal 3.

The output terminals of the NAND circuits 300 to 302 in the phase detecting circuit 30 of FIG. 8 are connected to the input terminals of a three-input AND circuit 431 in the clock selecting circuit 41. The output terminals of the NAND circuits 303 to 305 in the phase detecting circuit 30 are connected to the input terminals of a three-input AND circuit 432 in the clock selecting circuit 41.

The output terminal of the three-input AND circuit 431 is connected to second input terminals of the three-input NAND circuits 442, 443, and the output terminal of the three-input AND circuit 432 is connected to a third input terminal of the three-input NAND circuit 443. Second and third input terminals of the three-input NAND circuit 441 and a third input terminal of the three-input NAND circuit 442 are connected to the power supply terminal. An inverter and an NAND circuit are not substituted respectively for the three-input NAND circuit 441 and 442 so that the time intervals are uniform between the selection of one of the inverted delay clocks S101a to S108a and the output thereof from the synchronizing clock output terminal 3.

Figure 17:
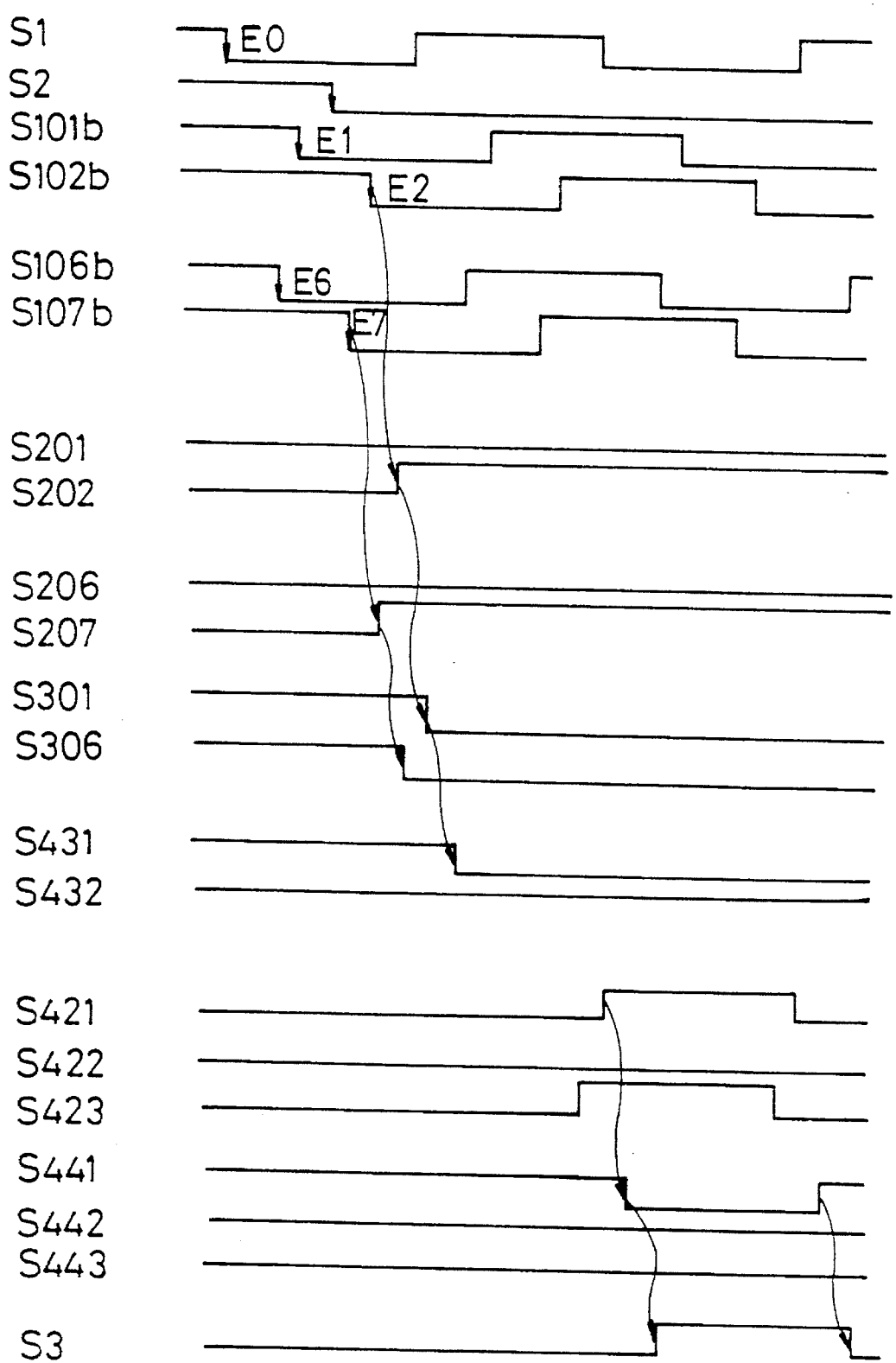
FIG. 17 is a timing chart showing the operation of the synchronizing clock generating portion of the second arrangement.

Operation will be described below. FIG. 17 is a timing chart showing the operation of the circuits of FIGS. 8 and 16. Omitted from the timing chart of FIG. 17 are the signals S103b to S105b, S108b, S101a to S108a outputted from the inverting delay elements 103b to 105b, 108b, 101a to 108a in the delay clock generating circuit 10, the signals S203 to S205, S208 outputted from the respective output terminals Q of the D flip-flops 203 to 205, 208 in the memory circuit 20, the signals S300, S302 to S305, S307, S308 outputted from the NAND circuits 300, 302 to 305, 307, 308 in the phase detecting circuit 30, and the signals S401 to S408 outputted from the OR circuits 401 to 408 in the clock selecting circuit 40. The reference clock S1 as shown is inputted from the reference clock input terminal 1 and is sequentially inverted and delayed by the inverting delay elements 101a to 108b. Then the inverting delay elements 101a to 108a output the inverted delay clocks S101a to S108a, and the inverting delay elements 101b to 108b output the non-inverted delay clocks S101b to S108b, respectively. During the "H" period of the asynchronous input signal S2 from the asynchronous signal input terminal 2, the D flip-flops 200 to 208 are in the reset state and output the "L" signals at their output terminals Q.

The signals applied to the negative logic input terminals and positive logic input terminals of the NAND circuits 300 to 308 are both "L". The NAND circuits 300 to 308 at their output terminals output the "H" signals S300 to S308, which are applied to the data input terminals D of the D flip-flops 200 to 208, respectively.

Assuming that the asynchronous input signal S2 from the asynchronous signal input terminal 2 falls from "H" to "L" at a time shown in FIG. 17, the reset signal input terminals R of the D flip-flops 200 to 208 in the memory circuit 20 go low, and the reset is released.

The D flip-flops 200 to 208 outputs at their output terminals Q the signals S300 to S308 given from the NAND circuits 300 to 308 to their data input terminals D, respectively, at the fallings of the reference clock S1 and non-inverted delay clocks S101b to S108b given from the reference clock input terminal 1 and inverting delay elements 101b to 108b to their negative logic timing signal input terminals $\overline{T}$.

At the times of occurrence of the falling edges E0, E1, E6 of the reference clock S1 and non-inverted delay clocks S101b, S106b, the asynchronous input signal S2 is still "H". The D flip-flops 200, 201, 206 are accordingly in the reset state. The signals S200, S201, S206 outputted from the output terminals Q of the D flip-flops 200, 201, 206 are "L".

At the times of occurrence of the falling edges E2, E7 of the non-inverted delay clocks S102b, S107b, the asynchronous input signal S2 is "H". The signals S202, S207 outputted from the output terminals Q of the D flip-flops 202, 207 are at the same level "H" as the output signals S302 to S307 of the NAND circuits 302 to 307.

Only the NAND circuits 301, 306 in the phase detecting circuit 30 receive "L" at their negative logic input terminals and receive "H" at their positive logic input terminals, and only the output signals S301, S306 of the NAND circuits 301, 306 are "L". Since the output signals S300 to S307 of the NAND circuits 300 to 307 are applied respectively to the first input terminals of the OR circuits 401 to 408 in the clock selecting circuit 40, the output signals S401, S403, S404 to S406, S408 of the OR circuits 401, 403, 404 to 406, 408 are "H". The output signals S402, S407 of the OR circuits 402, 407 are the inverted delay clocks S102a, S107a given from the inverting delay elements 102a, 107a in the delay clock generating circuit 10 to the second input terminals of the OR circuits 402, 407, respectively.

The three-input NAND circuit 421 outputs the inverted signal of the inverted delay clock 102a outputted from the AND circuit 402. The three-input NAND circuit 422 outputs "L". The three-input NAND circuit 423 outputs the inverted signal of the inverted delay clock 107a outputted from the AND circuit 407.

Since the outputs S300, S301, S302 of the NAND circuits 300, 301, 302 in the phase detecting circuit 30 are "H", "L", "H", respectively, the output S431 of the three-input AND circuit 431 in the clock selecting circuit 40 is "L". Likewise, since the outputs S303, S304, S305 of the NAND circuits 303, 304, 305 in the phase detecting circuit 30 are all "H", the output S432 of the three-input AND circuit 432 in the clock selecting circuit 40 is "H".

Since the three-input AND circuit 431 outputs "L", the output signals S442, S443 of the three-input NAND circuits 442, 443 are "H". Thus the three-input NAND circuit 451 outputs the inverted signal of the inverted delay clock S102 outputted from the OR circuit 402, and the inverted signal is outputted in the form of the synchronizing clock S3 from the synchronizing clock output terminal 3.

In the circuit arrangements of FIGS. 8 and 16, the OR circuits 401 to 408 in the clock selecting circuit 40 are divided into three groups: a first group including the OR circuits 401 to 403, a second group including the OR circuits 404 to 406, and a third group including the OR circuits 407, 408. If the inverted delay clock is outputted from one of the OR circuits in the first group, the inverted delay clocks from the OR circuits in the second and third groups are prevented from being outputted from the synchronizing clock output terminal in the form of the synchronizing clock S3. If the inverted delay clock is not outputted from the OR circuits 401 to 403 in the first group but is outputted from one of the OR circuits in the second group, the inverted delay clocks from the OR circuits in the third group are prevented from being outputted from the synchronizing clock output terminal in the form of the synchronizing clock S3, so that the synchronizing clock S3 has the same duty cycle as the reference clock S1.

Figure 18:
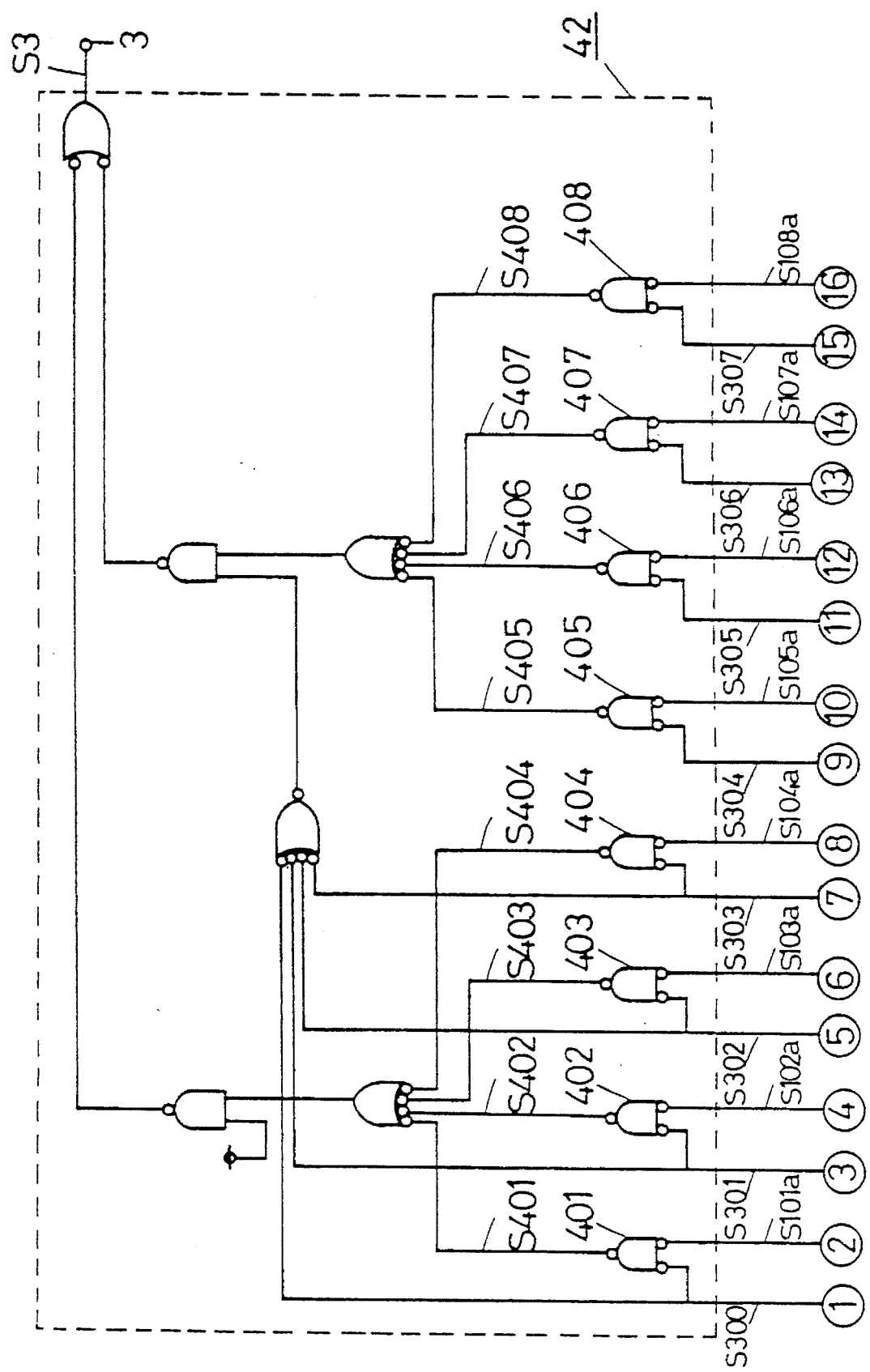
FIGS. 18 and 19 are circuit diagrams of variations of the synchronizing clock generating portion.

Alternatively, the OR circuits 401 to 408 may be divided into two groups as shown in a clock selecting circuit 42 of FIG. 18, the first group including the OR circuits 401 to 404, the second group including the OR circuits 405 to 408. If one of the OR circuits in the first group outputs the inverted delay clock, the inverted delay clocks from the OR circuits in the second group are prevented from being outputted from the synchronizing clock output terminal in the form of the synchronizing clock S3, providing similar effects.

Any number of OR circuits may be included in the same group. It is, however, necessary to prevent a plurality of OR circuits in the same group from outputting the inverted delay clocks in consideration for the cycle of the reference clock S1 and the delay time of the respective inverting delay elements 101a to 108b.

Figure 19:
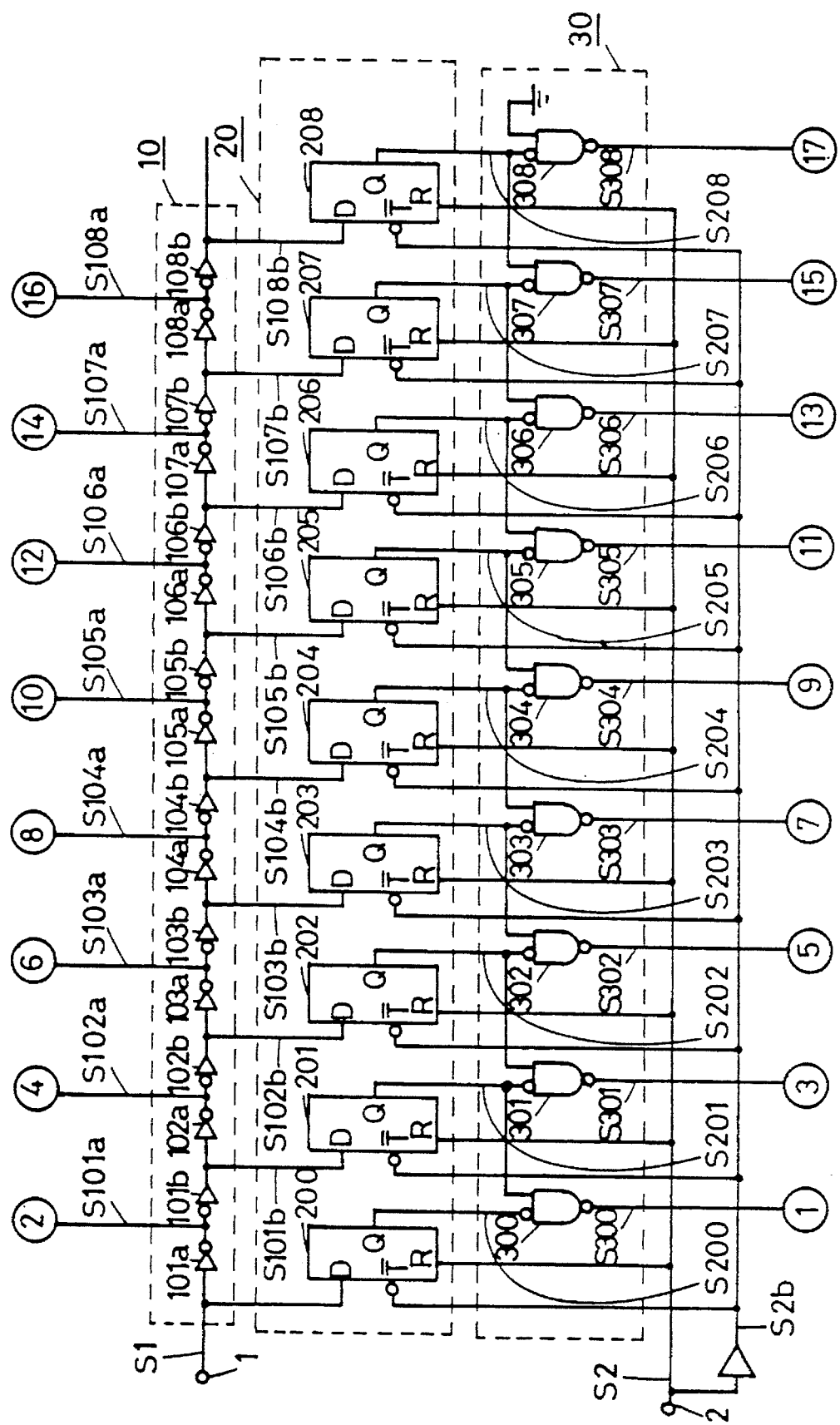
Figure 20:
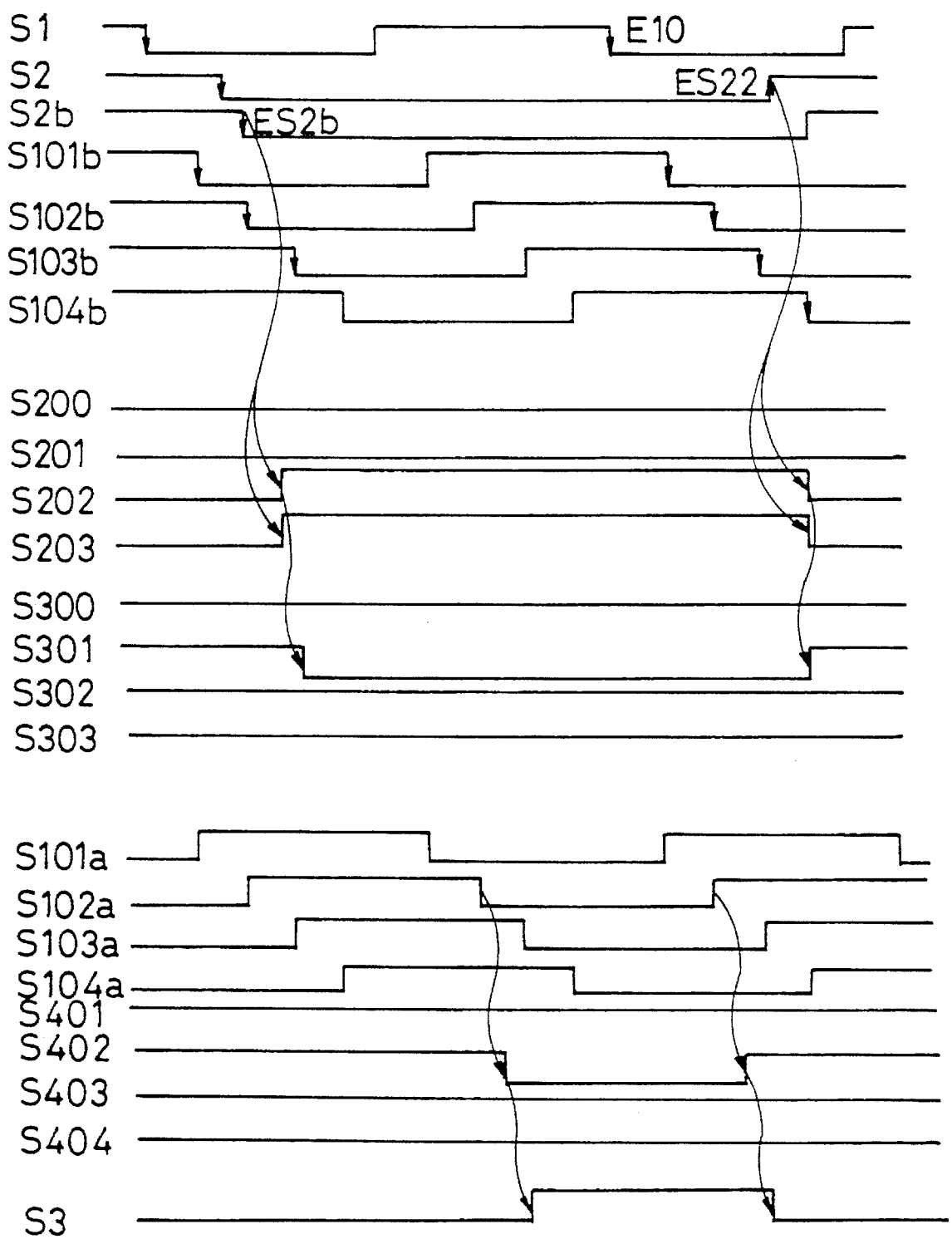
FIG. 20 is a timing chart showing the operation of the variation of FIG. 19.

Connection shown in FIG. 19 of the inverting delay elements 101a to 108b in the delay clock generating circuit 10, the D flip-flops 200 to 208 in the memory circuit 20, and the NAND circuits 300 to 37 in the phase detecting circuit 30 of FIG. 8 provides effects similar to the first and second arrangements. Specifically, the reference clock input terminal 1 is connected to the data signal input terminal D of the D flip-flop 200, and the asynchronous signal input terminal 2 is connected to the negative logic timing signal input terminals T of the D flip-flops 200 to 208 through a buffer, the respective outputs of the inverting delay elements 101*b*, 102*b*, 103*b*, 104*b*, 105*b*, 106*b*, 107*b*, 108*b* being connected to the data signal input terminals D of the D flip-flops 201 to 208, respectively. The other arrangements of FIG. 19 are identical with those of the circuit of FIG. 8. Differences from the circuit of FIG. 8 in operation will be discussed below with reference to the timing chart of FIG. 20. Upon occurrence of a falling edge ES2*b* of an asynchronous input signal S2*b* through a buffer, the D flip-flops 200 to 208 hold and output at their output terminals the signals S1 and S101*b* to S108*b* applied to the data input terminals D at that time. The signals S200 to S203 are "L", "L", "H", "H" at the time of occurrence of the falling edge ES2*b* of the asynchronous input signal S2*b*. As a result, the signals S300 to S303 at that time are "H", "L", "H", "H". In the same manner as shown in FIG. 10, the inverted delay clock S102*a* is selected by the "L" signal S301 and serves as the signal S402, which is outputted in the form of the synchronizing clock S3. It should be noted that the signal S200 does not rise in response to the falling edge E10 of the reference clock S1 as shown in FIG. 10 since the asynchronous input signal S2*b* is applied to the timing signal input terminal T through a buffer in this preferred embodiment.

All of the D flip-flops 200 to 208 are reset in response to a rising edge ES22 of the asynchronous input signal S2. Then the signals S202 and S203 are "L". The signal S301 goes low in response to the "L" signal S202 and the clock of the signal S402 is stopped until the next falling edge of the asynchronous input signal S2 (the asynchronous input signal S2*b* through a buffer) reaches. Such arrangement provides the synchronizing clock S3 similar to that shown in FIG. 10.

(Synchronizing Pulse Generating Portion 800)

Figure 21:
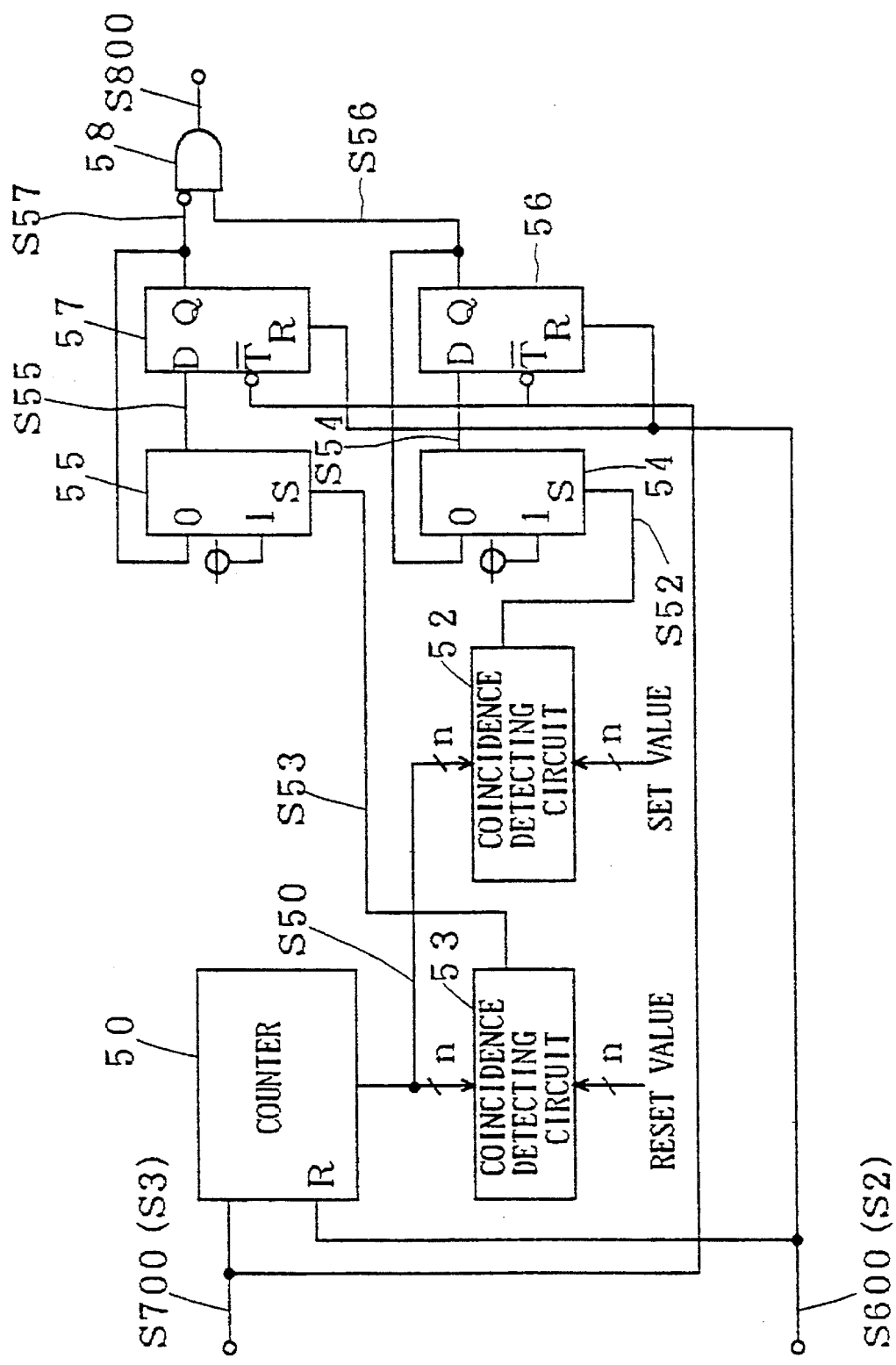
FIG. 21 is a block diagram showing the details of a synchronizing pulse generating portion.

FIG. 21 is a block diagram showing the details of the synchronizing pulse generating portion 800 of FIG. 1. The synchronizing clock S700 from the synchronizing clock generating portion 700 is applied to the count input terminal of a counter 50, as shown in FIG. 21. The corrected synchronizing signal S600 from the synchronization lack correcting portion 600 is applied to the reset input terminal R of the counter 50.

The output terminal of the counter 50 is connected to first input terminals of coincidence detecting circuits 52, 53. Predetermined set value and reset value are applied to second input terminals of the coincidence detecting circuits 52, 53, respectively. The output terminals of the coincidence detecting circuits 52, 53 are connected to the select input terminals S of selectors 54, 55. The output terminals of the selectors 54, 55 are connected to the data input terminals D of D flip-flops 56, 57, respectively. The output terminals Q of the D flip-flops 56, 57 are connected to input terminals 0 of the selectors 54, 55, respectively. Input terminals 1 of the selectors 54, 55 are connected to the power supply terminal. The synchronizing clock S700 is applied to the negative logic trigger timing signal input terminals T̄ of the D flip-flops 56, 57. The corrected synchronizing signal S600 is applied to the reset input terminals R of the D flip-flops 56, 57. The output terminal Q of the D flip-flop 56 is connected to a first input terminal of an AND circuit 58, and the output terminal Q of the D flip-flop 57 is connected in inverted form to a second input terminal of the AND circuit 58. The output signal from the AND circuit 58 is outputted in the form of the synchronizing pulses S800.

Figure 22:
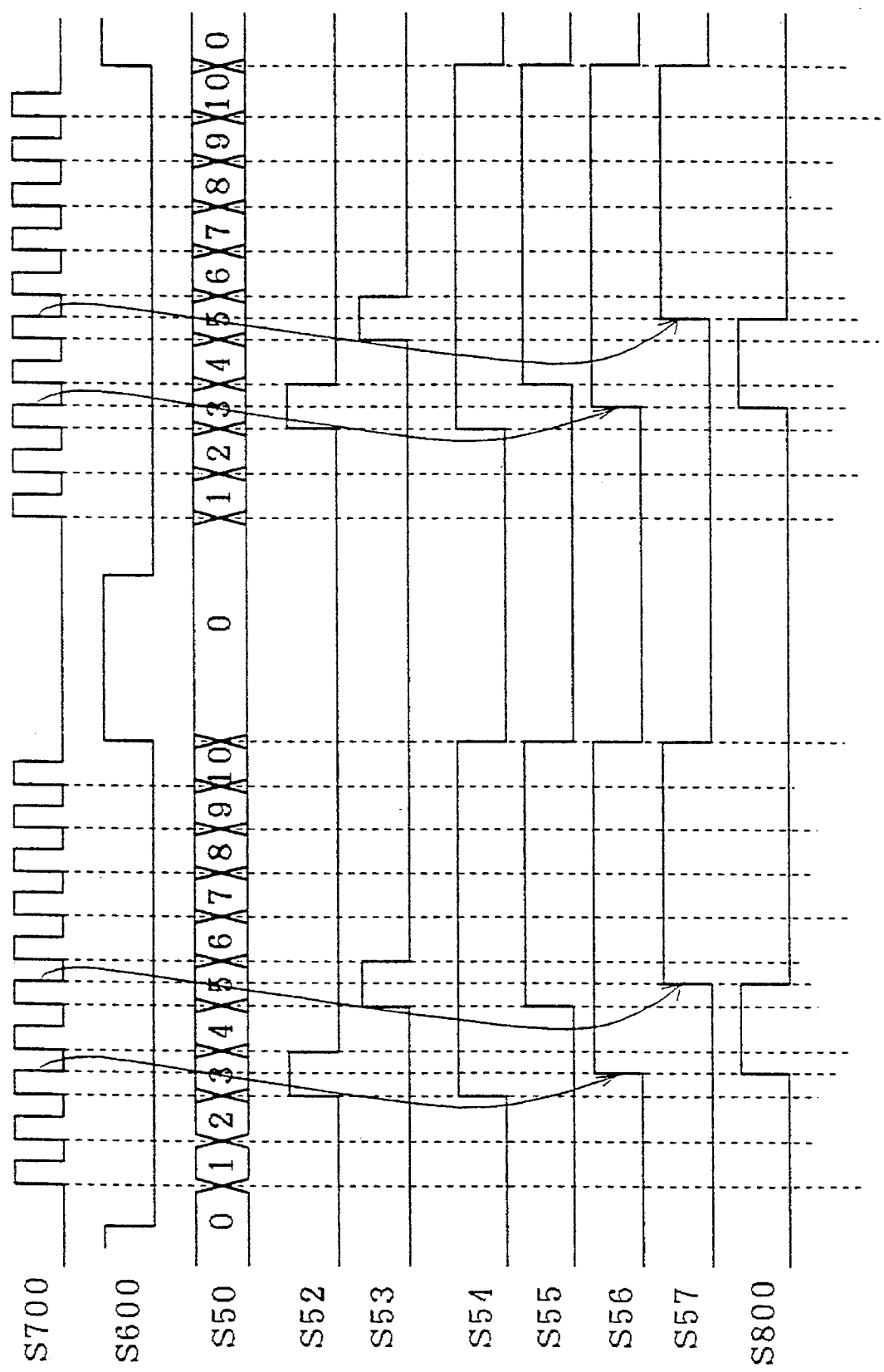
FIG. 22 is a timing chart showing the operation of the synchronizing pulse generating portion.

Description will now be given on the operation of the synchronizing pulse generating portion 800 of FIG. 21. FIG. 22 is a timing chart showing the operation of the synchronizing pulse generating portion 800 of FIG. 21. For purposes of simplification, it is assumed that the set value is "3" and the reset value is "5" (in decimal).

While the corrected synchronizing signal S600 is "H", the counter 50 and the D flip-flops 56, 57 are in the reset state, the count of the counter 50 being zero, the signals S56, S57 outputted from the output terminals Q of the D flip-flops 56, 57 being "L". Then the corrected synchronizing signal S600 turns to "L", and the reset of the counter 50 and D flip-flops 56, 57 is released. If the synchronizing clock S700 is entered at this time, the counter 50 starts counting the synchronizing clocks S700. The count S50 is applied to the coincidence detecting circuits 52, 53, which generate "H" signals S52, S53 at their output terminals when the predetermined set and reset values coincide with the count S50 of the counter 50, respectively. Since the set value and reset value are "3" and "5", the output S52 from the coincidence detecting circuit 52 goes high when the count of the counter 50 is "3" and the output S53 of the coincidence detecting circuit 53 goes high when the count of the counter 50 is "5".

The selectors 54, 55 output at their output terminals output signals S54, S55, respectively, which are the "H" signals applied to their input terminals 1 when the outputs S52, S53 of the coincidence detecting circuits 52, 53 applied to their set input terminals S are "H" and which are the signals applied to their input terminals when the outputs S52, S53 are "L".

The signal S56 outputted from the output terminal Q of the D flip-flop 56 is "L" as shown in FIG. 22 during the corrected synchronizing signal S600 of "H" and during the time interval between the falling of the corrected synchronizing signal S600 to "L" and the falling of the synchronizing clock S700 immediately after the count of the counter 50 reaches "3", and it is "H" during the time interval between the falling of the synchronizing clock S700 immediately after the count of the counter 50 reaches "3" and the rising of the corrected synchronizing signal S600 to "H". Likewise, the signal S57 outputted from the output terminal Q of the D flip-flop 57 is "L" as shown in FIG. 22 during the corrected synchronizing signal S600 of "H" and during the time interval between the falling of the corrected synchronizing signal S600 to "L" and the falling of the synchronizing clock S700 immediately after the count of the counter 50 reaches "5", and it is "H" during the time interval between the falling of the synchronizing clock S700 immediately after the count of the counter 50 reaches "5" and the rising of the corrected synchronizing signal S600 to "H".

The AND circuit 58 outputs the "H" signal when the signal S56 is "H" and the signal S57 is "L", providing the synchronizing pulses S800 as shown in FIG. 22.

(General Operation of First Preferred Embodiment)

It has been detailed that the synchronization lack correcting portion 600, in response to the synchronizing signal S601, outputs the corrected synchronizing signal S600 which is provided by correction for disturbances (noises and synchronization lack) with reference to the timing chart of FIG. 7. The corrected synchronizing signal S600 is impressed upon the synchronizing clock generating portion 700 and synchronizing pulse generating portion 800.

The synchronizing clock generating portion 7, as above described, generates the synchronizing clock S700 shown in FIG. 7 which is in high-accuracy synchronism with the phase of the corrected synchronizing signal S600. The synchronizing clock S700 is impressed upon the synchronizing pulse generating portion 800.

The synchronizing pulse generating portion 800 counts the synchronizing clocks S700 while resetting the operation upon each pulse of the corrected synchronizing signal S600. The synchronizing pulse generating portion 800 generates the synchronizing pulses S800 shown in FIG. 7 which rise to "H" in response to each predetermined set value ("3" in FIG. 7) and fall to "L" in response to each reset value ("5" in FIG. 7). The pulse width and delay amount of the synchronizing pulses S800 are readily changed by changing the set value and reset value. The synchronizing pulses S800 are in high-accuracy synchronism with the synchronizing signal S601 and are, therefore, particularly adapted for use in a multi-synchronization type display monitor as HD pulses.

The synchronizing pulses S800 may be applied to the pulse generator 901 which may be simple and similar in construction to, for example, the pulse generator 612 of FIG. 2. The pulse generator 901 generates the pulses S901 as shown in FIG. 7 in synchronism with the rising of the synchronizing pulses S800. The pulses S901 are applied to the pulse synchronizing clock generating circuit 902.

The pulse synchronizing clock generating circuit 902 may be similar in construction to, for example, the synchronizing clock generating portion 700. The pulse synchronizing clock generating circuit 902 is triggered by the pulses S901 to generate the pulse synchronizing clock S902 as shown in FIG. 7 which is high-accuracy synchronism with the pulses S901. The pulse synchronizing clock S902 which is in high-accuracy synchronism with the synchronizing pulses S800 is very useful for various processings such as display monitor distortion correction, using the synchronizing pulses S800 as a reset signal.

<<Second Preferred Embodiment>>

Figure 23:
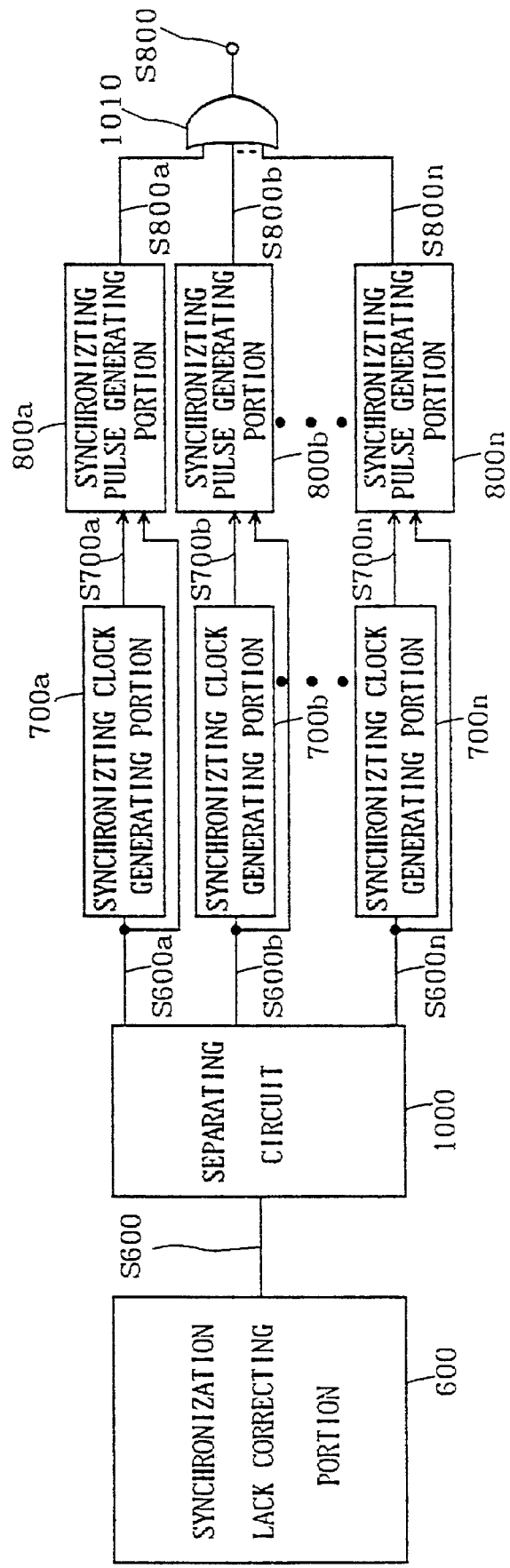
FIG. 23 is a block diagram of the synchronizing pulse generating circuit according to a second preferred embodiment of the present invention.

FIG. 23 is a block diagram of the synchronizing pulse generating circuit according to a second preferred embodiment of the present invention. The synchronization lack correcting portion 600 of the second preferred embodiment is similar in construction and operation to that of the first preferred embodiment shown in FIG. 1. The corrected synchronizing signal S600 from the synchronization lack correcting portion 600 is impressed upon a separating circuit 1000. The separating circuit 1000 separates the corrected synchronizing signal S600 into first to n-th sorted corrected synchronizing signals S600a to S600n in order of pulse input, for example, in such a sorting manner as S600a, S600b, ..., S600n, S600a, ... The cycle of each of the sorted corrected synchronizing signals S600a to S600n is n times the cycle of the original corrected synchronizing signal S600.

The first to n-th sorted corrected synchronizing signals S600a to S600n are applied to first to n-th synchronizing clock generating portions 700a to 700n and to first to n-th synchronizing pulse generating portions 800a to 800n, respectively. First to n-th synchronizing clocks S700a to S700n from the first to n-th synchronizing clock generating portions are applied to the first to n-th synchronizing pulse generating portions 800a to 800n, respectively. Each of the synchronizing clock generating portions 700a to 700n and each of the synchronizing pulse generating portions 800a to 800n are similar in construction and operation to the synchronizing clock generating portion 700 and the synchronizing pulse generating portion 800 of the first preferred embodiment shown in FIG. 1, respectively. The first to n-th synchronizing pulse generating portions 800a to 800n, accordingly, output first to n-th synchronizing pulses S800a to S800n which have a cycle n times that of the synchronizing pulse S800 of the first preferred embodiment of FIG. 1, each of the first to n-th synchronizing pulses S800a to S800n lagging its preceding pulse by a phase difference of one cycle of the synchronizing pulse S800. The first to n-th synchronizing pulses S800a to S800n are applied to an OR gate 1010 and are then synthesized therein. The OR gate 1010 outputs the synchronizing pulses S800 identical with those of the first preferred embodiment of FIG. 1.

According to the second preferred embodiment, since the first to n-th synchronizing pulses S800a to S800n are generated in corresponding relation to the first to n-th sorted corrected synchronizing signals S600a to S600n having the cycle n times that of the corrected synchronizing signal S600, the outputs of the synchronizing pulses S800a to S800n may have a large amount of delay from the inputs of the sorted corrected synchronizing signals S600a to S600n. Although the delay amount is a maximum of one cycle of the synchronizing signal S601 in the first preferred embodiment, the delay amount is a maximum of n times the cycle thereof in the second preferred embodiment.

<<Third Preferred Embodiment>>

Figure 24:
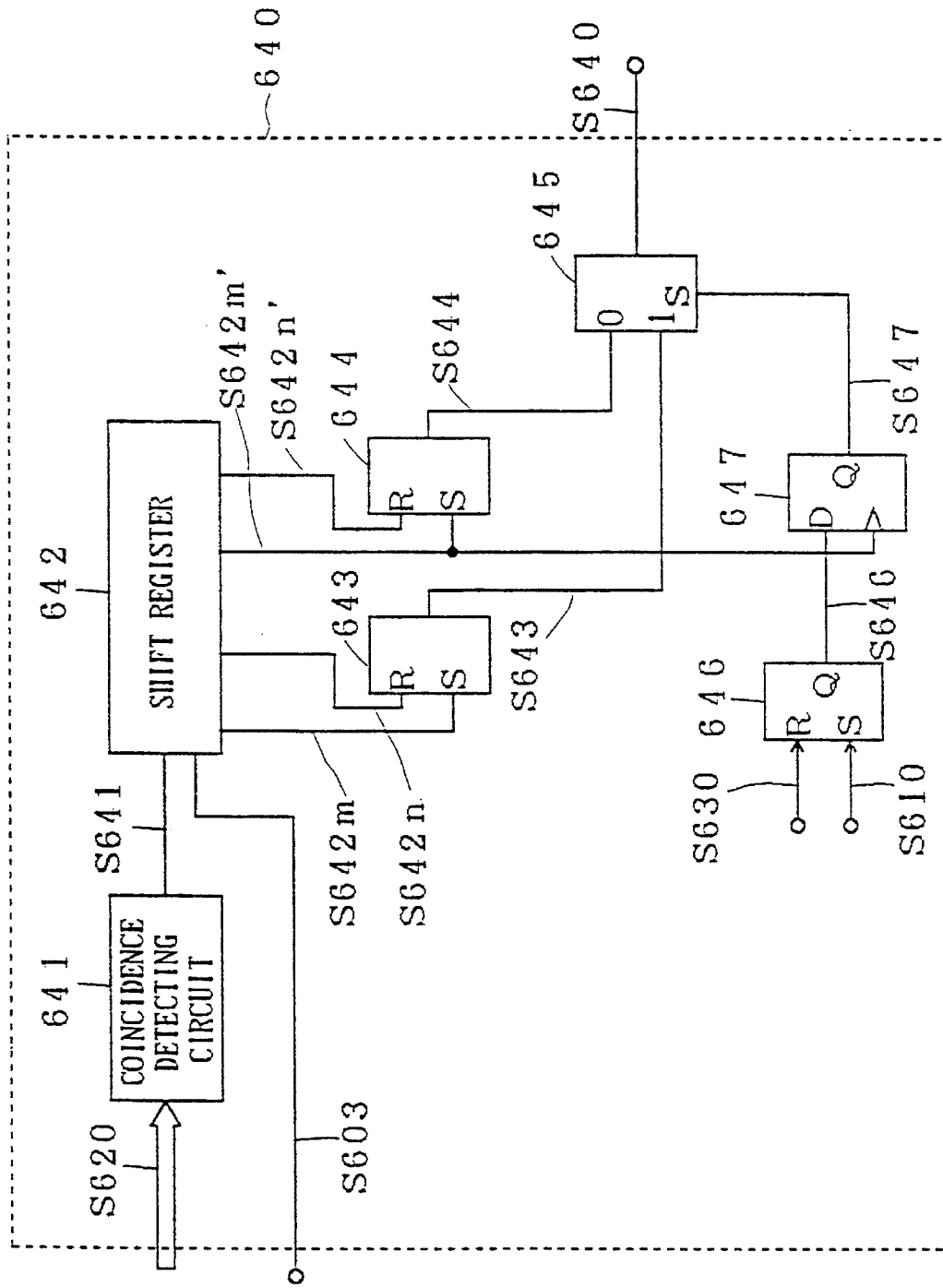
FIG. 24 is a block diagram of the synchronizing pulse generating circuit according to a third preferred embodiment of the present invention.

FIG. 24 is a block diagram of the synchronizing pulse generating circuit according to a third preferred embodiment of the present invention, particularly showing another arrangement of the synchronizing input permission portion 640 of the first preferred embodiment of FIG. 1. The synchronizing input permission portion 640 of the third preferred embodiment further includes RS flip-flops 644, 646, a D flip-flop 647, and a selector 645 in addition to the components of the synchronizing input permission portion 640 (FIG. 6) of the first preferred embodiment.

An m'-coincidence output signal S642m' and an n'-coincidence output signal S642n' from the shift register 642 are applied to the set terminal S and reset terminal R of the RS flip-flop 644, respectively. The m'-coincidence output signal S642m' is also applied to the trigger input terminal of the D flip-flop 647. The load pulses S630 from the free-running portion 630 are applied to the reset terminal R of the RS flip-flop 646, and the pulses S610 from the pulse generating portion 610 are applied to the set terminal S thereof. An output signal S646 from the RS flip-flop 646 is impressed upon the data input terminal D of the D flip-flop 647. An output signal S647 from the D flip-flop 647 is impressed upon the select terminal S of the selector 645. Output signals S643, S644 from the RS flip-flops 643, 644 are applied to two input terminals of the selector 645. The synchronizing input permission signal S640 is outputted from the output terminal of the selector 645. Other constructions of the synchronizing input permission portion 640 of FIG. 24 are identical with those of the synchronizing input permission portion 640 of FIG. 6.

In operation, the RS flip-flop 643 outputs the signal S643 which goes high in accordance with the counts m to n at the counter 620 of FIG. 1, and the RS flip-flop 644 outputs the signal S644 which goes high in accordance with the counts m' to n' at the counter 620. It is assumed herein that m'<m<n≦n'. One of the signals S643 and S644 is selected by the selector 645 and is outputted in the form of the synchronizing input permission signal S640.

No load pulses S630 are generated in the absence of the lack (synchronization lack) of the synchronizing signal S601. Then the output signals S646, S647 from the RS flip-flop 646 and D flip-flop 647 hold "H". The selector 645 selects the signal S643 as the synchronizing input permission signal S640 in response to the "H" signal S647. This synchronizing input permission signal S640 is a signal which goes high in accordance with the counts m to n at the counter portion 620 in the same manner as the first preferred embodiment of FIG. 1.

The load pulses S630 are generated when synchronization lack occurs. Then the RS flip-flop 646 is reset and its output signal S646 is "L". As a result, the output signal S647 from the D flip-flop 647 is inverted from "H" into "L" when the m'-coincidence output signal S642m ' rises. In response to the "L" signal S647, the selector 645 selects the signal S644 as the synchronizing input permission signal S640. This synchronizing input permission signal S640 is a signal which goes high in accordance with the counts m' to n' at the counter portion 620.

As above described, the active ("H") time period of the synchronizing input permission signal S640 during the synchronization lack is expanded to the range from m' to n' in the third preferred embodiment although it conventionally ranges from m to n. Such operation is particularly effective in the case where the normal synchronizing signal S601 is entered within some cycles after the occurrence of lack of the synchronizing signal S601. Since there is an error between the cycle value judged by counting the external clocks S603 and the actual cycle value of the synchronizing signal S601, successive lacks of the synchronizing signal S601 result in a lag of the time range in which the normal synchronizing signal S601 is expected to be entered. To compensate for the lag to ensure the normal synchronizing signal S601, the active ("H") time period of the synchronizing input permission signal S640 ranging from m to n is expanded to the range from m' to n'.

<<Fourth Preferred Embodiment>>

Figure 25:
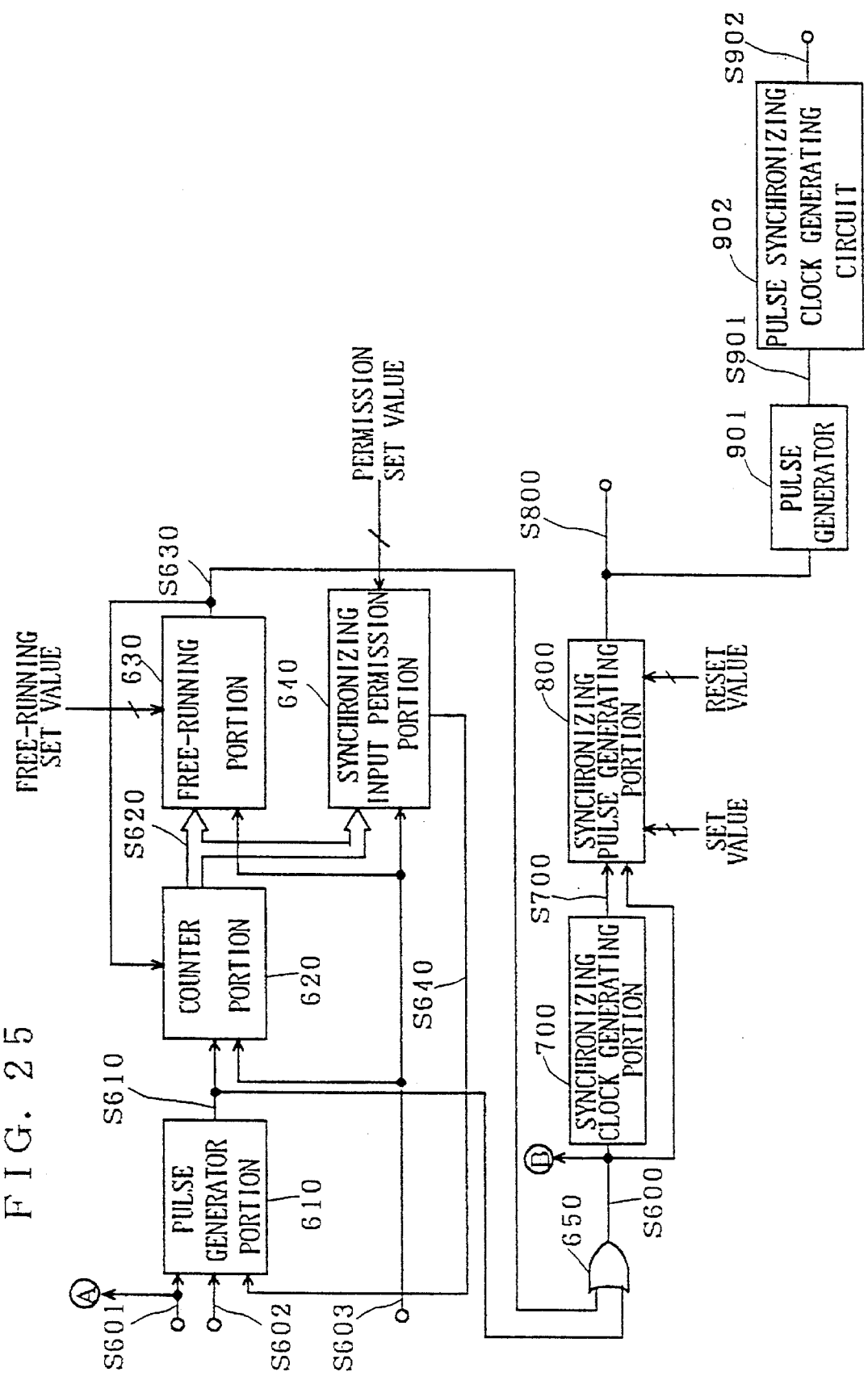
FIGS. 25 and 26 are block diagrams of the synchronizing pulse generating circuit according to a fourth preferred embodiment of the present invention.
Figure 26:
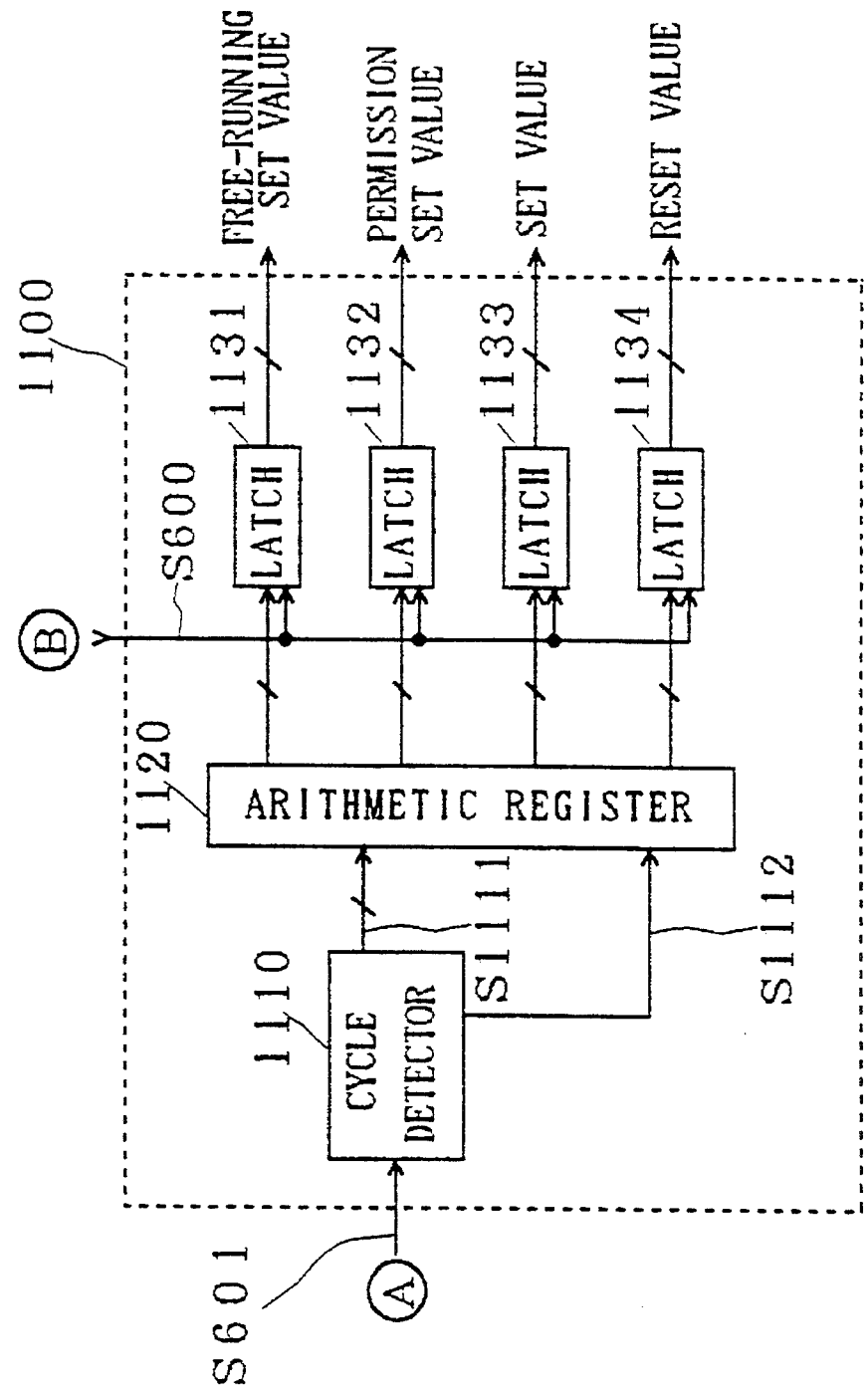

FIGS. 25 and 26 are block diagrams of the synchronizing pulse generating circuit according to a fourth preferred embodiment of the present invention. The synchronizing pulse generating circuit of the fourth preferred embodiment includes a set value changing portion 1100 in addition to the components of the first preferred embodiment of FIG. 1. The set value changing portion 1100 receives the synchronizing signal S601 and the corrected synchronizing signal S600 and automatically changes the free-running set value, permission set value, set value and reset value when a change occurs in the cycle of the synchronizing signal S601. The free-running set value is applied to the free-running portion 630, and the permission set value is applied to the synchronizing input permission portion 640. The set value and reset value are applied to the synchronizing pulse generating portion 800.

The set value changing portion 1100 includes a cycle detector 1110, an arithmetic register 1120, and latches 1131 to 1134. The cycle detector 1110, on receipt of the synchronizing signal S601, detects the cycle of the synchronizing signal S601 to output a cycle value signal S1111 indicative of the detected cycle value and cycle detection pulses S1112 in synchronism with the output timing of a new cycle value. The arithmetic register 1120, on receipt of the cycle value signal S1111 from the cycle detector 1110, executes arithmetic operations for the free-running set value, permission set value, set value, and reset value on the basis of the cycle value to output the arithmetic results on the basis of the timing of the cycle detection signal. The latches 1131 to 1134 latch the free-running set value, permission set value, set value, and reset value from the arithmetic register 1120 in synchronism with the corrected synchronizing signal S600.

Figure 27:
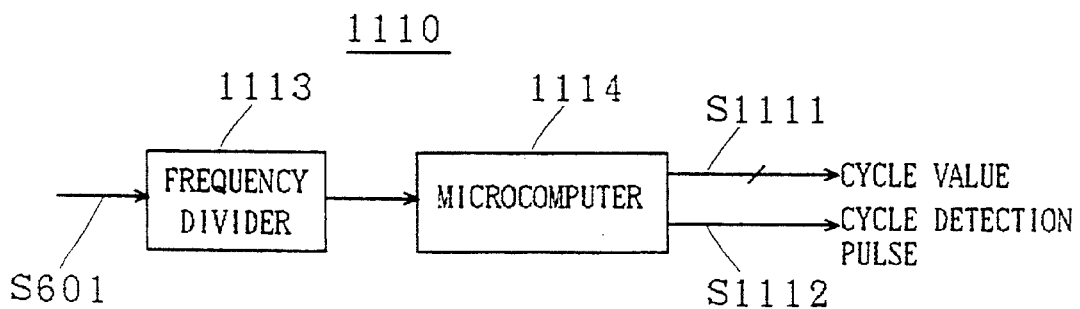
FIG. 27 is a block diagram of an exemplary arrangement of a frequency detecting portion.

FIG. 27 is a block diagram showing an exemplary arrangement of the cycle detector 1110. A frequency divider 1113 divides the frequency of the synchronizing signal S601. The output from the frequency divider 1113 is applied to the timer input terminal of a microcomputer 1114. The microcomputer 1114 measures the cycle of the output from the frequency divider 1113 with a timer to detect the cycle of the synchronizing signal S601. The synchronizing signal S601 is frequency-divided so as to prolong the timer measuring time length for measurement accuracy. The ratio of frequency division of the frequency divider 1113 should be determined in accordance with the measurement accuracy. For low accuracy, the frequency divider 1113 is unnecessary and the synchronizing signal S601 should be applied directly to the microcomputer 1114.

The microcomputer 1114 measures the cycle of the synchronizing signal S601 repeatedly or for each given time interval. The microcomputer 1114 ignores a succession of disturbances of the synchronizing signal S601, if in a short time such as about 100 cycles, without judging that the cycle of the synchronizing signal S601 has changed. If a succession of disturbances last over 100 cycles which are followed by a new, stable cycle, the microcomputer 1114 judges that the cycle of the synchronizing signal S601 has completely changed.

In some systems, the cycle of the synchronizing signal S601 changes during vertical synchronizing input. It is therefore desirable to exclude a cycle considered to have been measured during the vertical synchronizing input as a result of the cycle judgement of the synchronizing signal S601 by the microcomputer 1114. Such processing may be readily attained in microcomputers.

The microcomputer 1114 represents the measured cycle value of the synchronizing signal S601 in the form of the number of external clocks S603 given in one cycle of the synchronizing signal S601 in accordance with a preprogrammed conversion formula to output the number as the cycle value signal S1111. The microcomputer 1114 also outputs the cycle detection pulses S1112 in synchronism with the output timing of the new cycle value signal S1111.

Figure 28:
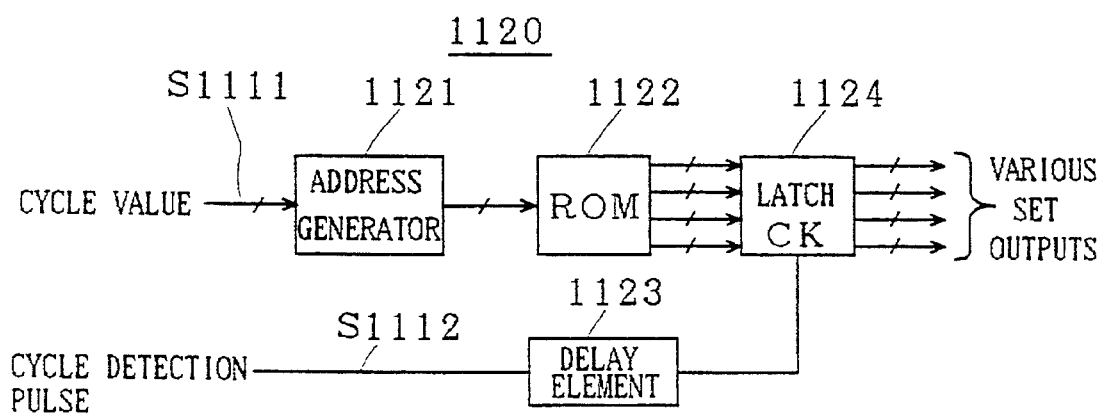
FIG. 28 is a block diagram of an exemplary arrangement of an arithmetic register.

FIG. 28 is a block diagram showing an exemplary arrangement of the arithmetic register 1120. An address generator 1121 receives the cycle value signal S1111 from the cycle detector 1110 and outputs a ROM address corresponding to the cycle value. A ROM 1122 is addressed by the address from the address generator 1121 to read the corresponding free-running set value, permission set value, set value, and reset value. The read values are stored in a latch 27 and outputted therefrom in synchronism with the signal given by delaying the cycle detection pulses S1112 from the cycle detector 1110 by a delay element 1123. The amount of delay in the delay element 1123 is not less than the delay amount in the address generator 1121 and ROM 1122. This enables the latch 1124 to ensure prompt latching of the output data from the ROM 1122 corresponding to the cycle value signal S1111.

Figure 29:
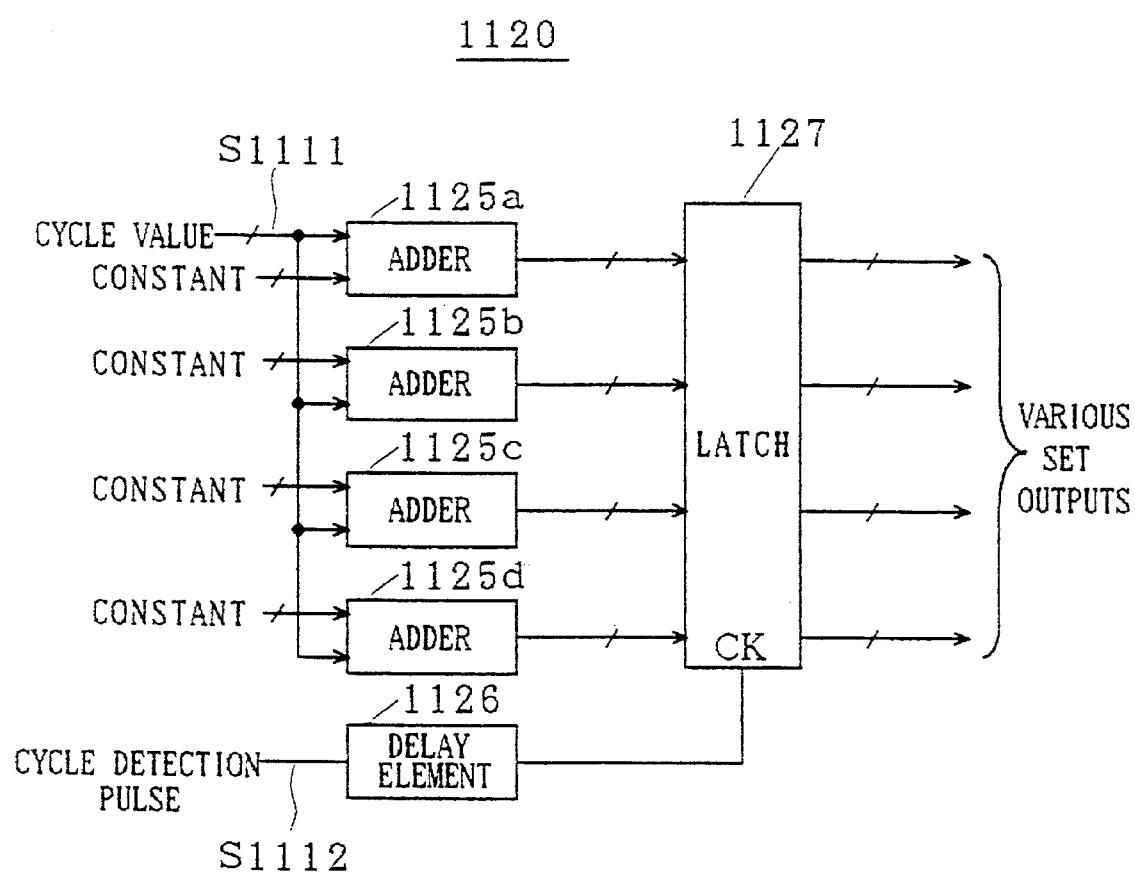
FIG. 29 is a block diagram of another arrangement of the arithmetic register.

FIG. 29 is a block diagram showing another arrangement of the arithmetic register 1120. Adders 1125a to 1125d add respective predetermined constants to the cycle value represented by the cycle value signal S1111 from the cycle detector 1110. The outputs from the adders 1125a to 1125d are the free-running set value, permission set value, set value, and reset value, respectively. These values are stored in a latch 1127 and outputted therefrom in synchronism with the signal given by delaying the cycle detection pulses S1112 from the cycle detector 1110 by a delay element 1126 in the same manner as shown in FIG. 28.

The free-running set value, permission set value, set value, and reset value outputted from the arithmetic register 1120 of FIG. 26 are latched into the latches 1131 to 1134 and are then impressed upon the free-running portion 630, synchronizing input permission portion 640, and synchronizing pulse generating portion 800 of FIG. 25. The trigger signal for the latches 1131 to 1134 is the corrected synchronizing signal S600 outputted from the OR gate 650 receiving the pulses S610 from the pulse generating portion 610 and the load pulses S630 from the free-running portion 630. Since the free-running portion 630 receiving the free-running set value and the synchronizing input permission portion 640 receiving the permission set value are placed into operation by the count signal S620 from the counter portion 620 which is reset by the pulses S610 and loaded with the predetermined load value by the load pulses S630, the corrected synchronizing signal S600 is suitably used as the trigger signal for the latches 1131 and 1132. Further, since the synchronizing pulse generating portion 800 receiving the set value and reset value is reset in response to the corrected synchronizing signal S600, the corrected synchronizing signal S600 is suitably used as the trigger signal for the latches 1133 and 1134.

Figure 30:
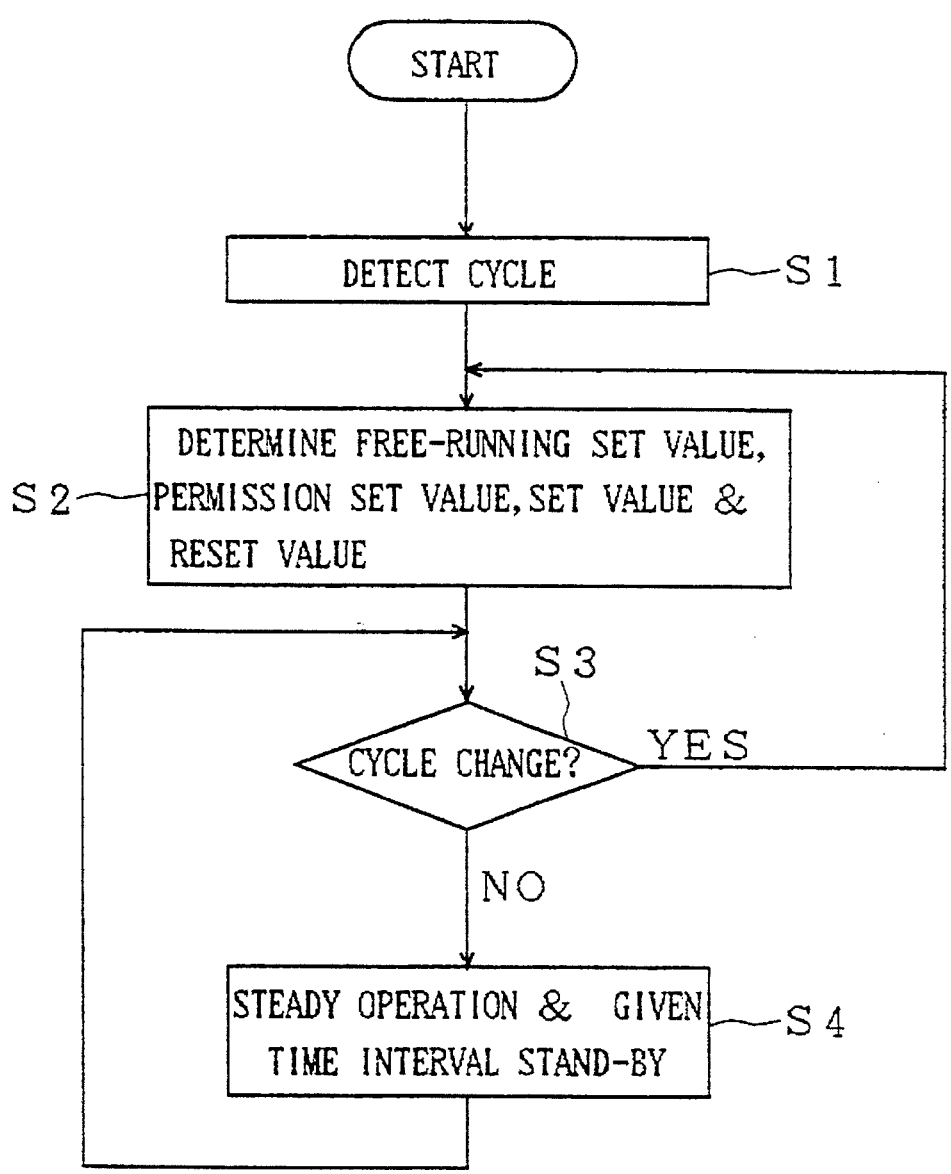
FIG. 30 is a flow chart showing automatic setting of various set values.

FIG. 30 is a flow chart showing operation for automatically setting the free-running set value, permission set value, set value, and reset value in accordance with the cycle of the synchronizing signal S601 in the synchronizing pulse generating circuit shown in FIGS. 25 to 29. Upon starting the operation of the synchronizing pulse generating circuit, the cycle of the synchronizing signal S601 is detected in the step S1. The detection is performed in the cycle detector 1110. If the cycle measured by the cycle detector 1110 is stable, the stable cycle is the detected cycle by the cycle detector 1110. The free-running set value, permission set value, set value, and reset value are determined in accordance with the detected cycle in the step S2. The determination is made by the arithmetic register 1120 and latches 1131 to 1134. Then the steady operation of the synchronizing pulse generating circuit starts.

In the step S3, it is judged whether or not there is a change in the cycle of the synchronizing signal S601. The judgement is made by monitoring (measuring) the cycle of the synchronizing signal S601 repeatedly or for each given time interval in the cycle detector 1110, as above described. Upon detection of a cycle change, the process returns to the step S2 in which the free-running set value, permission set value, set value, and reset value are again determined and then the steady operation starts again. If no cycle change is detected, the steady operation is continued in the step S4. For the detection of the cycle detector 1110 for each given time interval, the processing of the step S3 is carried out after standby for the given time interval. Repeating the foregoing operation provides for the automatic establishment of the free-running set value, permission set value, set value, and reset value in accordance with the cycle change of the synchronizing signal S601.

<<Fifth Preferred Embodiment>>

Prompt changes of the free-running set value, permission set value, set value, and reset value in the foregoing manner by the set value changing portion 1100 in response to the cycle change of the synchronizing signal S601 cause an abrupt change of the cycle of the synchronizing pulses S800 which are the final output for each cycle change of the synchronizing signal S601. This is not desirable because of the strong likelihood of damages to a high-voltage system of the multi-synchronization type display monitor when the synchronizing pulses S800 are used in the display monitor as HD pulses.

There are two solutions to eliminate this adverse influence. One of the solutions is a modification of the fourth preferred embodiment for gradual transition from the old cycle to the new cycle in the microcomputer 1114 of FIG. 27. For example, it is assumed that the microcomputer 1114 recognizes that the cycle of the synchronizing signal S601 has changed from 10 microseconds to 15 microseconds. The contents of the cycle value signal S1111 outputted from the microcomputer 1114 are gradually changed in increments of a value corresponding to one microsecond in sequential order from a value corresponding to 10 microseconds. The cycle detection pulses S1112 are outputted each time the contents of the cycle value signal S1111 are changed. The cycle value signal S1111 of a value corresponding to 15 microseconds and the cycle detection pulses S1112 are finally outputted. This enables gradual changes of the free-running set value, permission set value, set value and reset value, thereby gradually changing the cycle of the synchronizing pulses S800 which are the final output.

Figure 31:
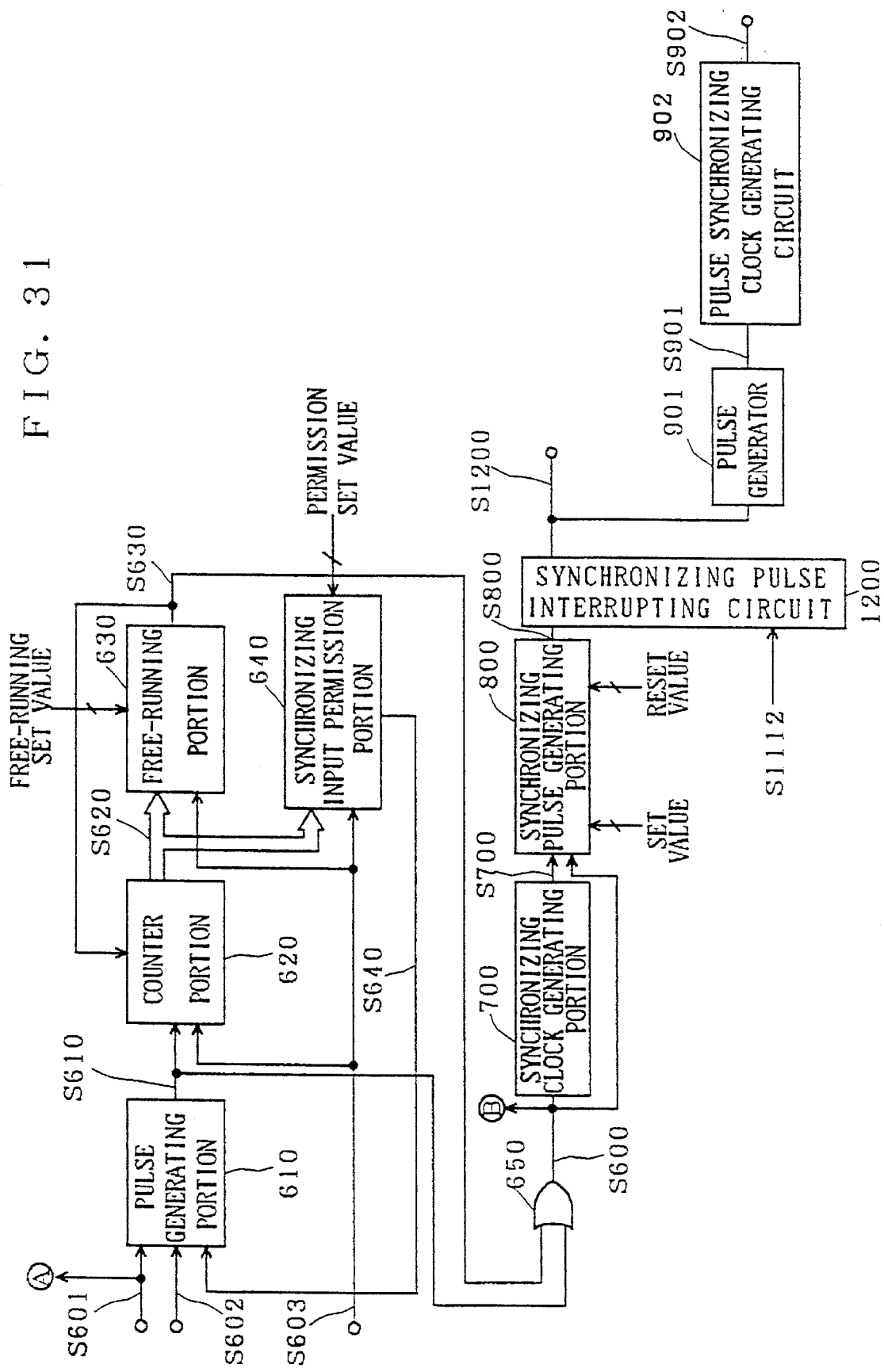
FIG. 31 is a block diagram of the synchronizing pulse generating circuit according to a fifth preferred embodiment of the present invention.

The second solution is shown in FIG. 31. FIG. 31 is a block diagram of the synchronizing pulse generating circuit according to a fifth preferred embodiment of the present invention. The set value changing portion 1100 of FIG. 31 is identical with that of FIG. 26. The synchronizing pulse generating circuit of the fifth preferred embodiment comprises a synchronizing pulse interrupting circuit 1200 in addition to the components of the synchronizing pulse generating circuit of the fourth preferred embodiment of FIG. 25. The synchronizing pulse interrupting circuit 1200 receives the synchronizing pulses S800 from the synchronizing pulse generating portion 800 and the cycle detection pulses S1112 from the cycle detector 1110 (FIG. 26). If the cycle detection pulses S1112 are generated or the cycle change of the synchronizing signal S601 is detected by the cycle detector 1110, the synchronizing pulse interrupting circuit 1200 interrupts the synchronizing pulses S800 for several cycles. New synchronizing pulses S1200 are thus generated and outputted.

The concept of the fifth preferred embodiment is that, since the cycle changes of the synchronizing pulses S800 damage the high voltage system of the display monitor due to the long-term drive of the high voltage system, reduction in drive time of the high voltage system can prevent the damage. In cycle changes of the synchronizing signal S601, the output of the synchronizing pulses S800 is interrupted to shorten the drive time of the high voltage system. This enables at-one-time transition from the old cycle to the new cycle, thereby reducing the time required for cycle change operation.

Figure 32:
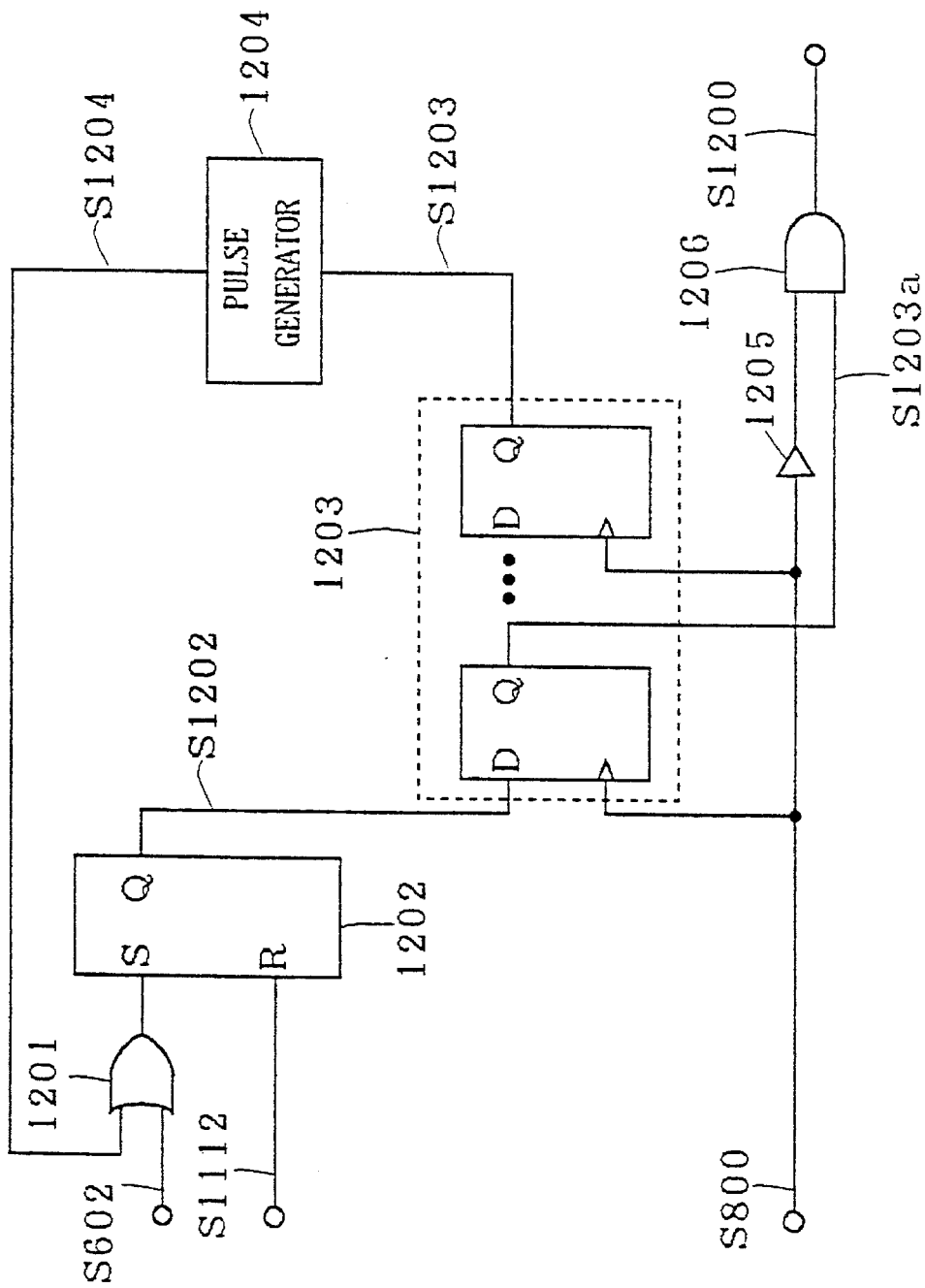
FIG. 32 is a block diagram of an exemplary arrangement of a synchronizing pulse interrupting circuit.

FIG. 32 is a block diagram showing an exemplary arrangement of the synchronizing pulse interrupting circuit 1200. The forcible reset signal S602 from the reset terminal 602 (FIG. 1) is applied to a first input terminal of an OR gate 1201. The output signal from the OR gate 1201 is applied to the set input terminal S of an RS flip-flop 1202. The cycle detection pulses S1112 from the cycle detector 1110 (FIG. 26) are applied to the reset input terminal: R of the RS flip-flop 1202. The output signal S1202 from the RS flip-flop 1202 is impressed upon the data input terminal of a shift register 1203. The shift register 1203 is triggered by the rising edge of the synchronizing pulses S800 to accept and sequentially shift the signal S1202. The final output signal S1203 from the shift register 1203 is applied to a pulse generator 1204. The pulse generator 1204 generates pulses S1204 in synchronism with the falling of the signals S1203. The pulses S1204 are impressed upon a second input terminal of the OR gate 1201. A first output signal S1203a of the shift register 1203 (an output signal from a first one of a multiplicity of in-series connected D flip-flops forming the shift register 1203) is applied to a first input terminal of an AND gate 1206. The synchronizing pulses S800 are delayed by a delay element 1205, and the delayed signal is applied to a second input terminal of the AND gate 1206. The new synchronizing pulses S120 substituted for the synchronizing pulses S800 are outputted from the output terminal of the AND gate 1206.

Figure 33:
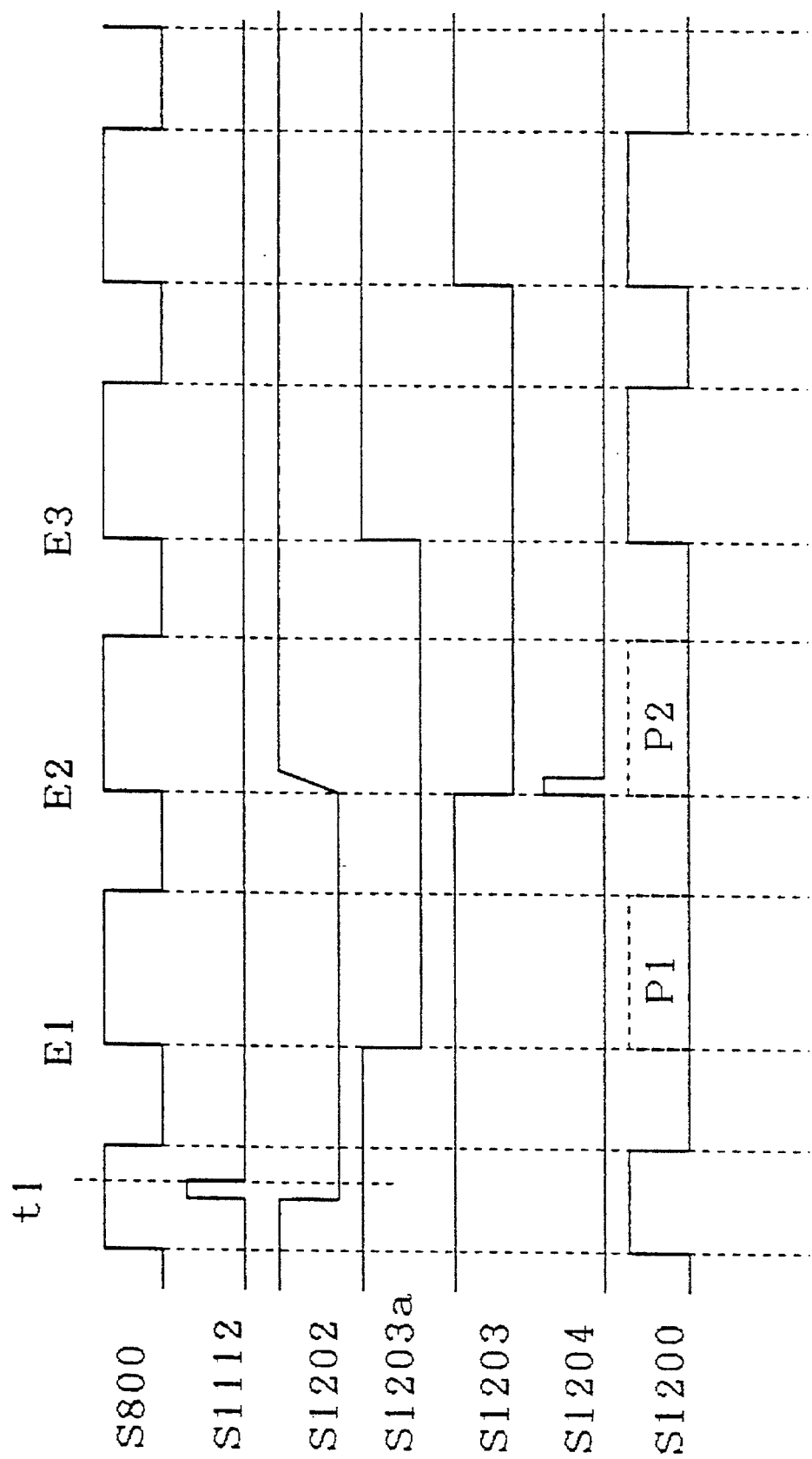
FIGS. 33 and 34 are timing charts showing the operation of the synchronizing pulse interrupting circuit.
Figure 34:
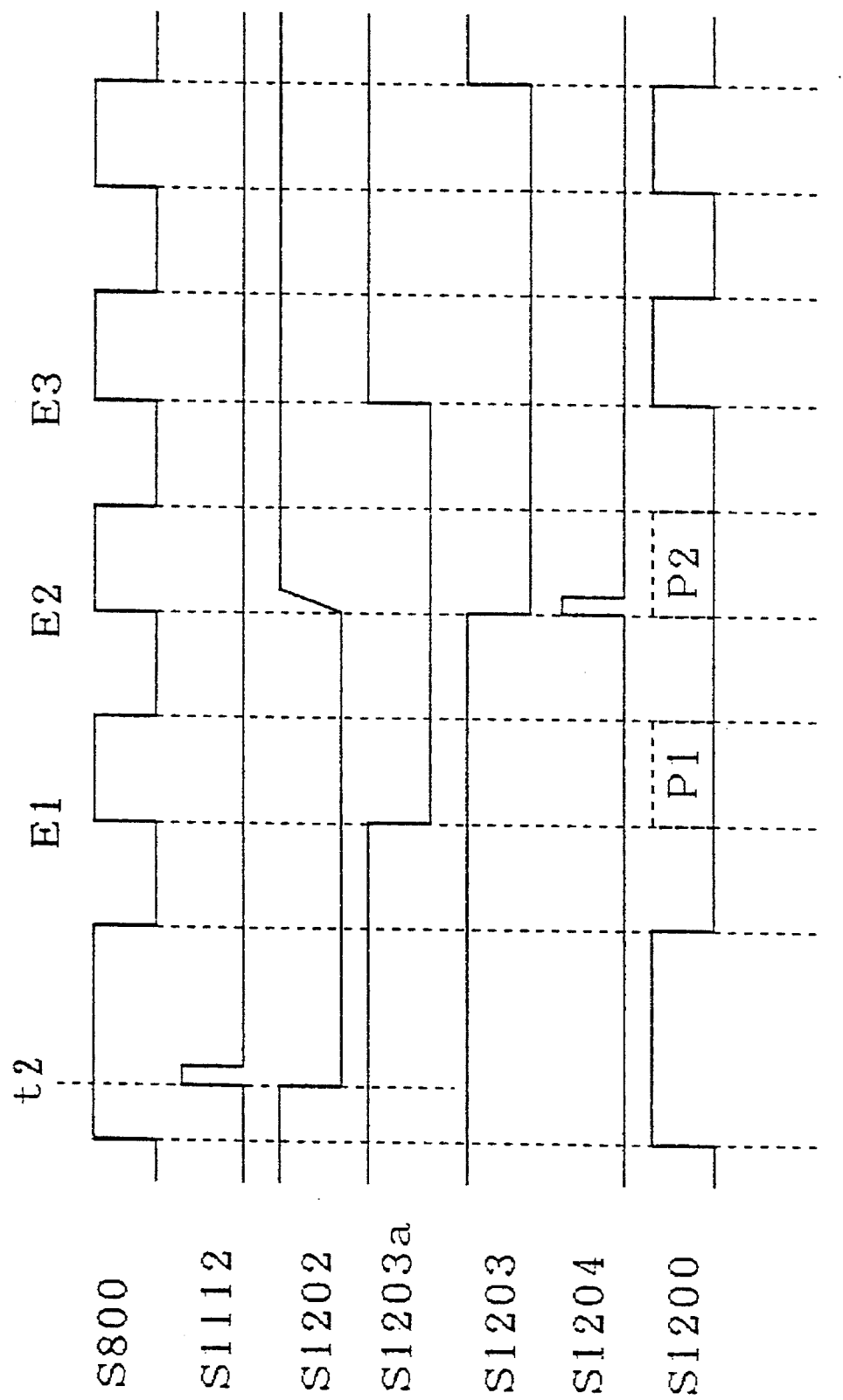

FIGS. 33 and 34 are timing charts showing the operation of the synchronizing pulse interrupting circuit 1200 of FIG. 32. The following description is based on the assumption that the shift register 1203 is comprised of two in-series connected flip-flops.

At times t1 and t2, the cycle detection pulse S800 is generated, that is, the cycle change of the synchronizing signal S601 is detected. The cycle detection pulses S1112 reset the RS flip-flop 1202, whereby the output signal S1202 of the RS flip-flop 1202 falls to "L". At the first rising E1 of the synchronizing pulses S800 after the cycle change, the "L" output signal S1202 from the RS flip-flop 1202 is accepted by the shift register 1203. The first output signal S1203a from the shift register 1203 falls to "L", and the AND gate 1206 turns off. This fixes the synchronizing pulses S1200 to "L", the synchronizing pulse output being interrupted.

At the second rising E2 of the synchronizing pulses S800, the final output signal S1203 from the shift register 1203 falls to "L". In response to the falling, the pulse generator 1204 outputs the pulses S1204. The pulses S1204 set the RS flip-flop 1202 through the OR gate 1201, whereby the output signal S1202 from the RS flip-flop 1202 rises to "H". At the third rising E3 of the synchronizing pulses S800, the first output signal S1203a from the shift register 1203 returns to "H". This places the AND gate 1206 again into the through state, restarting the output of the synchronizing pulses S1200. It should be noted that, when the power is applied, the forcible reset signal S602 is adapted to set the RS flip-flop 1202 once to initialize the output signal S1202 thereof "H".

The foregoing operation is applicable whether the cycle of the synchronizing signal S601 is long (FIG. 33) or short (FIG. 34).

Attention will now be paid to the new synchronizing pulses S1200. The synchronizing pulse interrupting circuit 1200 interrupts two synchronizing pulses (P1 and P2). When the cycle is changed from the short cycle to the long cycle such as at time t1, the "H" period of the synchronizing pulses S1200 sometimes grows long suddenly in the presence of the pulse P1. Considering that the "H" period of the synchronizing pulses is the drive time of the high voltage system of the display monitor, such situation causes the drive time of the high voltage system to grow long suddenly, resulting in damages to the high voltage system. In the fifth preferred embodiment, however, the pulses P1 and P2 are interrupted to avoid such disadvantages. The number of interrupted synchronizing pulses S1200 is readily changed by changing the number of interconnected flip-flops included in the shift register 1203, providing high flexibility.

<<Sixth Preferred Embodiment>>

Figure 35:
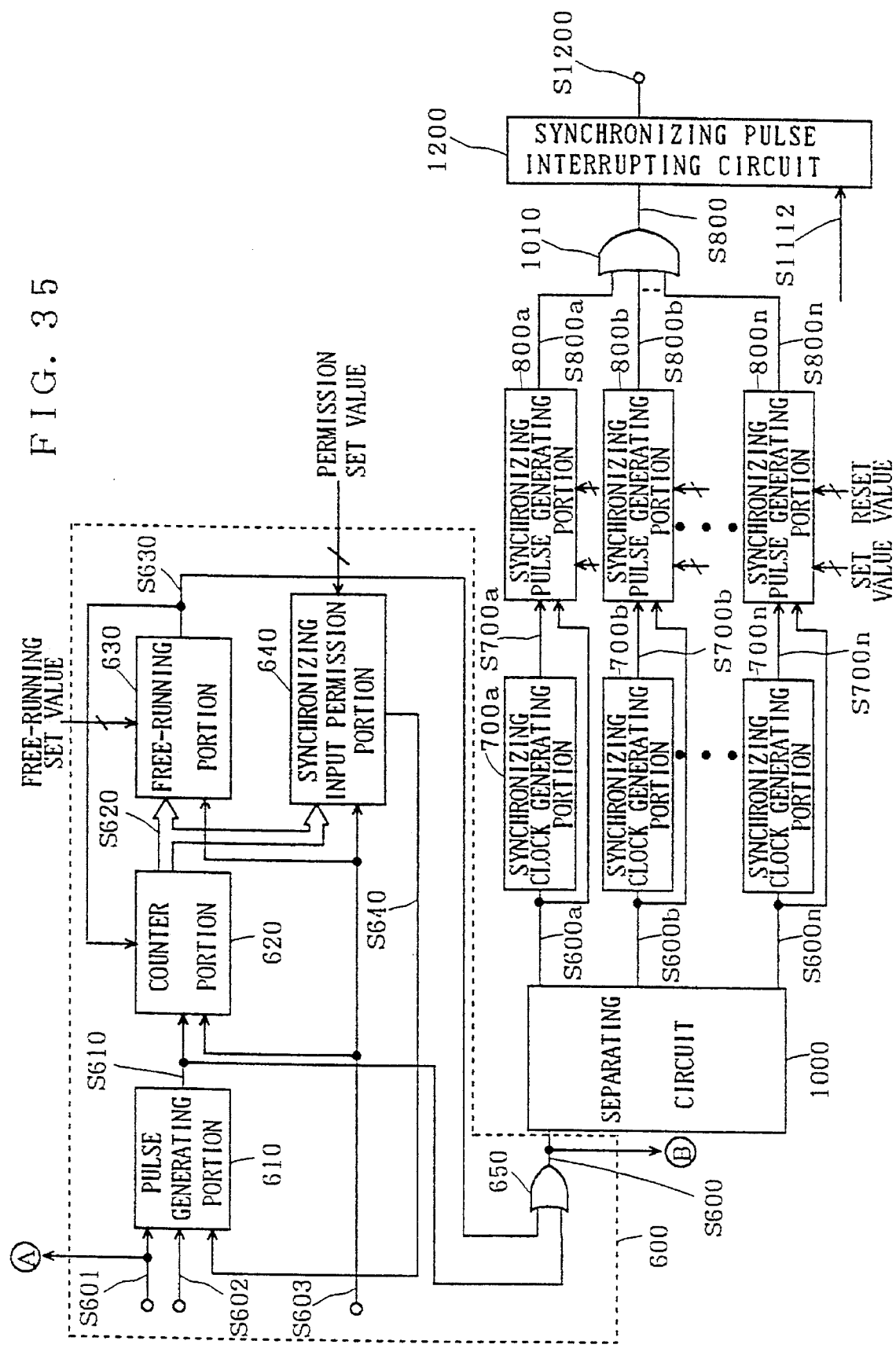
FIGS. 35 and 36 are block diagrams of the synchronizing pulse generating circuit according to a sixth preferred embodiment of the present invention.
Figure 36:
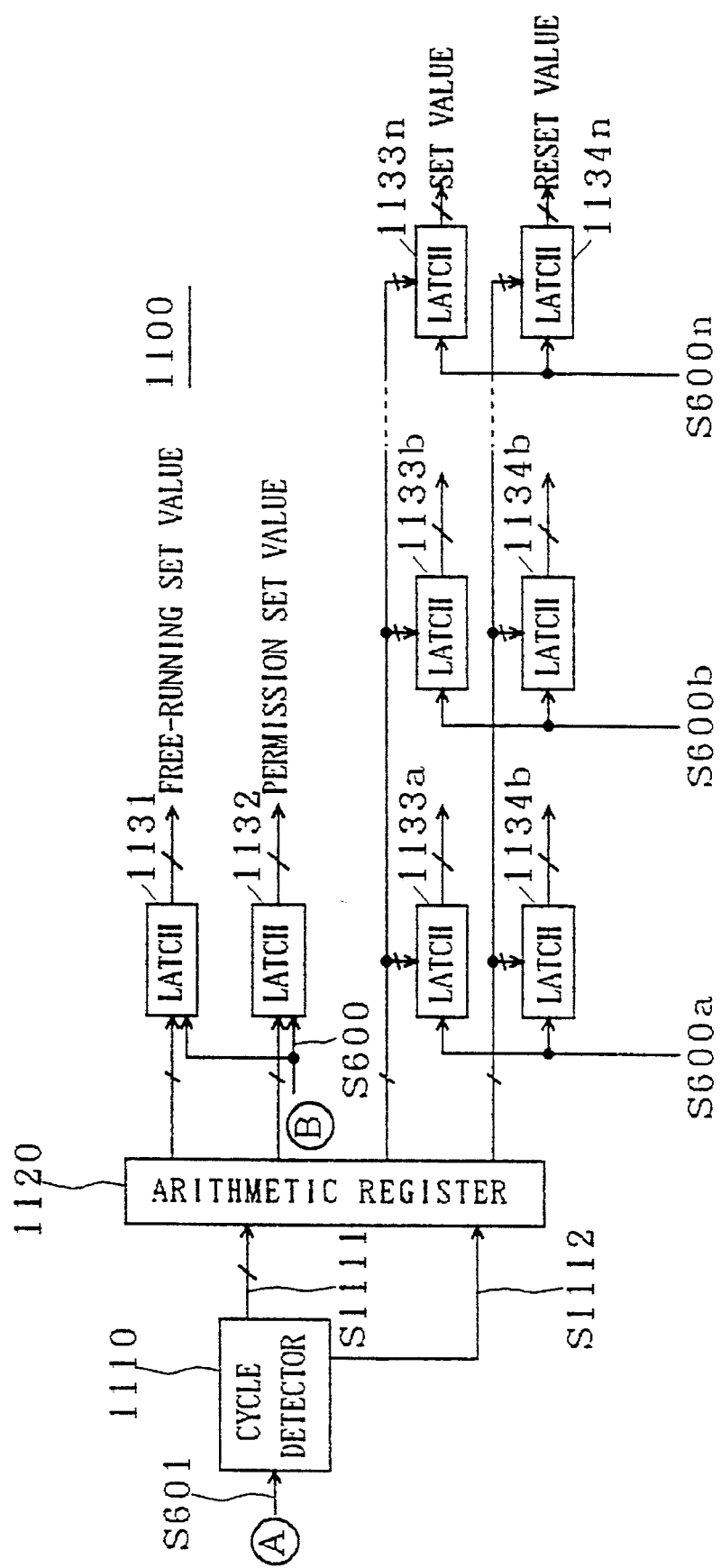

FIGS. 35 and 36 are block diagrams of the synchronizing pulse generating circuit according to a sixth preferred embodiment of the present invention. The synchronizing pulse generating circuit of the sixth preferred embodiment comprises the set value changing portion 1100 and the synchronizing pulse interrupting circuit 1200 in addition to the components of the synchronizing pulse generating circuit of the second preferred embodiment of FIG. 23.

The set value changing portion 1100 of the sixth preferred embodiment is basically similar in construction to that of FIG. 26 except that n latches 1133a to 1133n for applying set values to the synchronizing pulse generating portions 800a to 800n and n latches 1134a to 1134n for applying reset values thereto are provided in corresponding relation to the n synchronizing pulse generating portions 800a to 800n. Trigger signals for the respective latches 1133a to 1133n and 1134a to 1134n are the corresponding sorted corrected synchronizing signals S600a to S600n. The synchronizing pulse interrupting circuit 1200 of the sixth preferred embodiment is similar in construction to that of FIG. 32.

Figure 37:
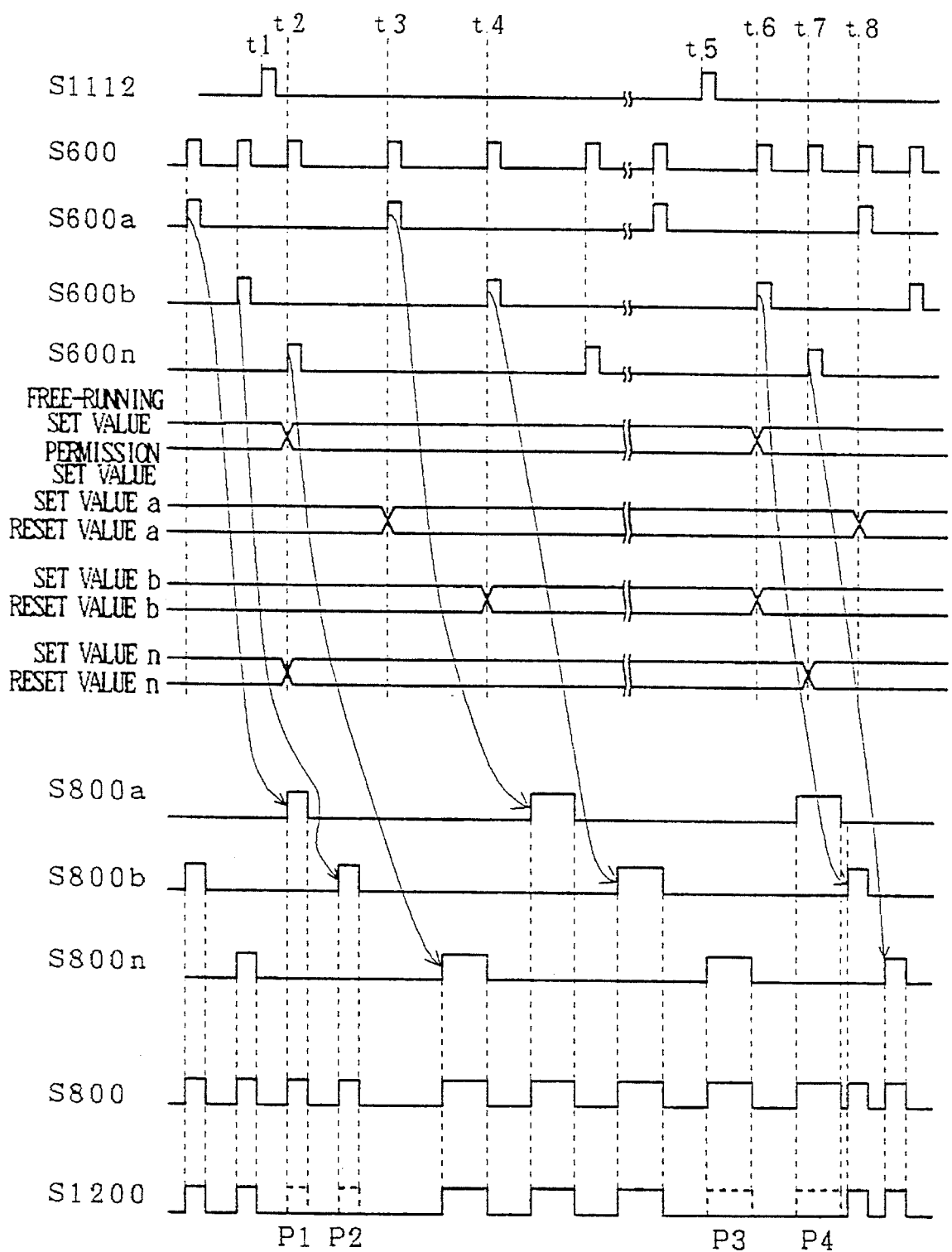
FIG. 37 is a timing chart showing the operation of the sixth preferred embodiment.
Figure 38:
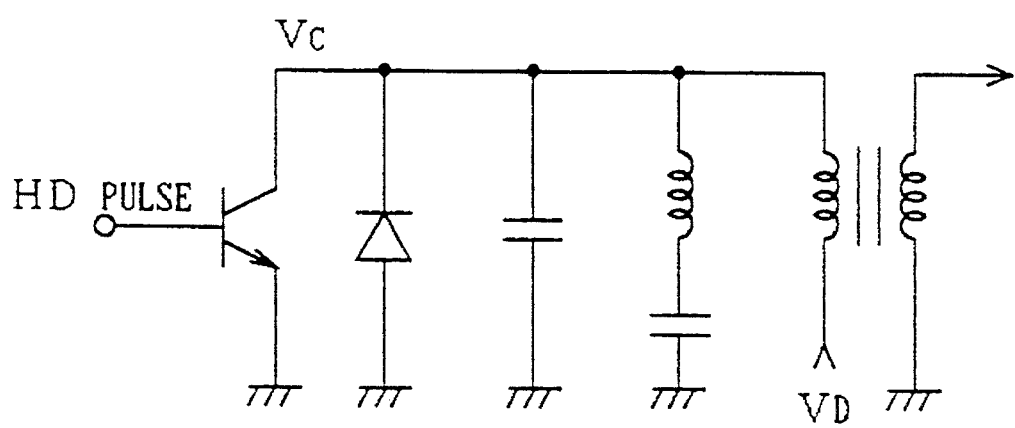
FIG. 38 is a circuit diagram of a horizontal drive circuit for a multi-synchronization type display monitor.
Figure 39:
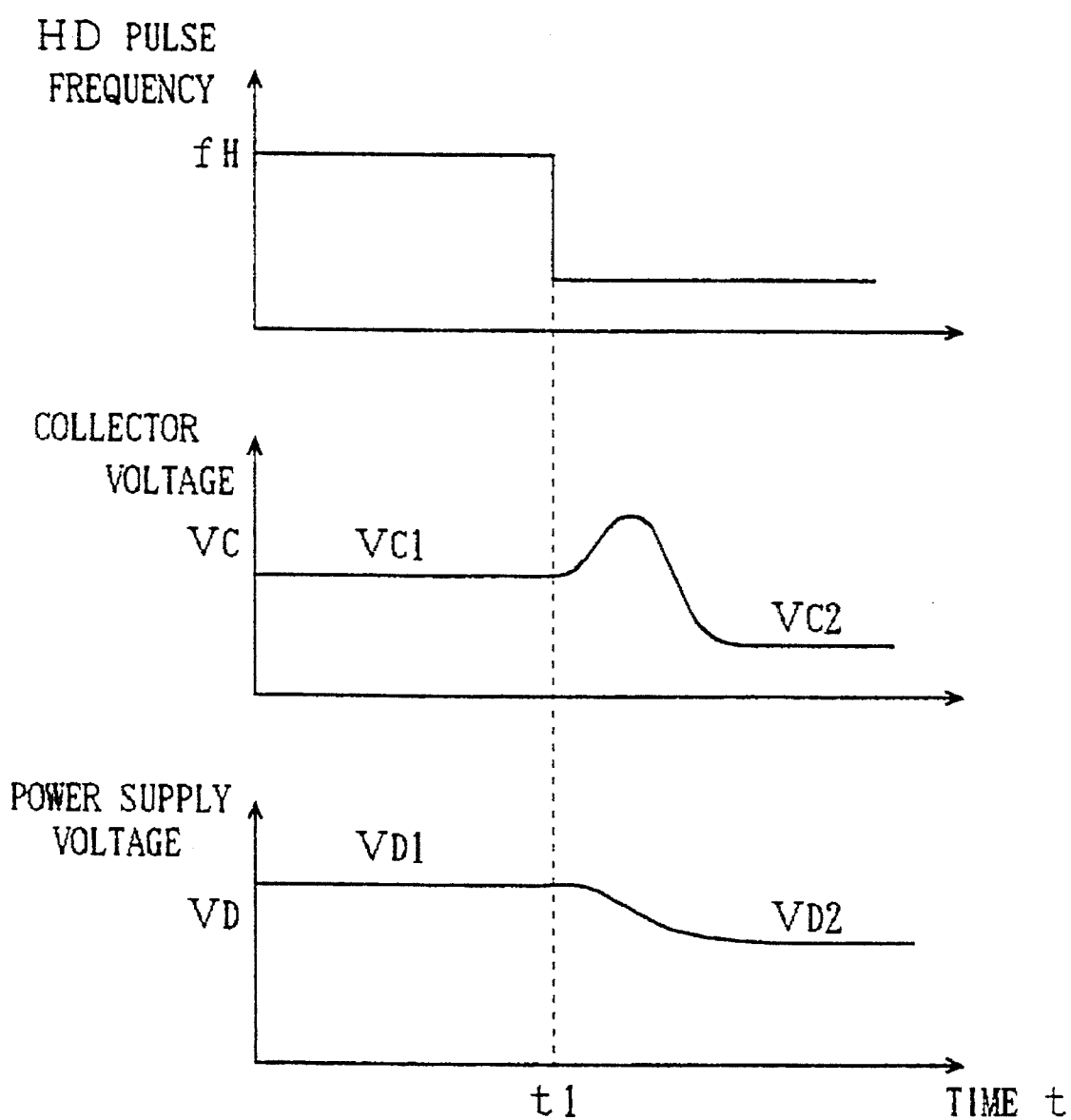
FIG. 39 is a waveform chart showing the operation of the horizontal drive circuit.
Figure 40:
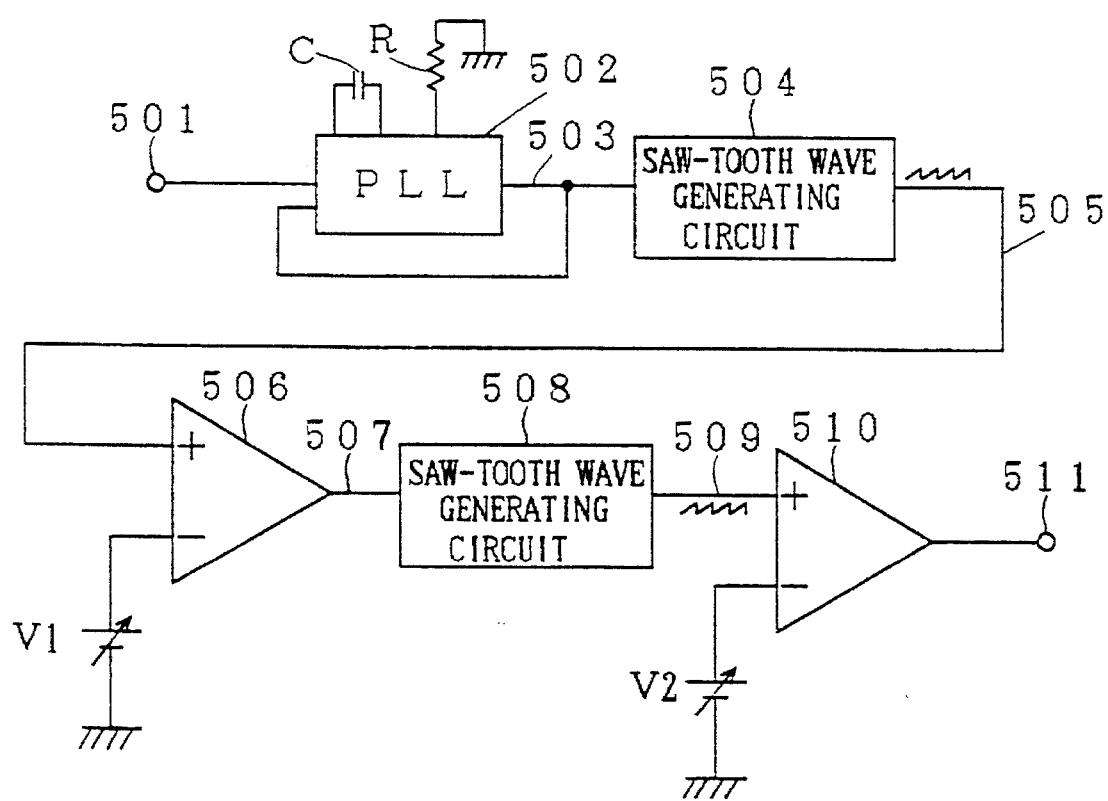
FIG. 40 is a circuit diagram of a conventional synchronizing pulse generating circuit.
Figure 41:
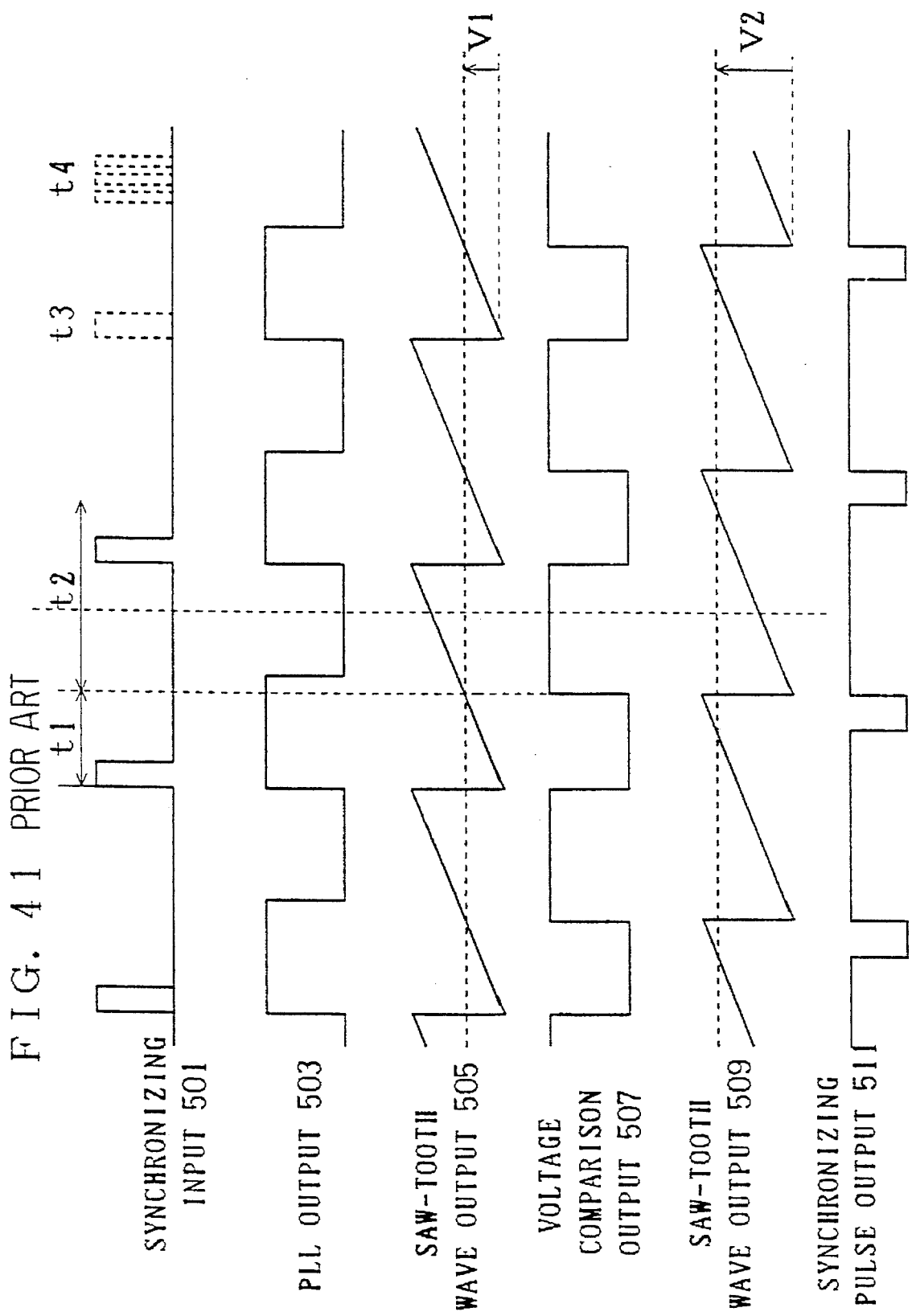
FIG. 41 is a timing chart showing the operation of the conventional synchronizing pulse generating circuit.

FIG. 37 is a timing chart showing the operation of the synchronizing pulse generating circuit of FIGS. 35 and 36 where n=3 and the number of interrupted pulses is 2. It is assumed that the cycle of the synchronizing signal S601 is doubled at t1 and halved at t5.

The cycle detection signal S1112 is generated at t1, and the free-running set value and permission set value are updated at the following rising (t2) of the corrected synchronizing signal S600. At the same time, the corrected synchronizing signal S600 at t2 is outputted by the separating circuit 1000 in the form of the sorted corrected synchronizing signal S600n which updates the set value n and reset value n. Likewise, the set value a and reset value a are updated at t3, and the set value b and reset value b are updated at t4.

The synchronizing pulses S800n from the synchronizing pulse generating portion 800n in synchronism with the sorted corrected synchronizing signal S600n are generated on the basis of the updated set and reset values after the time t2. Likewise, the synchronizing pulses S800a are generated on the basis of the updated set and reset values after the time t3, and the synchronizing pulses S800b are generated on the basis of the updated set and reset values after the time t4. The synchronizing pulses S800 are the combination of the synchronizing pulses S800a, S800b, and S800n.

The synchronizing pulse interrupting circuit 1200 interrupts two synchronizing pulses S1200 (P1, P2) after the generation of the cycle detection pulses S1112. Thus the cycle of the synchronizing pulses S1200 is doubled in response to the doubled cycle of the synchronizing signal S601 without prolonging the drive time of the high voltage system of the display monitor.

The operation for halving the cycle by the generation of the cycle detection pulses S1112 at time t5 is similar to the above mentioned operation for doubling the cycle. Two synchronizing pulses S1200 (P3, P4) are interrupted when the cycle is halved.

While the invention has been shown and described in detail, the foregoing description is in all aspects illustrative and not restrictive. It is therefore understood that numerous modifications and variations can be devised without departing from the scope of the invention.

What is claimed is:

1. A synchronizing pulse generating circuit comprising:

a synchronizing signal input terminal receiving a synchronizing signal;

synchronization lack correcting means receiving said synchronizing signal from said synchronizing signal input terminal for correcting said synchronizing signal for partial lack to generate a corrected synchronizing signal on the basis of one of set values;

synchronizing clock generating means receiving said corrected synchronizing signal from said synchronization lack correcting means for generating a synchronizing clock synchronized with said corrected synchronizing clock synchronizing signal with said corrected synchronizing signal; synchronizing pulse generating means receiving said synchronizing clock from said synchronizing clock generating means for counting said synchronizing clock to generate synchronizing pulses synchronized with said synchronizing signal on the basis of said one of set values; and set value changing means receiving said synchronizing signal from said synchronizing signal input terminal for detecting the cycle of said synchronizing signal to change the set values used by said synchronization lack correcting means and said synchronizing pulse generating means, in accordance with said cycle.

2. The synchronizing pulse generating circuit of claim 1, wherein said set value changing means outputs a cycle detection signal each time said set value changing means detects a cycle change of said synchronizing signal, said synchronizing pulse generating circuit further comprising synchronizing pulse interrupting means receiving said cycle detection signal from said set value changing means and said synchronizing pulses from said synchronizing pulse generating means for interrupting a predetermined number of said synchronizing pulses in response to said cycle detection signal.

3. The synchronizing pulse generating circuit of claim 1, wherein said synchronization lack correcting means comprises, pulse generating means for receiving said synchronizing signal and a synchronizing input permission signal to be placed into a pulse generable state by said synchronizing input permission signal and generate a pulse in response to said synchronizing signal, counter means for receiving said pulse from said pulse generating means and an external clock to be reset in response to said pulse from said pulse generating means and count an external clock to output a count signal, free-running means for receiving said count signal to output a load pulse when said count signal reaches a predetermined value, synchronizing input permission means for receiving said count signal to output said synchronizing input permission signal when said count signal falls within a range between predetermined first and second values which are not more than said predetermined value, and logical OR means for receiving said pulse from said pulse generating means and said load pulse to output said corrected synchronizing signal.

4. The synchronizing pulse generating circuit of claim 1, wherein said synchronizing clock generating means comprises;

inverting delay means for sequentially inverting and delaying a reference clock by a plurality of inverting delay elements to generate a plurality of inverted delay clocks and a plurality of non-inverted delay clocks, memory means composed of a plurality of memory elements each having a data input terminal and a data output terminal and responding to a corresponding one of said inverted or non-inverted delay clocks to output a data received at said data input terminal from said data output terminal, phase detecting means for comparing signals outputted from said output terminals of adjacent said memory elements to provide one of said input terminals of said adjacent memory elements with a comparison signal as a comparison result, and clock selecting means for selecting one of said inverted or non-inverted delay clocks by means of said comparison signal outputted from said phase detecting means to derive said synchronizing clock.

5. The synchronizing pulse generating circuit of claim 1, wherein said synchronizing clock generating means comprises;

inverting delay means for sequentially inverting and delaying a reference clock by a plurality of inverting delay elements to generate a plurality of inverted delay clocks and a plurality of non-inverted delay clocks, memory means composed of a plurality of memory elements each having a data input terminal and a data output terminal and responding to a corresponding one of said inverted or non-inverted delay clocks to output a data received at said data input terminal from said data output terminal, phase detecting means for comparing signals outputted from said output terminals of adjacent said memory elements to provide one of said input terminals of said adjacent memory elements with a comparison signal as a comparison result, and clock selecting means for selecting designated one or ones of said inverted or non-inverted delay clocks by means of said comparison signal outputted from said phase detecting means and, if there are a plurality of selected ones, deriving one of said inverted or non-inverted delay clocks as said synchronizing clock in accordance with a predetermined priority order by using said comparison signal.

6. The synchronizing pulse generating circuit of claim 1, wherein said synchronizing pulse generating means comprises;

counting means for receiving said corrected synchronizing signal and said synchronizing clock to be reset in response to said corrected synchronizing signal and count said synchronizing clock, and pulse generating means for generating a pulse as said synchronizing pulse which is activated in a period when a count value of said counting means falls within a range between a couple of predetermined values.

7. A synchronizing pulse generating circuit comprising:

a synchronizing signal input terminal receiving a synchronizing signal;

synchronization lack correcting means receiving said synchronizing signal from said synchronizing signal input terminal for correcting said synchronizing signal for partial lack to generate corrected synchronizing signal;

separating means receiving said corrected synchronizing signal from said synchronization lack correcting means for sorting pulses of said corrected synchronizing signal into first to n-th pulses, in entry order, to form first to n-th sorted corrected synchronizing signals (where n is an integer greater than one);

first to n-th synchronizing clock generating means receiving said first to n-th sorted corrected synchronizing signals from said separating means for generating first to n-th synchronizing clocks synchronized with said sorted corrected synchronizing signals, respectively;

first to n-th synchronizing pulse generating means receiving said first to n-th synchronizing clocks from said first to n-th synchronizing clock generating means for counting said synchronizing clocks to generate first to n-th synchronizing pulses synchronized with said first to n-th sorted corrected synchronizing signals, respectively; and synthesizing means receiving said first to n-th synchronizing pulses from said first to n-th synchronizing pulse generating means for synthesizing said first to n-th synchronizing pulses to generate a single train of synchronizing pulses.

8. The synchronizing pulse generating circuit of claim 7, wherein said first to n-th synchronizing pulse generating means count said synchronizing clocks on the basis of respective set values, said synchronizing pulse generating circuit further comprising set value changing means receiving said synchronizing signal from said synchronizing signal input terminal for detecting the cycle of said synchronizing signal to change said respective set values in accordance with said cycle.

9. The synchronizing pulse generating circuit of claim 8, wherein said synchronization lack correcting means corrects said synchronizing signal for the partial lack on the basis of a second set value, and said set value changing means changes said second set value in accordance with said detected cycle.

10. The synchronizing pulse generating circuit of claim 9, wherein said set value changing means outputs a cycle detection signal each time said set value changing means detects a cycle change of said synchronizing signal, said synchronizing pulse generating circuit further comprising synchronizing pulse interrupting means receiving said cycle detection signal from said set value changing means and said single train of synchronizing pulses from said synthesizing means for interrupting a predetermined number of said synchronizing pulses of said single train.

11. The synchronizing pulse generating circuit of claim 7, wherein said synchronization lack correcting means comprises, pulse generating means for receiving said synchronizing signal and a synchronizing input permission signal to be placed into a pulse generable state by said synchronizing input permission signal and generate a pulse in response to said synchronizing signal, counter means for receiving said pulse from said pulse generating means and an external clock to be reset in response to said pulse from said pulse generating means and count an external clock to output a count signal, free-running means for receiving said count signal to output a load pulse when said count signal reaches a predetermined value, synchronizing input permission means for receiving said count signal to output said synchronizing input permission signal when said count signal falls within a range between predetermined first and second values which are not more than said predetermined value, and logical OR means for receiving said pulse from said pulse generating means and said load pulse to output said corrected synchronizing signal.

12. The synchronizing pulse generating circuit of claim 7, wherein each of said first to n-th synchronizing clock generating means comprises;

inverting delay means for sequentially inverting and delaying a reference clock by a plurality of inverting delay elements to generate a plurality of inverted delay clocks and a plurality of non-inverted delay clocks, memory means composed of a plurality of memory elements each having a data input terminal and a data output terminal and responding to a corresponding one of said inverted or non-inverted delay clocks to output a data received at said data input terminal from said data output terminal, phase detecting means for comparing signals outputted from said output terminals of adjacent said memory elements to provide one of said input terminals of said adjacent memory elements with a comparison signal as a comparison result, and clock selecting means for selecting one of said inverted or non-inverted delay clocks by means of said comparison signal outputted from said phase detecting means to derive said synchronizing clock.

13. The synchronizing pulse generating circuit of claim 7, wherein each of said first to n-th synchronizing clock generating means comprises;

inverting delay means for sequentially inverting and delaying a reference clock by a plurality of inverting delay elements to generate a plurality of inverted delay clocks and a plurality of non-inverted delay clocks, memory means composed of a plurality of memory elements each having a data input terminal and a data output terminal and responding to a corresponding one of said inverted or non-inverted delay clocks to output a data received at said data input terminal from said data output terminal, phase detecting means for comparing signals outputted from said output terminals of adjacent said memory elements to provide one of said input terminals of said adjacent memory elements with a comparison signal as a comparison result, and clock selecting means for selecting designated one or ones of said inverted or non-inverted delay clocks by means of said comparison signal outputted from said phase detecting means and, if there are a plurality of selected ones, deriving one of said inverted or non-inverted delay clocks as said synchronizing clock in accordance with a predetermined priority order by using said comparison signal.

14. The synchronizing pulse generating circuit of claim 7, wherein each of said first to n-th synchronizing pulse generating means comprises;

counting means for receiving said corrected synchronizing signal and said synchronizing clock to be reset in response to said corrected synchronizing signal and count said synchronizing clock, and pulse generating means for generating a pulse as said synchronizing pulse which is activated in a period when a count value of said counting means falls within a range between predetermined first and second values.

15. A synchronizing pulse generating circuit comprising:

a synchronizing signal input terminal receiving a synchronizing signal;

synchronization lack correcting means receiving said synchronizing signal from said synchronizing signal input terminal for correcting said synchronizing signal for partial lack to generate a correct synchronizing signal on the basis of a set value;

synchronizing clock generating means receiving said corrected synchronizing signal from said synchronization lack correcting means for generating a synchronizing clock synchronized with said corrected synchronizing signal;

synchronizing pulse generating means receiving said synchronizing clock from said synchronizing clock generating means for counting said synchronizing clock to generate synchronizing pulses synchronized with said synchronizing signal on the basis of a set value; and and wherein said synchronizing lack correcting means comprises pulse generating means for receiving said synchronizing signal and a signal input permission signal to be placed in a pulse generable state by said synchronizing input permission signal and generating a pulse in response to said synchronizing signal, counter means for receiving said pulse from said pulse generating means and an external clock to be reset in response to said pulse from said pulse generating means and count said external clock to output a count signal, free-running means for receiving said count signal to output a load pulse when said count signal reaches a predetermined value, synchronizing input permission means for receiving said count signal to output said synchronizing input permission signal when said count signal falls within a range between a predetermined first and second value which are not more than said predetermined value, and logical OR means for receiving said pulse from said pulse generating means and said load pulse to output said correcting synchronizing signal.

16. A synchronizing pulse generating circuit comprising:

a synchronizing signal input terminal receiving a synchronizing signal;

synchronization lack correcting means receiving said synchronizing signal from said synchronizing signal input terminal for correcting said synchronizing signal for partial lack to generate a correct synchronizing signal on the basis of a set value;

synchronizing clock generating means receiving said corrected synchronizing signal from said synchronization lack correcting means for generating a synchronizing clock synchronized with said corrected synchronizing signal;

synchronizing pulse generating means receiving said synchronizing clock from said synchronizing clock generating means for counting said synchronizing clock to generate synchronizing pulses synchronized with said synchronizing signal on the basis of a set value; and wherein said synchronizing pulse generating means comprises, counting means for receiving said signal and said synchronizing clock to be reset in response to said correct synchronizing signal and count said synchronizing clock, and pulse generating means for generating a pulse as said synchronizing pulse which is activated in a period when account value of said counting means falls within a range between predetermined first and second values.

* * * * *

UNITED STATES PATENT AND TRADEMARK OFFICE
CERTIFICATE OF CORRECTION

PATENT NO. : 5,459,419
DATED : October 17, 1995
INVENTOR(S) : Makoto HATAKENAKA

It is certified that error appears in the above-indentified patent and that said Letters Patent is hereby corrected as shown below:

Column 31, line 12, delete "synchronizing signal with said corrected syn-";

line 13, delete "chronizing signal".

Column 35, line 23, delete "and".

Signed and Sealed this

Eleventh Day of June, 1996

Attest:

BRUCE LEHMAN

Attesting Officer     Commissioner of Patents and Trademarks